United States Patent [19]
Fukushige

[11] Patent Number: 6,092,112
[45] Date of Patent: Jul. 18, 2000

[54] DISTRIBUTING INFORMATION THROUGH AN OPEN NETWORK TO MANY AND UNSPECIFIC CLIENTS BEING IN DIFFERENT RETAINING SITUATIONS WITH AN INFORMATION SERVER

[75] Inventor: Yoshio Fukushige, Fujisawa, Japan

[73] Assignee: Matsushita Electric Industrial Co., Ltd., Osaka, Japan

[21] Appl. No.: 08/783,138

[22] Filed: Jan. 14, 1997

[30] Foreign Application Priority Data

Jun. 17, 1996 [JP] Japan ................................ 8-155151

[51] Int. Cl.$^7$ .............................. G06F 13/14; G06F 9/06
[52] U.S. Cl. ...................... 709/229; 709/219; 709/225; 709/238
[58] Field of Search ..................... 709/203, 211, 709/216, 219, 225, 229, 246, 218, 248, 238; 707/10; 84/602; 434/307; 348/429, 432

[56] References Cited

U.S. PATENT DOCUMENTS

| | | |
|---|---|---|
| 5,442,749 | 8/1995 | Northcutt et al. . |
| 5,491,820 | 2/1996 | Belove et al. ............................ 395/600 |
| 5,550,557 | 8/1996 | Verbiest et al. .............................. 348/7 |
| 5,566,297 | 10/1996 | Devarakonda et al. . |
| 5,694,546 | 12/1997 | Reisman ...................................... 705/26 |
| 5,799,150 | 8/1998 | Hamilton et al. ........................ 709/203 |
| 5,821,987 | 10/1998 | Larson ...................................... 348/19 |
| 5,873,086 | 2/1999 | Fujii et al. ................................. 707/10 |
| 5,879,236 | 3/1999 | Lambright ................................ 463/42 |
| 5,890,963 | 4/1999 | Yen ........................................... 463/42 |

FOREIGN PATENT DOCUMENTS

| | | |
|---|---|---|
| 0529864A1 | 8/1991 | European Pat. Off. . |
| 0597592A2 | 10/1992 | European Pat. Off. . |
| 6-102888 | 4/1994 | Japan .............................. G10K 15/04 |

*Primary Examiner*—Zarni Maung
*Assistant Examiner*—Jason D. Cardone
*Attorney, Agent, or Firm*—Lowe Hauptman Gopstein Gilman & Berner

[57] ABSTRACT

An information distribution system which distributes information including a large amount of data through an open network to many and unspecific clients being in different retaining situations. An information server includes a data production section, while the client includes a large capacity data retaining medium and a data retaining medium control section. When the information server distributes information through a network to the client, the data production section of the information server provides the data corresponding to the state of the data retaining medium control section of the client, whereas the client suitably uses the data existing in its own data retaining medium in utilizing the data from the information server. This enables effective data distribution.

19 Claims, 38 Drawing Sheets

FIG. 3(a) Izu Heights 0. html
```
...
Hotel A
Hotel A is ...
<SRC="Hotel A Simplicity.mpg">
...
Hotel B
Hotel B is ...
<SRC="Hotel B Simplicity.mpg">
...
```

FIG. 3(b) Izu Heights 1. html
```
...
Hotel A
Hotel A is ...
<CD-ROM="95 Nationwide Hot Spring Inn", FILE="Hotel A Standard.mpg">
...
Hotel B
Hotel B is ...
<SRC="Hotel B Simplicity.mpg">
```

FIG. 3(c) Izu Heights 2. html
```
...
Hotel A
Hotel A is ...
<CD-ROM="96 Nationwide Hot Spring Inn", FILE="Hotel A Standard.mpg">
...
Hotel B
Hotel B is ...
<CD-ROM="96 Nationwide Hot Spring Inn", FILE="Hotel B Standard.mpg">
...
```

FIG. 3(d) Izu Heights 1'. html
```
...
Hotel A
Hotel A is ...
<CD-ROM="95 Nationwide Hot Spring Inn", FILE="Hotel A Standard.mpg">
...
Hotel B
Hotel B is ...
<CD-ROM="95 Nationwide Hot Spring Inn", FILE="Izu heights Pension Hamlet.mpg">
<SRC="Hotel B Simplicity.mpg">
```

FIG. 8

```
Hotel A
Hotel A is ...
<SWITCH>
<Case "96 Nationwide Hot Spring Inn"><CD-ROM = "96 Nationwide Hot Spring Inn",
FILE = "Hotel A Standard.mpg"> <BREAK>
<Case "95 Nationwide Hot Spring Inn"><CD-ROM = "95 Nationwide Hot Spring Inn",
FILE = "Hotel A Standard.mpg"> <BREAK>
<DEFAULT><SRC = "Hotel A Simplicity.mpg">
</SWITCH>
. . .
Hotel B
Hotel B is ...
<SWITCH>
<Case "96 Nationwide Hot Spring Inn"><CD-ROM = "96 Nationwide Hot Spring Inn",
FILE = "Hotel B Standard.mpg"> <BREAK>
<DEFAULT><SRC = "Hotel B Simplicity.mpg">
</SWITCH>
```

FIG. 10(a)

```
...
Hotel A
Hotel A is ...
<SRC="Hotel A Simplicity.mpg">
...
Hotel B
Hotel B is ...
<SRC="Hotel B Simplicity.mpg">
```

FIG. 10(b)

```
...
Hotel A
Hotel A is ...
<CD-ROM="95 Nationwide Hot Spring Inn",FILE="Hotel A Standard.mpg">
...
Hotel B
Hotel B is ...
<SRC="Hotel B Simplicity.mpg">
```

FIG. 10(c)

```
...
Hotel A
Hotel A is ...
<CD-ROM="96 Nationwide Hot Spring Inn",FILE="Hotel A Standard.mpg">
...
Hotel B
Hotel B is ...
<CD-ROM="96 Nationwide Hot Spring Inn",FILE="Hotel B Standard.mpg">
```

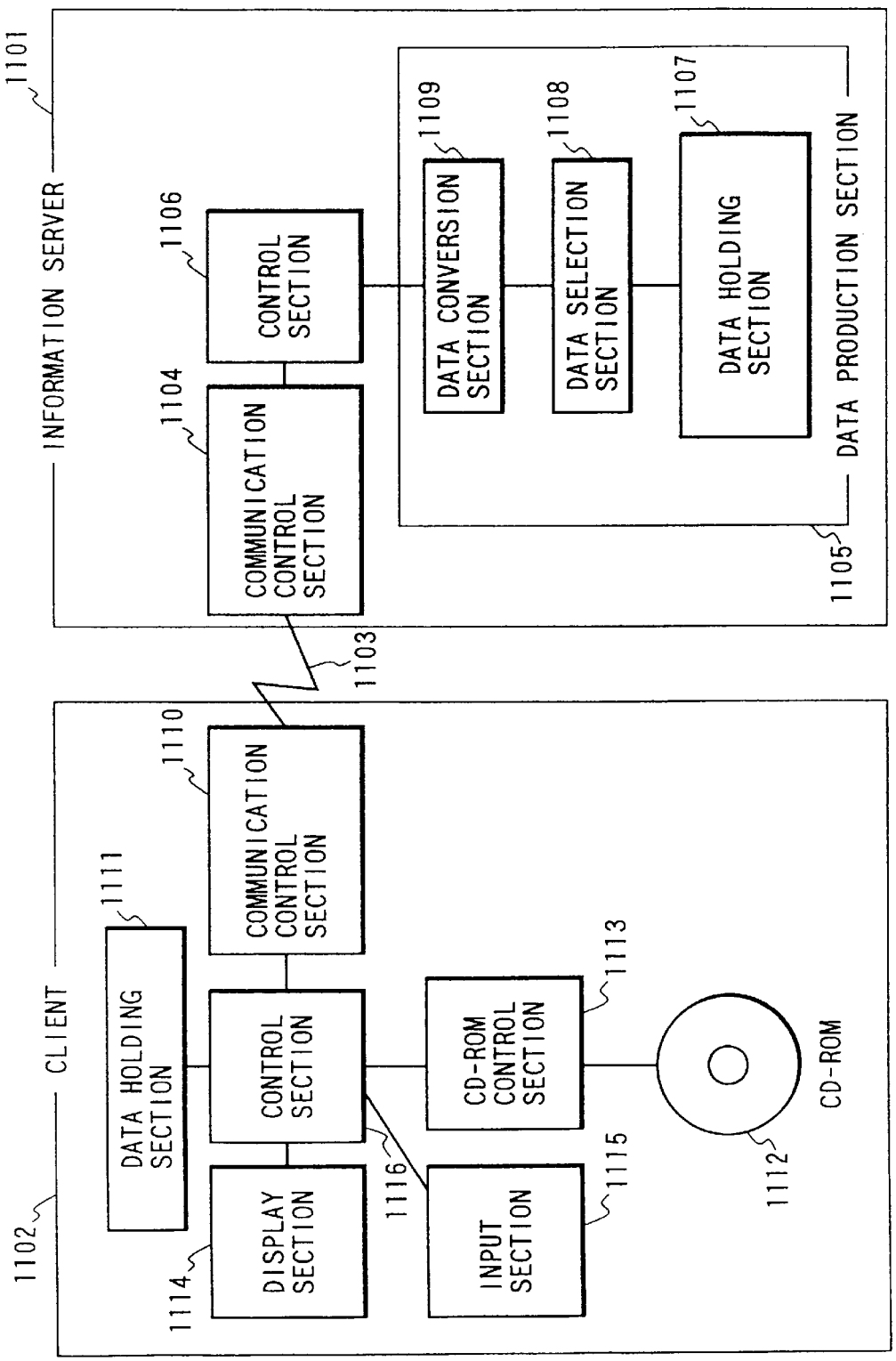

FIG. 13(a)

Izu Heights 0. src

```
...
Hotel A
Hotel A is ...
<SRC="Hotel A Simplicity.
mpg">
...
Hotel B
Hotel B is ...
<SRC="Hotel B Simplicity.
mpg">
```

FIG. 13(b)

Izu Heights 1. src

```
...
Hotel A
Hotel A is ...
<CD-ROM= $_,
FILE="Hotel A Standard.mpg">
...
Hotel B
Hotel B is ...
<SRC="Hotel B Simplicity.mpg">
```

FIG. 13(c)

Izu Heights 2. src

```
...
Hotel A
Hotel A is ...
<CD-ROM= $_,
FILE="Hotel A Standard.mpg">
...
Hotel B
Hotel B is ...
<CD-ROM= $_,
FILE="Hotel B Standard.mpg">
```

FIG. 15(a)

```
...
Hotel A
Hotel A is ...
<SRC="Hotel A Simplicity.mpg">
...
Hotel B
Hotel B is ...
<SRC="Hotel B Simplicity.mpg">
```

FIG. 15(b)

```
...
Hotel A
Hotel A is ...
<CD-ROM="95 Nationwide Hot Spring Inn", FILE="Hotel A Standard.mpg">
...
Hotel B
Hotel B is ...
<SRC="Hotel B Simplicity.mpg">
```

FIG. 15(c)

```
...
Hotel A
Hotel A is ...
<CD-ROM="96 Nationwide Hot Spring Inn", FILE="Hotel A Standard.mpg">
...
Hotel B
Hotel B is ...
<CD-ROM="96 Nationwide Hot Spring Inn", FILE="Hotel B Standard.mpg">
```

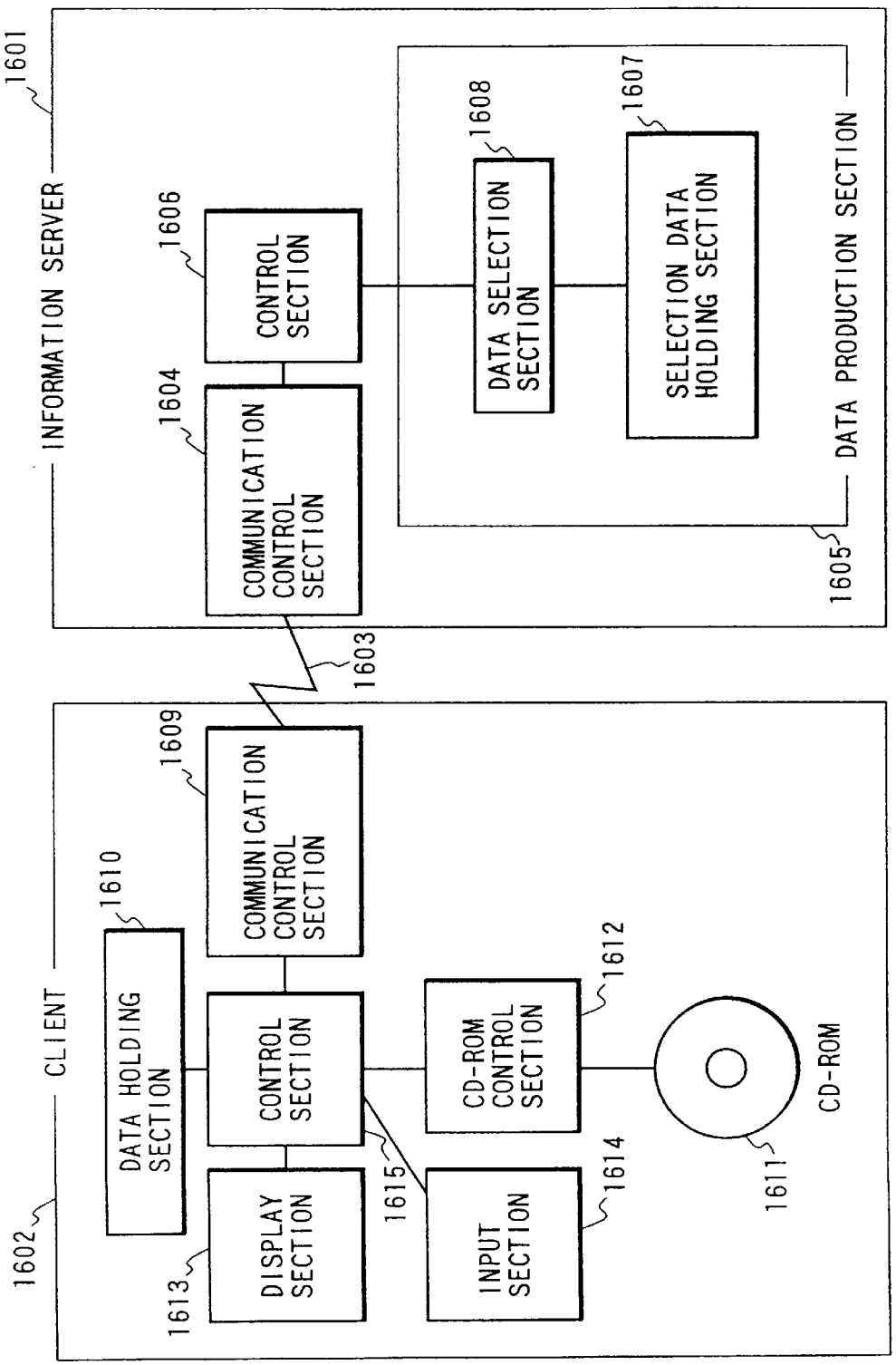

FIG. 30

```
...
Hotel A
Hotel A is ...
<HOST="local-serv",
CD-ROM="95 Nationwide Hot Spring
Inn",FILE="Hotel A Standard.mpg">

...
Hotel B
Hotel B is ...
<SRC="Hotel B Simplicity.mpg">
```

FIG. 33

```
. . .
Hotel A
Hotel A is ...
<HOST = "local-serv",
CD-ROM = "96 Nationwide Hot Spring
Inn", FILE = "Hotel A Standard.mpg">

. . .
Hotel B
Hotel B is ...
<HOST = "local-serv",
CD-ROM = "96 Nationwide Hot Spring
Inn", FILE = "Hotel B Standard.mpg">
```

FIG. 34

```
. . .
Hotel A
Hotel A is ...
<HOST = "local-serv", CD-ROM =
"96 Nationwide Hot Spring Inn"
"95 nationwide Hot Spring Inn",
FILE = "Hotel A Standard. mpg">

. . .
Hotel B
Hotel B is ...
<HOST = "local-serv", CD-ROM =
"96 Nationwide Hot Spring Inn",
FILE = "Hotel B Standard.mpg">
```

FIG. 35

```
. . .
Hotel A
Hotel A is ...
<CD-ROM = "95 Nationwide Hot Spring
Inn", FILE = "Hotel A Standard.mpg">

. . .
Hotel B
Hotel B is ...
<HOST = "local-serv",
CD-ROM = "96 Nationwide Hot Spring
Inn", FILE = "Hotel B Standard.mpg">
```

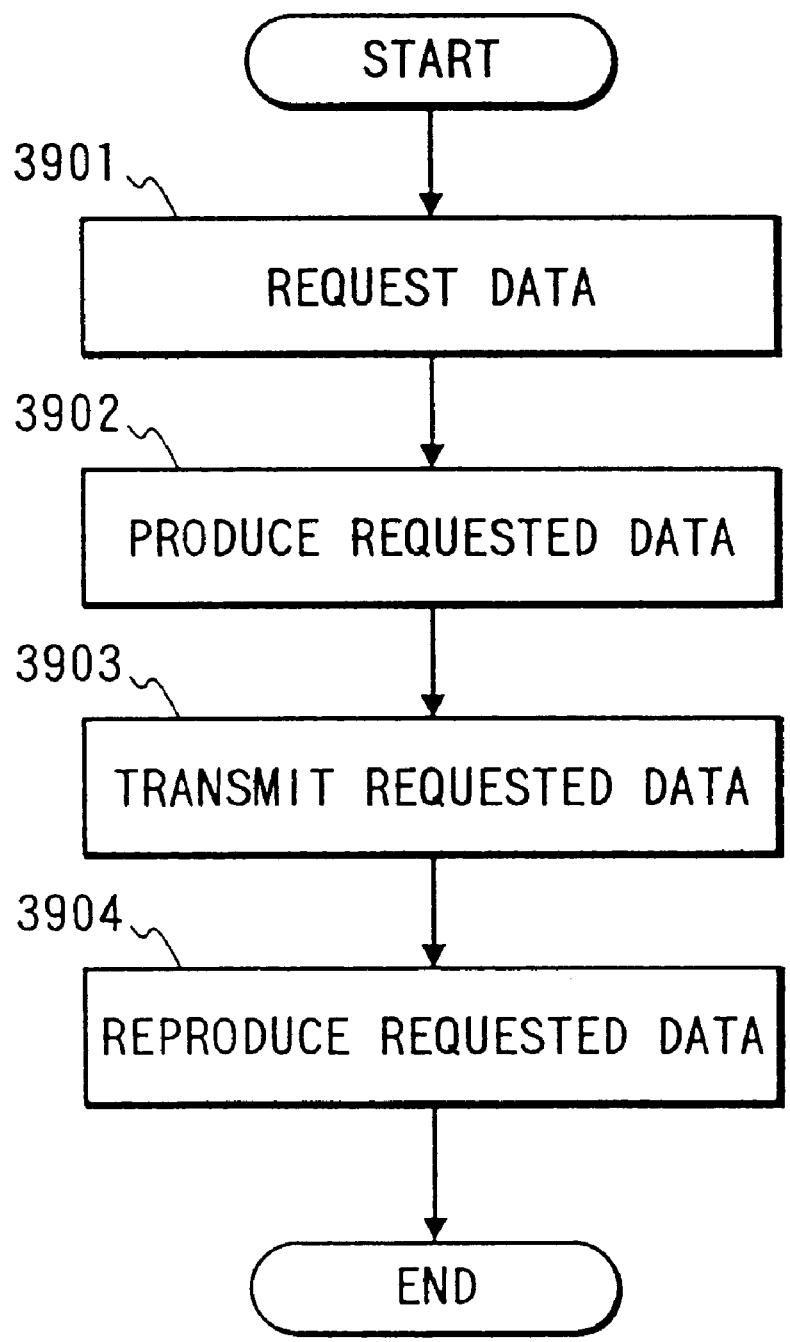

DISTRIBUTING INFORMATION THROUGH AN OPEN NETWORK TO MANY AND UNSPECIFIC CLIENTS BEING IN DIFFERENT RETAINING SITUATIONS WITH AN INFORMATION SERVER

BACKGROUND OF THE INVENTION

1. Field of the Invention

The present invention relates to a system for distributing or providing information through the use of a network.

2. Description of the Prior Art

The information distribution using a network has hitherto been made in such a manner that, like the WWW (World Wide Web) on the internet, a client has transmitted a data name corresponding to information the client desires through the network to an information server being an information provider and has then received the desired information therefrom. FIG. 36 illustrates a typical arrangement of an information distribution system. In the illustration, this prior system comprises an information server 3601 which distributes information, a client 3602 which receives the information therefrom, and a network 3603 which establishes connection between the information server 3601 and the client 3602. The information server 3601 includes a communication control section 3604 for controlling the communication with the network 3603, a data production and acquisition section (which will be referred hereinafter to as a data production section) 3605, and a control section 3606 for controlling the communication control section 3604 and the data production section 3605. On the other hand, the client 3602 includes a communication control section 3607 for controlling the communication with the network 3603, a data holding section 3608 for holding data, a display section 3610 for displaying various kinds of data and messages to the user, an input section 3611 for accepting the input made by the user, and a control section 3609 for taking care of the control of the communication control section 3607, the data holding section 3608, the display section 3610 and the input section 3611.

Referring to FIGS. 36 and 37, a description will be made hereinbelow of the operation of this prior model. First of all, through the use of the input section 3611 of the client 3602, the user gives instructions to the client 3602 so that the client 3602 makes a request for the designated data to the information server 3601. At this time, the control section 3609 of the client 3602 gives instructions to the communication control section 3607 to request the same data therefrom. The communication control section 3607 issues a request for the same data through the network 3603 toward the information server 3601 (step 3701 in FIG. 37). On the other hand, in the information server 3601 side, the communication control section 3604 first accepts the request from the client 3602side and then makes it known to the control section 3606 which in turn, hands it over to the data production section 3605. The data production section 3605 produces and gets the data corresponding to the data name designated (step 3702). If there is the requested data (step 3703), the operational flow comes in the information distribution operations (step 3704 and the following steps).

The data production section 3605 communicates the produced data to the control section 3606 which in turn, gives instructions to the communication control section 3604 to supply the obtained data to the client 3602 side. In response to the instructions, the communication control section 3604 transmits the same data through the network 3603 to the client 3602 (step 3704). At this time, even if the data requested involves a large amount of data such as image data, all the data are delivered from the information server 3601 through the network 3603 to the client 3602. In the client 3602 side, the communication control section 3607 receives the data from the information server 3601 through the network 3603 and subsequently passes it to the control section 3609 which in turn, once stores it in the data holding section 3608. The same data is thereafter reproduced to be displayed on the display section 3610 (step 3705).

On the other hand, if in the aforesaid step 3702 there is no data to be given, the operational flow shifts to a step 3706 where the data production section 3605 informs the control section 3606 of the fact on no acquisition of the data, while the control section 3606 gives instructions to the communication control section 3604 to give the notice of data supply rejection to the client 3602 side, with the notice being transmitted through the network 3603 thereto. When receiving the data supply rejection notice from the information server 3601 side through the network 3603, in the client 3602 side the communication control section 3607 conveys it to the control section 3609 which in turn, makes the display section 3610 displays the same notice (step 3706).

Furthermore, as another model of the information distribution using the network, there has also been known a communication KARAOKE system employing a laser disk or the like. In this system, for distribution of data, a large amount of data such as image data is placed in a KARAOKE terminal side, while in answer to a request for music data from the terminal the center feeds the music data and an indication code indicating the use of image data to the terminal side. The terminal combines the fed music data with image data reproduced in accordance with the image data use indication code to provide the resultant to the user.

FIG. 38 shows a typical arrangement of this prior system. In the illustration, the system is composed of an information server (center) 3801 which performs the information distribution, a client (KARAOKE terminal) 3802 which accepts the information therefrom, and a network 3803 for making connection between the information server 3801 and the client 3802. The information server 3801 is equipped with a communication control section 3804 for controlling the communication with the network 3803, a data production section 3805 for producing and obtaining the data to be provided, and a control section 3806 for controlling the communication control section 3804 and the data production and acquisition section 3805. On the other hand, the client 3802 is provided with a communication control section 3807 for controlling the communication with the network 3803, a data holding section 3808, a laser disk 3809 being a portable large-capacity data keeping medium, a laser disk control section 3810 for controlling the laser disk 3809, a display section 3811 for displaying various kinds of data and messages to the user, an input section 3812 for accepting instructions from the user, and a control section 3813 for taking charge of the control of the communication control section 3807, the data holding section 3808, the laser disk control section 3810, the display section 3811 and the input section 3812.

Referring to FIGS. 38 and 39, a description will be taken hereinbelow of the operation of this prior system. First of all, through the use of the input section 3812 of the client 3802, the user gives instructions to the client 3802 for request of the designated data from the information server 3801. The control section 3813 of the client 3802 gives instructions to the communication control section 3807 to ask the information server 3801 for the same data. The communication control section 3807 asks the information server 3801 through the network 3803 for the distribution of the same data (step 3901 in FIG. 39). Going the other way, in the information server 3801 side, the communication control section 3804 accepts the aforesaid request the client 3902 makes, and then communicates it to the control section 3806. The control section 3806 passes the name of the data under the request to the data production section 3805. The data production section 3805 produces and gets the data corresponding to the name of the data requested. At this time, since the client 3802 and the information server 3801 render services in a closed system, the client 3802 is equipped with a predetermined laser disk. Accordingly, the data corresponding to the name of the data requested the information server 3801 provides is singly determined, so that the data production section 3805 of the information server 3801 attains the data fixed to the request (step 3902).

The data production section 3805 hands over the obtained data to the control section 3806 which in turn, gives instructions to the communication control section 3804 to send the obtained data to the client 3802. Thus, the communication control section 3804 transmits the same data through the network 3803 to the client 3802 side (step 3903). In the client 3802 side, the communication control section 3807 receives the data from the information server 3801 side through the network 3803 and then hands it over to the control section 3813 which in turn, makes it once stored in the data holding section 3808 and makes it thereafter reproduced to be displayed on the display section 3811. At this time, the control code for displaying image data in the laser disk 3809 the client 3802 retains is included in the data the information server 3801 sends, the control section 3813 controls the laser disk control section 3810 in accordance with the control code so that the image data is derived from the laser disk 3809 and displayed on the display section 3811 (step 3904).

The above-described system has been exemplified by Japanese Unexamined Patent Publication No. 6-102888.

There is a problem which arises with the system having the FIG. 36 arrangement and exhibiting the subsequently mentioned operation, however, in that for distribution of a large amount of data such as a motion picture the data transmission takes a long time due to the restriction in the capacity of the line between the information server and the client, with the result that difficulty is encountered to put the system into practice. For this reason, for the distribution of such motion picture data, the conventional system has been made to shorten the time required for the data transmission in such a way as to restrict the data quantity and the time or deteriorate the image quality to improve the compression efficiency.

In addition, in the system having the FIG. 38 arrangement and exerting the subsequently mentioned operation, the information server side for providing information is made to produce the corresponding data on the assumption of the holding situation of the (image) data in the client side and hence, when the client asks the information server for data which does not conform with the assumption, difficulty is experienced to appropriately reproduce the data the information server provides. Thus, although there is no problem in the case that the system service is rendered in a closed network, the prior system is not suitable for the distribution of information to many and unspecific clients through an open network where a different data retaining situation is taken at every client.

SUMMARY OF THE INVENTION

It is therefore an object of the present invention to provide an information distribution system which is capable of effectively offering even information including a large amount of data such as a motion picture for the information distribution to the many and unspecific clients through an open network where a different data retaining situation is taken at every client.

In accordance with the present invention, there is provided an information distribution system using a network in which, when an information server provides data through a network to a client, the information server gives to the client data suiting with the condition of a data retaining (recording) medium control section of the client, while the client uses the data in its data retaining media along with the data given therefrom. According to this system, if the data the information server should provide includes data the data retaining medium already possesses, the data is not conveyed through the network but is derived from the data retaining medium of the client, which makes the distribution of the information including a large amount of data such as a motion picture is effectively possible. Further, even when the client with the arrangement of this invention is not equipped with a specific data retaining medium, if the information server side prepares standard data, the distribution of that data is also possible. Moreover, as long as the information server side has a standard data, the distribution of the data to the client with no arrangement of this invention is also possible.

In addition to this arrangement, the information distribution system using the network according to this invention can be provided with a data retaining medium list showing information about data retaining media, including the medium on the data retaining medium control section, available on the client side, so that a control section of the client controls the data retaining medium list in addition to a communication control section, a data holding section and the data retaining medium control section. According to this system, when providing the data through the network to the client, the information server supplies, in accordance with the contents of the data retaining medium list of the client, data including control information necessary when the client uses the data in the data retaining media available on the client side. With the use of the supplied data, the client takes the available data in the data retaining medium.

According to this system, when the data the information server supplies includes the data being already in the usable data retaining medium, even if the data retaining medium including that data is not mounted in the data retaining medium control section of the client at the time that the information server provides the data, the aforesaid data is not delivered through the network but is obtainable from the usable data retaining medium. Accordingly, in many cases, the distribution of a large amount of data such as a motion picture becomes more effectively possible.

Still further, an information distribution system using a network according to this invention is provided with an information server for carrying out the supply of information, a client for receiving the information and a mediation server for mediating between the client and the information server. In addition, the information server is equipped with a communication control section for establishing communications through a network, a data production section for producing and obtaining data to be given and a control section for taking charge of the control of the communication control section and the data production section. Further, the client has a communication control section for making communications through the network, a data holding section for holding data, and a control section for taking care of the control of the communication control section and the data holding section. Moreover, the mediation server includes a communication control section for setting up communications through the network, a data holding section for temporarily holding data, a data conversion (or replacement) section for making the conversion of the data coming from the information server when necessary, portable a large-capacity data retaining media, a data retaining medium control section for controlling the data retaining medium, and a control section for controlling the communication control section, the data holding section, the data conversion section and the data retaining medium control section. Further, when the information server supplies the data through the mediation server to the client by way of the network, in accordance with at least the state of the data retaining medium control section of the mediation server the information server distributes data including control information taken for when the mediation server uses the data existing in its data retaining media, and the mediation server then makes the conversion of the data given from the information server to supply it to the client. That is, the data existing in the data retaining media of the mediation server is put to use when the client uses the data coming from the mediation server.

According to this system, even if the client which accepts the information does not directly have a specific data retaining medium, in cases where a portion of the data the information server supplies is present in the data retaining medium the mediation server has, that data is attainable from the data retaining medium of the mediation server without being delivered from the information server to the mediation server through the network. Accordingly, since the transmission of a large amount of data such as a motion picture can be limited to between the mediation server and the client, in which cases, information including the large amount of data such as the motion picture is effectively distributable.

BRIEF DESCRIPTION OF THE DRAWINGS

The object and features of the present invention will become more readily apparent from the following detailed description of the preferred embodiments taken in conjunction with the accompanying drawings in which:

FIGS. 3(a)–(d) are an illustration of an example of the data files an information server of the information distribution system according to the first embodiment has;

FIG. 8 is an illustration of an example of a data file of an information server of the information distribution system according to the second embodiment;

FIGS. 10(a)–(c) are an illustration of the conversion result of the data file by the information server of the information distribution system according to the second embodiment;

FIG. 11 is an illustration of an arrangement of an information distribution system according to a third embodiment of the present invention;

FIGS. 13(a)–13(c) are an illustration of an example of the data file an information server of the information distribution system according to the third embodiment includes;

FIGS. 15(a)–(c) are an illustration of a conversion result of the data file by the information server of the information distribution system according to the third embodiment;

FIG. 16 is an illustration of an arrangement of an information distribution system according to a fourth embodiment of the present invention;

FIG. 30 is an illustration of an example of a conversion result of a data file by a mediation server of the information distribution system according to the eighth embodiment;

FIG. 33 is an illustration of an example of a conversion result of a data file by a mediation server of the information distribution system according to the ninth embodiment;

FIG. 34 is an illustration of an example of the data file of a data file an information server of the information distribution system according to the ninth embodiment includes;

FIG. 35 is an illustration of an example of a conversion result of a second data file by a mediation server of the information distribution system according to the ninth embodiment;

FIG. 39 is a flow chart showing an operation of the FIG. 38 prior information distribution system.

DETAILED DESCRIPTION OF THE INVENTION

First Embodiment

Figure 1:
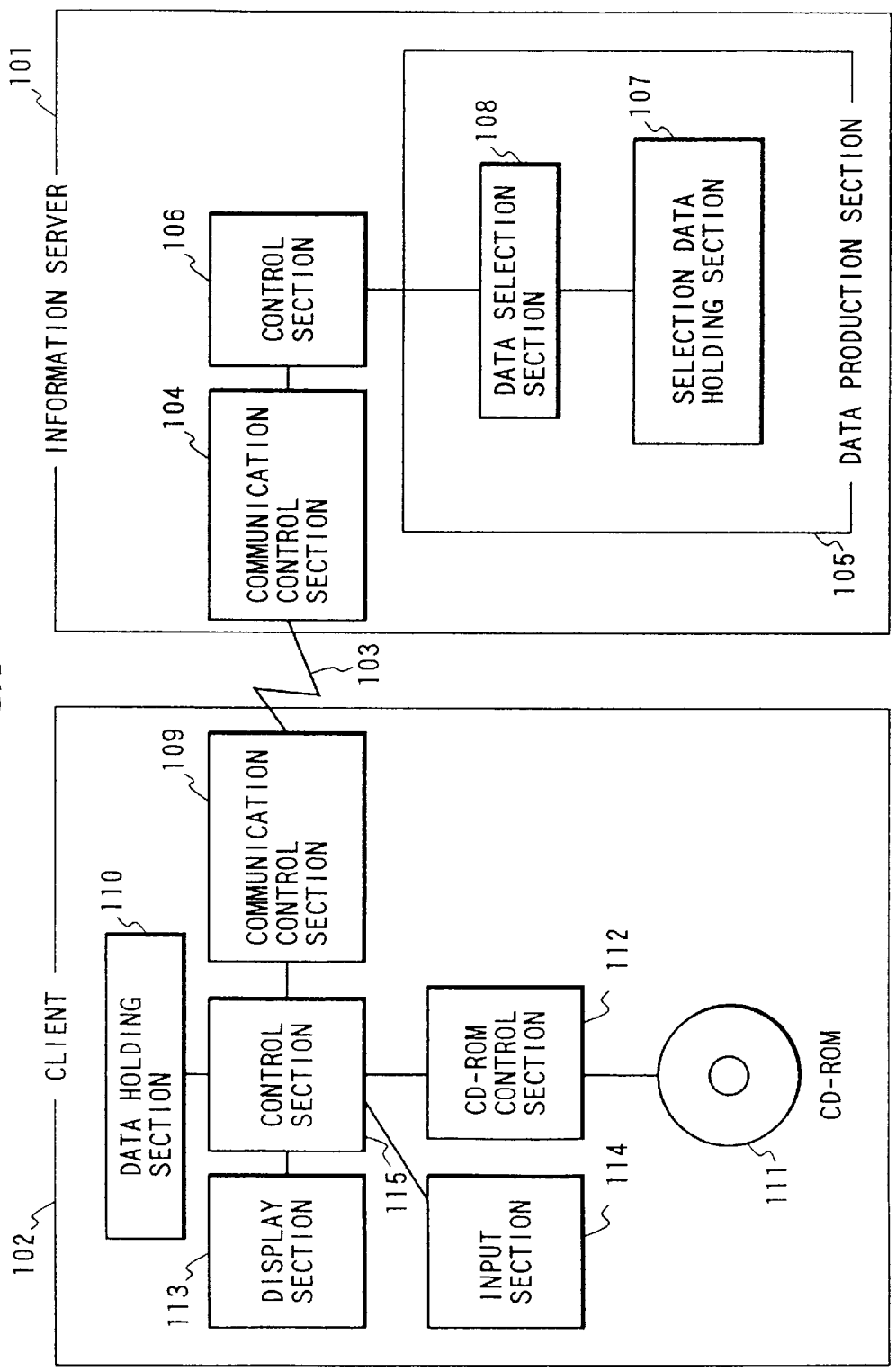
FIG. 1 is an illustration of an arrangement of an information distribution system according to a first embodiment of the present invention.

First of all, a description will be made hereinbelow of a first embodiment of the present invention with reference to FIG. 1. In FIG. 1, an information distribution system according to this first embodiment comprises an information server 101 for offering information, a client 102 for accepting the information therefrom, and a network 103 for establishing connection between the information server 101 and the client 102. The information server 101 is composed of a communication control section 104 for controlling the communication with the network 103, a data production section 105 for producing and getting data to be offered, and a control section 106 for controlling the communication control section 104 and the data production section 105. Further, the data production section 105 includes a selection data holding section 107 for holding a set of data for distribution and a data selection section 108 for selecting the data in the data holding section 107. On the other hand, the client 102 is composed of a communication control section 109 for controlling the communication with the network 103, a data holding section 110 for holding data, a CD-ROM 111 serving as a portable large capacity data retaining medium, a CD-ROM control section 112 for controlling the CD-ROM, a display section 113 for displaying various data and messages to the user, an input section 114 for receiving an input the user does, and a control section 115 for controlling the communication control section 109, the data holding section 110, the CD-ROM control section 112, the display section 113 and the input section 114.

Figure 2:
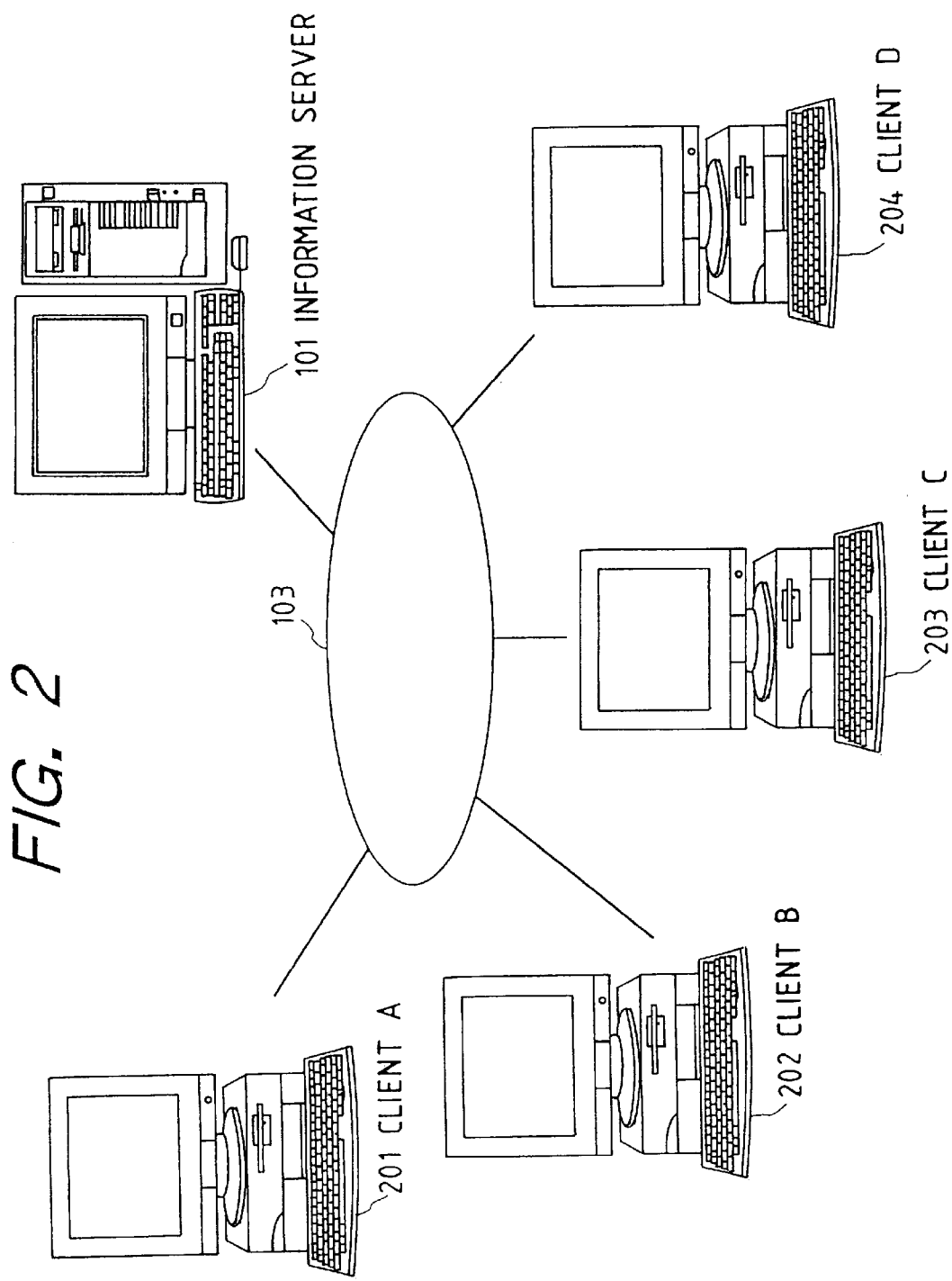
FIG. 2 is an illustration of an arrangement of the information distribution system according to the first embodiment using a network.

An operation of this embodiment will be described hereinbelow with reference to FIGS. 1 to 5 and Tables 1 to 4. FIG. 2 wholly shows an arrangement of the information distribution system according to this embodiment, which comprises the information server 101 and clients 201 to 203 each having the arrangement of the client 102 as shown in FIG. 1. The client having the arrangement of the client 102 as shown in FIG. 1 will be referred hereinafter to as a corresponding client. Contrary to these clients 201 to 203, a client 204 does not have the arrangement as shown in FIG. 1. Further, the network 103 makes connections between the information server and the clients 201 to 204. Now, let it be assumed that as shown in the Table 1 the selection data holding section 107 of the information server 101 possesses the data "Izu Heights 2. html", "Izu Heights 1. html", and "Izu Heights 0. html" as the candidates for the data files storing the data the information server 101 actually provides, which corresponds to a data name "Izu Heights. html".

TABLE 1

| Data Name | Candidates for Data File |
|---|---|
| Izu Heights. html | Izu Heights 2. html, Izu Heights 1. html, Izu Heights 0. html |
| Atami, html | Atami 2. html, Atami 1. html, Atami 0. html |
| ••• | ••• |

Furthermore, these files include the contents as shown in (a), (b) and (c) of FIG. 3. A detailed description will here be made of the data contents as shown in (a) to (c) of FIG. 3. The data "Izu Heights 0. html" shown in (a) of FIG. 3 has <SRC="Hotel A Simplicity. mpg"> in the description section about the Hotel A. This is a control code for, when a client receives and reproduces or playbacks this data, giving instructions to the client in the description section about the Hotel A to use the data "Hotel A Simplicity. mpg" the information server 101 retains. The "Hotel A Simplicity. mpg" signifies a simple image data about the Hotel A, which exists in the selection data holding section 107 of the information server 101. Further, when the information server 101 offers a data file such as the aforesaid "Izu Heights 0. html" including the description of <SRC="Hotel A Simplicity. mpg"> to the client 102, the data "Hotel A Simplicity. mpg" is also given through the network 103 to the client 102. The data "Hotel B Simplicity. mpg" is also used in the same way.

The data "Izu Heights 1. html" shown in (b) of FIG. 3 involves <CD-ROM="95 Nationwide Hot Spring Inn (Hotel)", FILE="Hotel A Standard. mpg">, which serves as a control code for giving instructions to the client 102 in the description section for the Hotel A to use the data "Hotel A Standard. mpg" in CD-ROM "95 Nationwide Hot Spring Inn" the client 102 has when the client 102 receives the data from the information server 101 and reproduces it. The data "Hotel A Standard. mpg" means an image data about the Hotel A and provides a higher quality image and includes more contents to heighten the degree of appeal, as compared with the data "Hotel Simplicity. mpg". The section on "Hotel B simplicity. mpg" is also used in the same way as "Izu Heights 0. html".

The data "Izu Heights 2. html" as shown in (c) of FIG. 3 has <CD-ROM="95 Nationwide Hot Spring Inn", FILE="Hotel A Standard. mpg">, which acts as a control code for, when the client 102 receives and reproduces this data, giving instructions to the client 102 in the description section about the Hotel A to use the data "Hotel A standard. mpg" of CD-ROM "96 Nationwide Hot Spring Inn" the client 102 retains. The section on "Hotel B Standard. mpg" is also used in the same way.

Let it be assumed that, as shown in Table 2, the data of CD-ROM "96 Nationwide Hot Spring Inn" contains both "Hotel A Standard. mpg" and "Hotel B Standard. mpg" while the data of CD-ROM "95 Nationwide Hot Spring Inn" has "Hotel A Standard. mpg" but not including "Hotel B Standard. mpg".

TABLE 2

| CD-ROM | Hotel A Standard. mpg | Hotel B Standard. mpg |
| --- | --- | --- |
| 95 Nationwide Hot Spring Inn | Present | Absent |
| 96 Nationwide Hot Spring Inn | Present | Present |

Furthermore, let it be assumed that the data selection section 108 of the information server 101 contains a data selection table for the data selection as shown in Table 3.

TABLE 3

| Data Name | Name of CD-ROM | Data File |
| --- | --- | --- |
| Izu Heights. html | "96 Nationwide Hot Spring Inn" | Izu Heights 2. html |
| Izu Heights. html | "95 Nationwide Hot Spring Inn" | Izu Heights 1. html |
| Izu Heights. html | Others/No | Izu Heights 0. html |
| Atami. html | "96 Nationwide Hot Spring Inn" | Atami 2. html |
| ... | ... | ... |

This table 3 is for determining the data file name the information server 101 actually provides as a key of the designated data name and the title of the CD-ROM 111 of the client 102.

The data selection table will be described here with reference to an example. In the case that, for example, the data name designated is "Izu Heights. html" and the title of the CD-ROM 111 of the client 102 is "96 Nationwide Hot Spring Inn", "Izu Heights 2. html" is selected on the basis of the same table by the data selection section 108. Further, when the client 102 requires the data "Izu Heights. html", if the title of the CD-ROM 111 of the client 102 is other than "96 Nationwide Hot Spring Inn" or "95 Nationwide Hot Spring Inn" or if the client 102 is not equipped with a CD-ROM, the data selection section 108 selects "Izu Heights 0. html" through the same table. The data such as the aforesaid "Izu Heights 2. html" to be chosen as the data to be actually offered in response to the request for one data when the client is provided with a specific CD-ROM will be referred hereinafter to as corresponding data which corresponds to that CD-ROM in terms of the designated data, while the data such as "Izu Heights 0. html" to be chosen in response to the request for one data when the client has a CD-ROM other than a specific CD-ROM or the client does not have a CD-ROM will be referred hereinafter to as standard data. Further, the CD-ROM retaining the corresponding data will be referred to as a corresponding CD-ROM.

Still further, let it be assumed that, as shown in table 4, the client A 201 of FIG. 2 is provided with the CD-ROM "96 Nationwide Hot Spring Inn", and the client B 202 of the same illustration is equipped with the CD-ROM "95 Nationwide Hot Spring Inn", while the client C 203 of the same illustration does not include a CD-ROM.

TABLE 4

| Client | CD-ROM Name |
| --- | --- |
| Client A | "96 Nationwide Hot Spring Inn" |
| Client B | "95 Nationwide Hot Spring Inn" |
| Client C | Absent |
| Client D | — |

Figure 4:
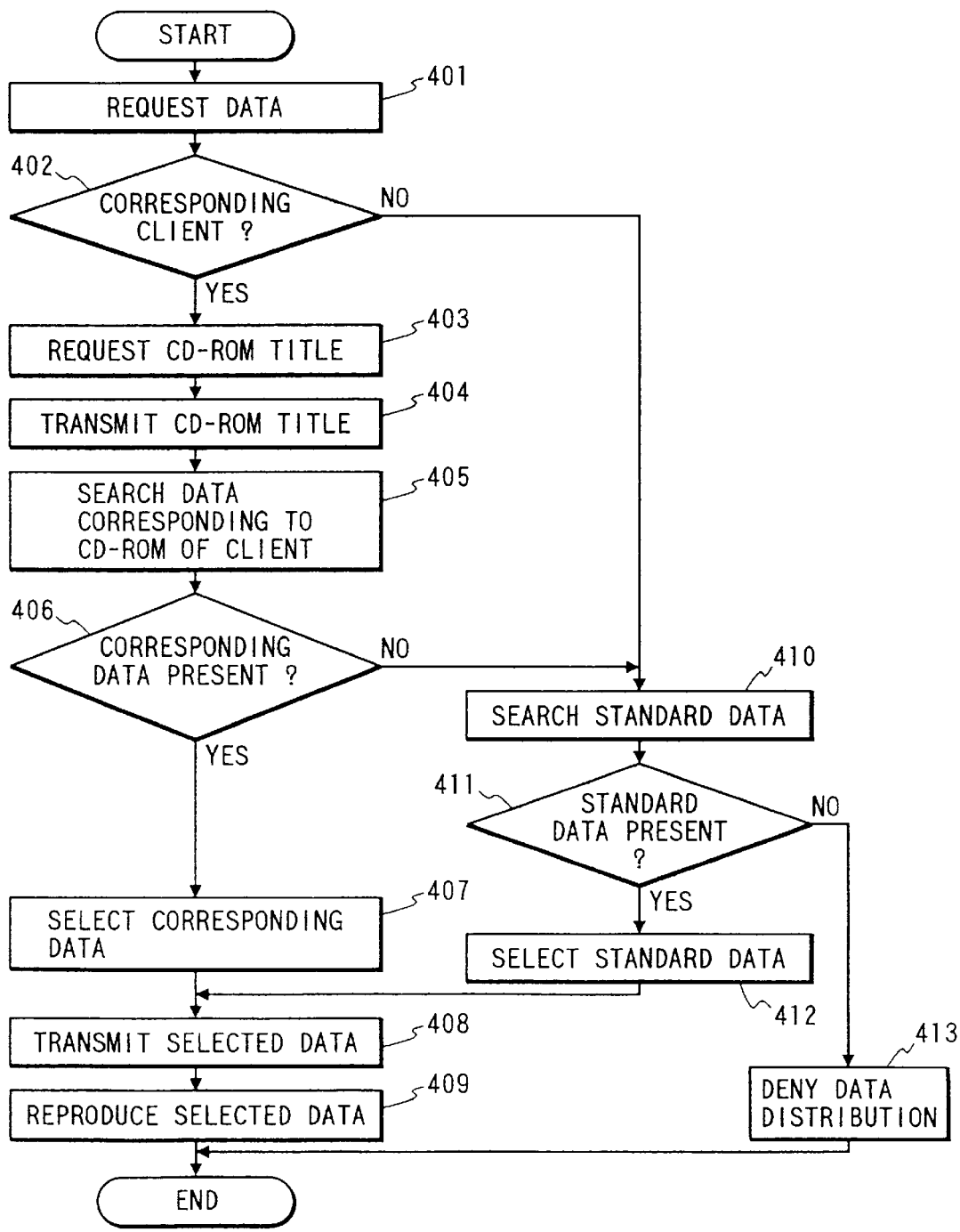
FIG. 4 is a flow chart showing an operation of the information distribution system according to the first embodiment.

Referring to FIGS. 4, a description will be taken hereinbelow of the operational flows taken for when the client A 201, the client B 202 and the client C 203 receive the data named "Izu Heights. html" from the information server 101. First, the description will begin with the case of the client A 201. In this case, through the input section 114 of the client A 201 the user gives instructions to the client A 201 to make a request for the data "Izu Heights. html" to the information server 101. The control section 115 of the same client A 201 gives instructions to the communication control section 109 to request the data "Izu Heights. html" from the information server 101. The communication control section 109 delivers through the network 103 to the information server 101 the request by which the information server 101 provides the data "Izu Heights. html". At this time, the information indicative of the fact that the client A 201 is a corresponding client is also sent as auxiliary information (step 401).

In the information server 101, the communication control section 104 first accepts the data request and the auxiliary information from the client A 201 and delivers them to the control section 106. The control section 106 decides, in accordance with the accepted auxiliary information, whether or not the client A 201 is the corresponding client (step 402). In this instance, since the client A 201 is the corresponding client, the control advances to the following operations (step 403 and the following steps). Subsequently, the control section 106 of the information server 101 gives instructions to the communication control section 104 to ask the client A 201 for transmitting the title of the CD-ROM 111 mounted in the CD-ROM control section 112 (step 403). In the client A 201, the communication control section 109 informs the control section 115 of that transmission request from the information server 101 side. The control section 115 asks the CD-ROM control section 112 for the title of the mounted CD-ROM 111, while the CD-ROM control section 112 informs the control section 115 of the title thereof. The control section 115 gives instructions to the communication control section 109 to transmit that title through the network 103 (step 404). In this case, it is the CD-ROM "96 Nationwide Hot Spring Inn".

In the information server 101, the communication control section 104 receives the information from the client 102 side and delivers it to the control section 106 which in turn, gives the requested data name and the information to the data selection section 108. In this case, the requested data name is "Izu Heights. html" and the title of the CD-ROM is "96 Nationwide Hot Spring Inn". The data selection section 108 finds the data file name of the corresponding data on the basis of the data name and the title of the CD-ROM 111 of the client 102 by referring to its data selection table (Table 3). In this instance, since the data name is "Izu Heights. html" and the title of the CD-ROM mounted in the CD-ROM control section 112 of the client A 201 is "96 Nationwide Hot Spring Inn", "Izu Heights 2. html" is found as the corresponding data (step 405).

The data selection section 108 checks whether the corresponding data is found or not (step 406). In this case, since "Izu Heights 2. html" is found as the corresponding data, the operational flow of FIG. 4 proceeds from the step 406 to a step 407 and the following steps. The data selection section 108 selects the found corresponding data as the data to be actually offered and derives it from the selection data holding section 107 to pass it to the control section 106 (step 407). The control section 106 gives instructions to the communication control section 104 to send the obtained data "Izu Heights 2. html" to the client A 201, and the communication control section 104 transmits the same data through the network 103 to the client A 201. At this time, since in this data there is not written a control code for using the image data "Hotel A simplicity. mpg" and "Hotel B simplicity. mpg" the information server retains, the transmission of these data therefrom does not take place (step 408).

In the client A 201, the communication control section 109 receives the data "Izu Heights 2. html" from the information server 101 through the network 103 and hands it over to the control section 115. The control section 115 once stores the same data in the data holding section 110 and then reproduces and displays it on the display section 113. Since the control code: <CD-ROM="96 Nationwide Hot Spring Inn", FILE="Hotel A Standard. mpg"> to indicate the use of the data "Hotel A Standard. mpg" of the CD-ROM "96 Nationwide Hot Spring Inn" the client A 201 retains is present in the description section for the hotel A, at the reproduction of this section the data "Hotel A Standard. mpg" in that CD-ROM is used with the control section 115 controlling the CD-ROM control section 112. Similarly, for the description section on the hotel B the data "Hotel B Standard. mpg" in the CD-ROM 111 is put to use (step 409).

As described above, in cases where the client A 201 having the CD-ROM "96 Nationwide Hot Spring Inn" requests the data "Izu Heights. html" from the information server 101, the image data "Hotel A Simplicity. mpg" and "Hotel B Simplicity. mpg" are not transmitted through the network 103 and, instead, the image data "Hotel A Standard. mpg" and "Hotel B Standard. mpg" higher in appeal and existing in the CD-ROM the client A 201 includes are used at the data reproduction (play).

Secondly, a description will be taken hereinbelow of the case of the client B 202. The control advances up to the step 403 of FIG. 4 in the same way as the case of the client A 201. That is, the information server 101 asks the client B 202 for transmitting the title of the CD-ROM 111 mounted in the CD-ROM control section 112 (steps 401, 402, and 403). As well as the client A 201, the client B 202 sends the title of the CD-ROM mounted in the CD-ROM control section 112. In this case, since the CD-ROM "95 Nationwide Hot Spring Inn" is mounted therein, the title "95 Nationwide Hot Spring Inn" is transmitted thereto (step 404). As well as the case of the client A 201, in the information server 101 the data selection section 108 searches for the corresponding data. Since the CD-ROM title is "95 Nationwide Hot Spring Inn", the data "Izu Heights 1. html" is attainable (step 405). As well as the case of the client A 201, the obtained corresponding data becomes the selected data, and in this instance, the selected data is "Izu Heights 1. html" (steps 406 and 407). Subsequently, as in the case of the client A 201, the selected data is given to the client B 202. At this time, since in the data "Izu Heights 1. html" there is written a control code for utilizing the image data "Hotel B simplicity" the information server 101 retains, the data selection section 108 attains the same image data from the selection data holding section 107 and delivers it together with "Izu Heights 1. html" to the control section 106 and the communication control section 104 then sends them to the client B 202. On the contrary, the data "Hotel A simplicity. mpg" is not transmitted because the corresponding control code is not written (step 408). Like the client A 201 the client B 202 reproduces the given data, and in this instance, the image data "Hotel B Simplicity. mpg" sent through the network 103 is used at the reproduction of the description section for the hotel B. On the other hand, like the case of the client A 201 the data "Hotel A standard. mpg" of the CD-ROM "95 Nationwide Hot Spring Inn" the client B 202 includes is employed at the reproduction of the description section for the hotel A (step 409).

As described above, in cases where the client B 202 having the CD-ROM "95 Nationwide Hot Spring Inn" requests the data "Izu Heights. html" from the information server 101, the image data "Hotel A simplicity. mpg" is not transmitted through the network 103, while the image data "Hotel A Standard. mpg" higher in appeal and existing in the CD-ROM the client B 202 has is used instead. On the other hand, the image data "Hotel B Simplicity. mpg" is transmitted from the information server 101 through the network 103 to the client B 202.

Moreover, a description will be taken hereinbelow of the client C 203. The control advances up to the step 403 of FIG. 4 in the same way as the case of the client A 201. That is, the information server 101 asks the client C 203 for transmitting the title of the CD-ROM 111 mounted in the CD-ROM control section 112 (steps 401, 402, and 403). Although as well as the client A 201 the client C 203 tries to send the title of the CD-ROM mounted in the CD-ROM control section 112 to the information server 101, in this case a letter-absent train which does not have any letter is transmitted because of having no CD-ROM (step 404). Although, as in the case of the client A 201, in the information server 101 the data selection section 108 searches for the corresponding data, the client C 203 is not equipped with a CD-ROM, the corresponding data is unobtainable (step 405). Because of no corresponding data, the operational flow of FIG. 4 goes from a step 406 to a step 410. The data selection section 108 searches for the standard data equivalent to the data "Izu Heights. html" by referring to the data selection table (Table 3) so that the search comes to "Izu Heights 0. html". Since the data "Izu Heights 0. html" is obtained as the standard data (step 411), the operational flow of FIG. 4 proceeds to a step 412 where the data selection section 108 selects the standard data "Izu Heights 0. html" and hands it over to the control section 106.

Subsequently, as in the case of the client A 201 the selected data "Izu Heights 0. html" is sent to the client C 203. At this time, since in the selected data there is written a control code for utilizing the image data "Hotel A Simplicity. mpg" and "Hotel B Simplicity. mpg" the information server 101 retains, the data selection section 108 derives both the image data from the selection data holding section 107 and passes the data together with the data "Izu Heights 0. html" to the control section 106, so that these data are transmitted through the communication control section 104 to the client C 203 (step 408). As well as the case of the client A 201, the client C 203 reproduces the given data. In this instance, the image data "Hotel A Simplicity. mpg" transmitted through the network 103 is reproduced in the description section for the hotel A, and the data "Hotel B Simplicity. mpg" is reproduced in the description section for the hotel B (step 409).

As described above, in cases where the client C 203, not equipped with a CD-ROM, requests the data "Izu Heights. html" from the information server 101, the image data "Hotel A Simplicity. mpg" and "Hotel B Simplicity. mpg" are transmitted from the information server 101 through the network 103 to the client C 203.

Figure 5:
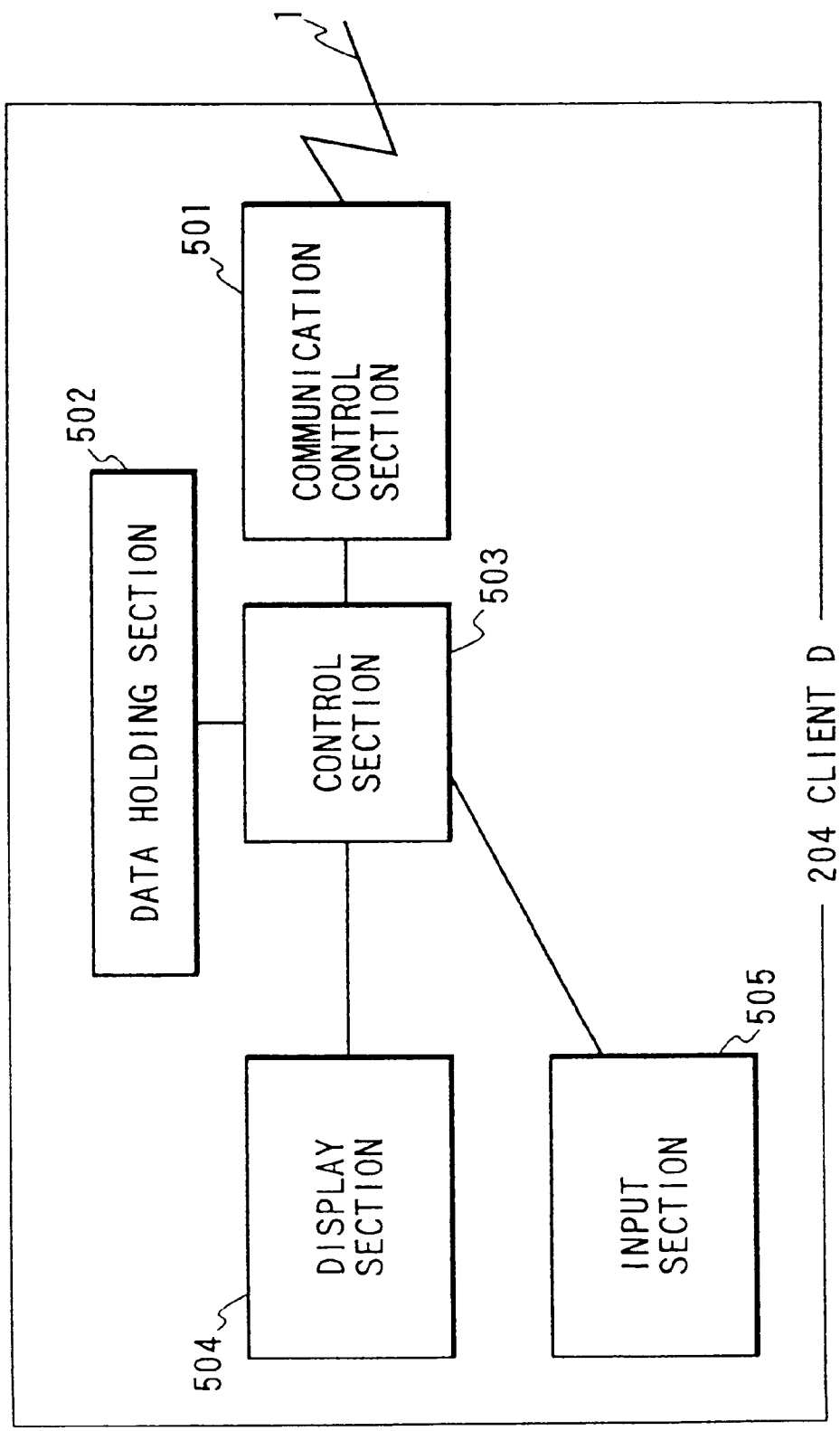
FIG. 5 is an illustration of an arrangement of a client which does not have an arrangement according to the first embodiment of this invention.
Figure 36:
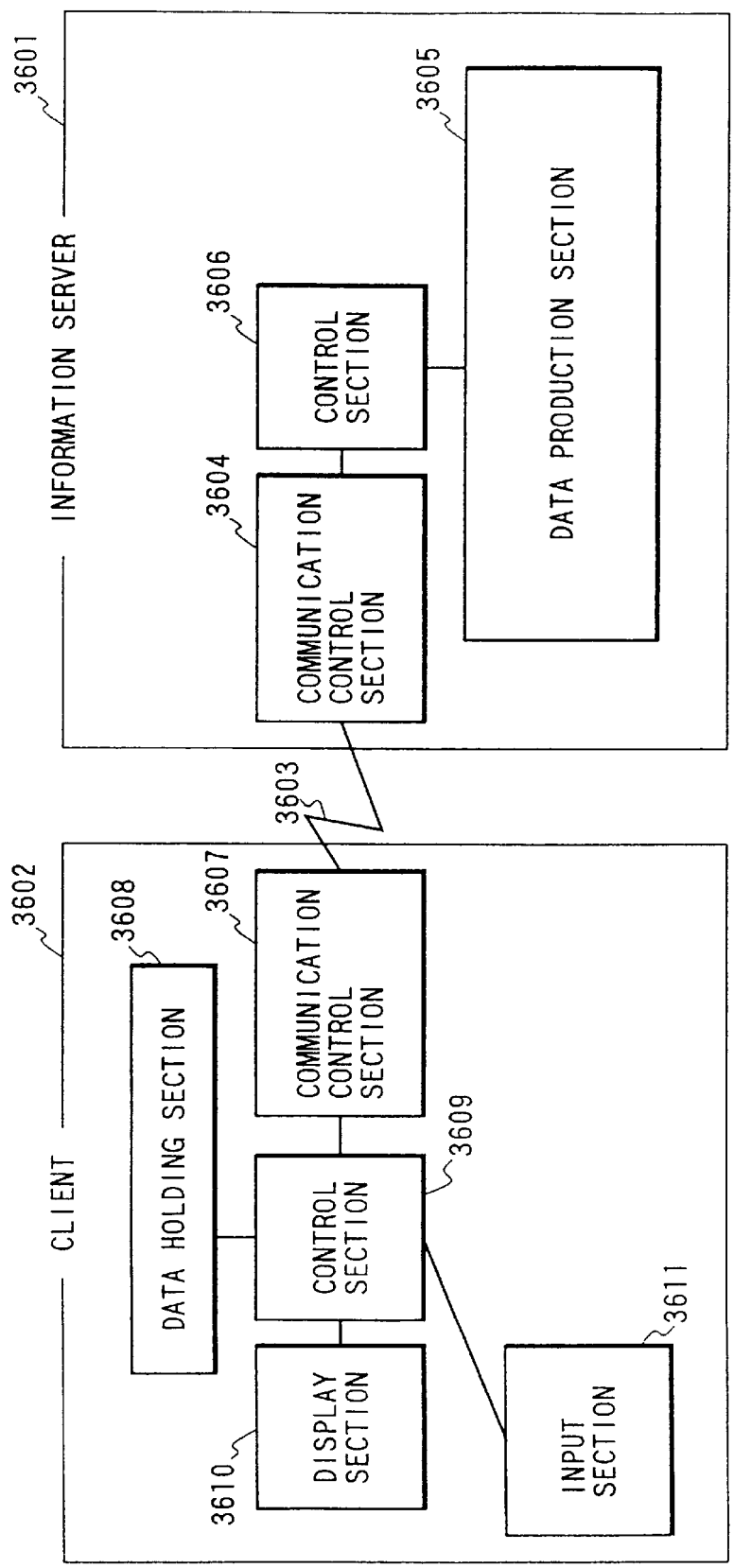
FIG. 36 shows an arrangement of a prior information distribution system.
Figure 37:
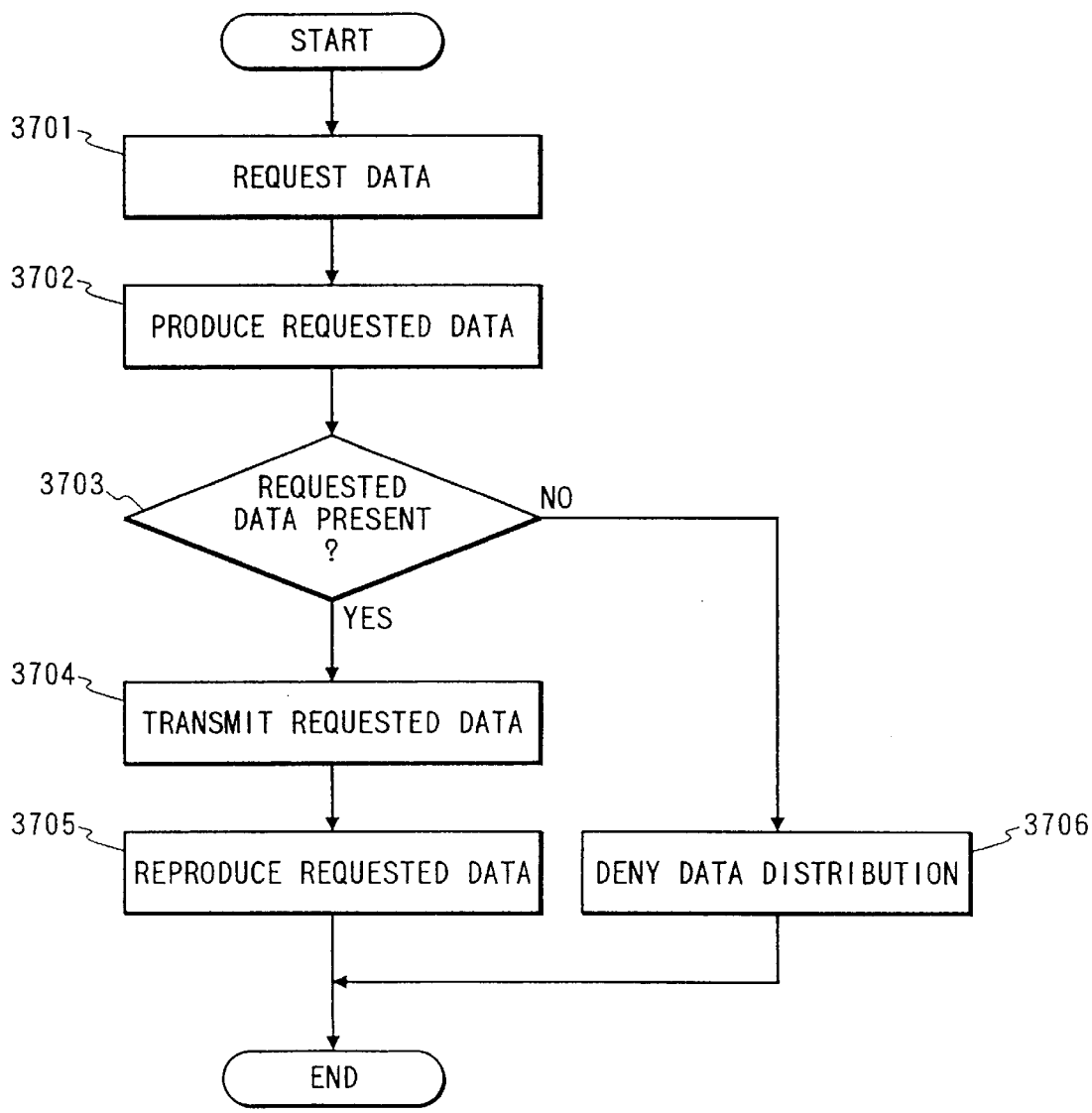
FIG. 37 is a flow chart showing an operation of the FIG. 36 prior information distribution system.
Figure 38:
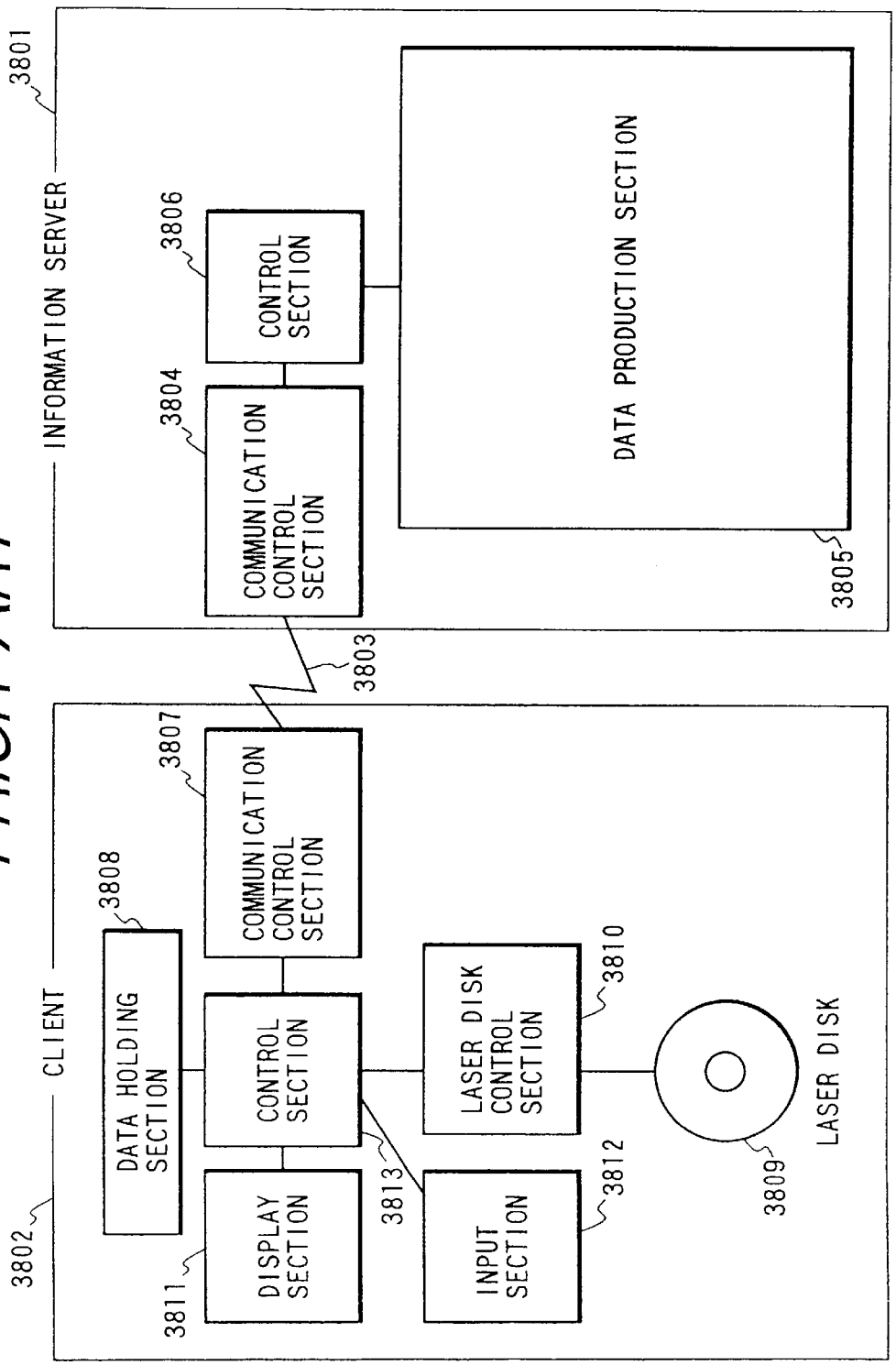
FIG. 38 illustrates an arrangement of another prior information distribution system.

Furthermore, a description will be made hereinbelow of a flow taken for when the client D 204 not having the arrangement as shown in FIG. 1 makes a request for the data "Izu Heights. html" to the information server 101. Let it be assumed that the client D 204 has an arrangement as shown in FIG. 5. In FIG. 5, the client D 204 comprises a communication control section for controlling the communication with the network 103, a data holding section 502 for holding data, a display section 504 for displaying various data and messages toward the user, an input section 505 for accepting an input made by the user, and a control section 503 for controlling the communication control section 501, the data holding section 502, the display section 504 and the input section 505, with the client D 204 having a typical arrangement of the client of the FIG. 36 prior data distribution system.

In the client D 204 thus arranged, the user first uses the input section 505 to give instructions to the client D 204 to obtain the data "Izu Heights. html" from the information server 101, so that the control section 503 thereof gives instructions to the communication control section 501 to request the data "Izu Heights. html" from the information server 101. The communication control section 501 transmits through the network 103 the request for the data "Izu Heights. html" from the information server 101. At this time, since the client D 204 is not equipped with the arrangement according to this invention (has a prior arrangement), the information indicative of the arrangement according to this invention is not delivered as the auxiliary information to the information server 101.

In the information server 101, the communication control section 104 first receives the data request and the auxiliary information from the client D 204 side and hands them over to the control section 106. The control section 106 decides, on the basis of the received auxiliary information, whether or not the client D 204 is a client with the arrangement according to this invention, i.e., the corresponding client (step 402). In this case, since the client D 204 is not the corresponding client, in FIG. 4 the control goes to the operations of the step 410 and the following steps. For this reason, the data selection section 108 searches for the standard data corresponding to the requested data "Izu Heights, html" by referring to the data selection table (Table 3), so that the data "Izu Heights 0, html" is attainable (step 410).

As well as the case of the client C 203, the data "Izu Heights 0, html" is selected and, together with the image data "Hotel A Simplicity. mpg" and "Hotel B Simplicity. mpg" are transmitted to the client D 204 (steps 411, 412, 408). Further, like the client C 203 the client D 204 reproduces the given data. In this case, the image data "Hotel A Simplicity. mpg" sent through the network 103 is reproduced at the reproduction of the description of the hotel A, and the image data "Hotel B Simplicity. mpg" sent through the network 103 is also reproduced in the reproduction of the description section for the hotel B (step 409).

As described above, in cases where the client D 204 having no arrangement according to this invention requests the data "Izu Heights. html" from the information server 101, the image data "Hotel A Simplicity. mpg" and "Hotel B Simplicity. mpg" are transmitted from the information server 101 through the network 103 to the client D 204.

Although in the above-mentioned examples the description has been made of the case that the decision result of the step 411 of the flow chart of FIG. 4 shows the presence of the standard data, if there is no standard data, the operational flow goes to a step 413 where the information server 101 transmits the information representative of the rejection of the data distribution to the client which makes a request for the data.

From the above description, according to this embodiment, when the information server having the arrangement according to this invention performs the information distribution through the network, if the client with the arrangement according to this invention includes a specific data retaining medium, the data in the data retaining medium is used, so that a large amount of data such as a motion picture is not supplied to the client through the network but the data equivalent to the requested data is given, with the result that the information including a large amount of data such as a motion picture is effectively distributable. In addition, even if the client with the arrangement according this invention is not equipped with a specific data retaining medium, when the information server side prepares the standard data, the distribution of the standard data is possible. Moreover, even if the client is not provided with the arrangement according to this invention, when the information server side has the standard data, the distribution of the standard data is also possible.

Although in the description of this embodiment the CD-ROM is used as a portable data retaining medium, in this invention the portable data retaining medium is not always limited to the CD-ROM, and for example a DVD, an MD, a removable hard disk and so on are applicable. Further, it is also possible that a different kind of data retaining medium is used at every client. Still further, although in this embodiment the system includes the display section 113 and the input section 114, since the system is not limited to the case that the client directly makes conversation with the user, the display section 113 and the input section 114 is not essential. Although in this embodiment the data selection section 108 selects the data through the use of its selection table (Table 4), the data selection in this invention is not necessarily limited to the use of a selection table, any method is acceptable as long as the data to be actually offered is specified on the basis of the request data name and the title of the data retaining medium the client includes. Moreover, when the data selection section 108 selects data, it is also possible to use other information such as the user name of the client 102 in addition to the information on the situation of the data retaining medium control section 112 of the client 102, when necessary.

Furthermore, although in this embodiment the information server 101 distributes the same standard data if possible in cases where the client receiving the data does not have the FIG. 1 arrangement, when the client 102 does not include the CD-ROM 111, or when the client 102 has a CD-ROM other than a specific CD-ROM, the embodiments of this invention is not necessarily limited thereto, and the information server 101 can also provide different data in the case that the client 102 is not equipped with a data retaining medium or the client 102 is provided with a data retaining medium other than a specific data retaining medium. In addition, although in this embodiment the image data in the CD-ROM 111 the client 102 has is put to use, the data in the data retaining medium used is not necessarily limited to the image data. Further, although in this embodiment the client 102 having the arrangement according to this invention additionally supplies the information indicative of the possession of the arrangement according to this invention to the information server 101 when requesting the data therefrom, it is also possible to render services on the condition that all the clients which have access to the information server 101. In this case, there is no need for the client 102 to send to the information server 101 the information representative of the possession of the arrangement according to this invention. Still further, although in this embodiment the client 102 has a single CD-ROM control section to control a single CD-ROM, this invention is not limited to the single control section and the single CD-ROM, but being applicable to an arrangement including a plurality of CD-ROM control sections and a plurality of CD-ROMs. In addition, although in this embodiment the information server simultaneously sends the necessary image data when transmitting the corresponding data or the standard data to the client, the information server can also send the image data at a point of time of being necessary when the client side reproduces the corresponding data or the standard data.

Moreover, although in this embodiment the client reproduces the data in its data retaining medium in place of the information server sending the specific data to the client, for the actual use it is also possible to use the data in the data retaining medium of the client in a different way. For example, it is also possible that the data in the data retaining medium the client possesses is displayed to the user while the information server transmits the specific data through the network to the client. In this case, the data displayed to the user may directly relates to the data the user requests or may be data which is not directly concerned therewith. For example, let it be assumed that, for example, in this embodiment the CD-ROM "95 Nationwide Hot Spring Inn" includes the image data "Izu Heights Pension Hamlet. mpg" about a pension hamlet existing in the Izu Heights. At this time, in place of the data "Izu heights 1. html" as shown in (b) of FIG. 3 the data "Izu heights 1'. html" as shown in (d) of FIG. 3 is given to the client B 203, and the data "Izu Heights Pension Hamlet. mpg" is reproduced while the client receives the data "Hotel B Simplicity. mpg" from the information server 101. Accordingly, the distribution of the data "Izu Heights Pension Hamlet. mpg" the user needs is possible while transmitting the data "Hotel B Simplicity. mpg", with the result that the waiting time required for the data transmission through the network is effectively serviceable.

Second Embodiment

Secondly, a description will be made hereinbelow of a second embodiment of the present invention. This embodiment uses an information server 601 with an arrangement shown in FIG. 6 instead of the aforesaid information server 101 according to the first embodiment. Thus, an information distribution system according to this second embodiment comprises the information server 601, a client 602 equal in arrangement and operation to the client 102 in the first embodiment, and a network 603 for establishing the connection between the information server 601 and the client 602. The information server 601 is composed of a communication control section 604 for controlling the communication with the network 603, a data production section 605 for producing and obtaining data to be distributed, and a control section for taking care of the control of the communication control section 604 and the data production section 605. Further, the data production section 605 is equipped with a data holding section 607 for holding a set of data which are the originals of data to be distributed, and a data substitution section 608 for the conversion or replacement of the data in the data holding section 607.

On the other hand, the client 602 has the same arrangement as that of the client 102 of the first embodiment and performs the same operation as that thereof, and comprises a communication control section 609 for controlling the communication with the network 603, a data holding section 610 for holding data, a CD-ROM 611 being a portable large capacity data retaining medium, a CD-ROM control section 612 for controlling the CD-ROM 611, a display section 613 for displaying various data and messages to the user, an input section 614 for accepting an input made by the user, and a control section 615 for taking charge of the control of the communication control section 609, the data holding section 610, the data retaining medium control section 612, the display section 613 and the input section 614.

Figure 6:
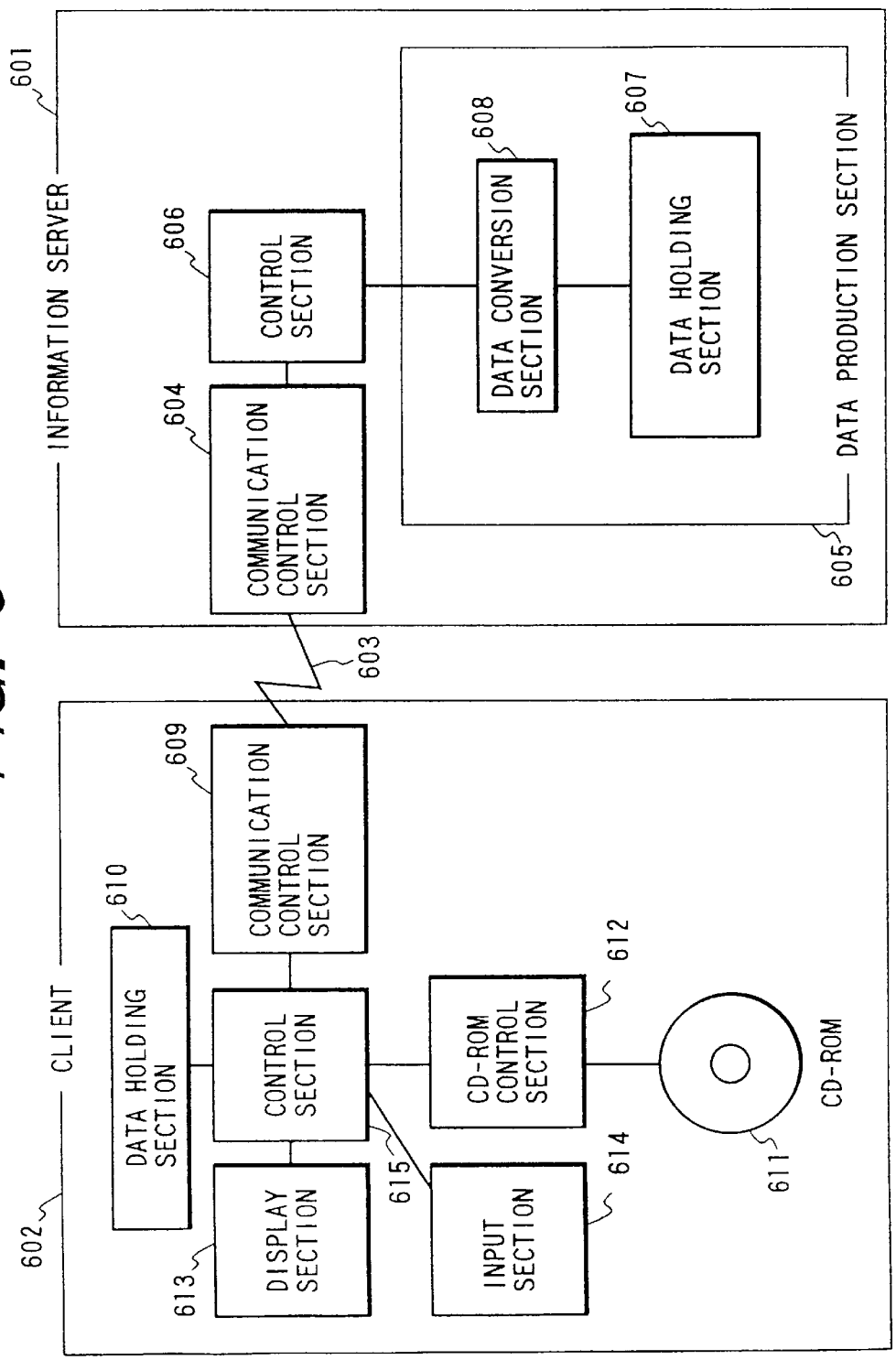
FIG. 6 is an illustration of an arrangement of an information distribution system according to a second embodiment of the present invention.
Figure 7:
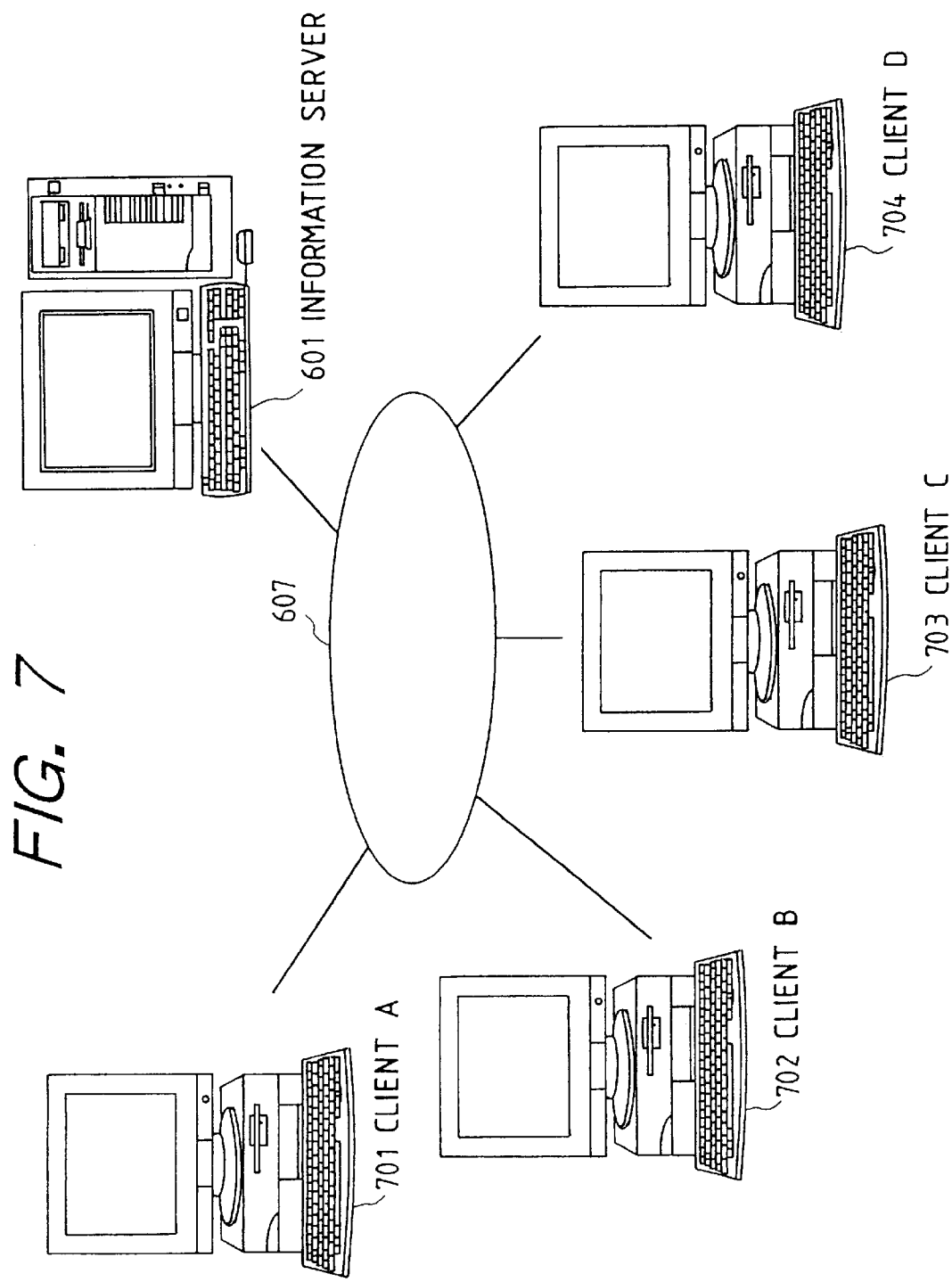
FIG. 7 is an illustration of an arrangement of the information distribution system according to the second embodiment using a network.

An operation of this embodiment will be described hereinbelow with reference to FIGS. 6 to 10, FIG. 5 and Tables 5, 2 and 4. FIG. 7 shows the whole arrangement of the information distribution system according to this embodiment. In the same illustration, there are shown the information server 601 for offering information and clients 701 to 703 each having the arrangement as shown in FIG. 6. On the other hand, this system includes a client 704 with no arrangement shown in FIG. 6, through which a description will be taken of an operation for the client not having the FIG. 6 arrangement. The network 603 makes connections between the information server 601 and the clients 701 to 704. For description, let it be assumed that the selection data holding section 607 of the information server 601 retains a file "Izu Heights. src" which is a candidate for the data file originating the data to be actually offered in relation to the data name "Izu heights. html" as shown in Table 5.

TABLE 5

| Data Name | Conversion Data File |
| --- | --- |
| Izu Heights. html | Izu Heights. src |
| Atami. html | Atami. src |
| ● ● ● | ● ● ● |

In the description of this embodiment, the data for producing the data to be actually offered will be referred hereinafter to as conversion data, and the file including this substitution data will be referred hereinafter to as a data file for conversion. The data holding section 607 contains a table like the Table 5 in which the data name and the conversion data file are in a corresponding relation to each other. In addition, the data file "Izu Heights. src" has the contents as shown in FIG. 8. A detailed description will here be made of the contents of the data file "Izu Heights. src". In the data file "Izu Heights. src" shown in FIG. 8 there is included "<SWITCH>. . .</SWITCH>", which is a portion undergoing conversion when the data conversion section 608 of the information server 601 replaces the data. When the title of the data retaining medium 611 the client 602 possesses is generally "XXX", if "<CASEXXX>" is written, the portion between the "<CASEXXX>" and the first "<BREAK>" is substituted for "<SWITCH>. . . </SWITCH>". Further, when "<CASEXXX>" is not written, the portion between "<DEFAULT>" and "</SWITCH>" is substituted for "<SWITCH>. . . </SWITCH>". For example, when the data conversion section 608 of the information server 601 performs the conversion of the data file "Izu Heights. src" shown in FIG. 8, if the title of the data retaining medium 611 the client 602 possesses is "95 Nationwide Hot Spring Inn", "<SWITCH>. . . </SWITCH>" written about the hotel A is replaced with "<CD-ROM="95 Nationwide Hot Spring Inn", FILE="Hotel B Standard. mpg">", while "<SWITCH>. . . </SWITCH>" written about the hotel B is replaced with "<SRC="Hotel B Simplicity. mpg">.

As well as the first embodiment, let it be assumed that, in this embodiment, as shown in Table 4 the client A 701 in FIG. 7 is equipped with a CD-ROM whose title is "96 Nationwide Hot Spring Inn" and the client B 702 is provided with a CD-ROM whose title is "95 Nationwide Hot Spring Inn", while the client C 703 does not include a CD-ROM. Further, as well as the first embodiment, in this embodiment, as shown in Table 2 the CD-ROM titled "96 Nationwide Hot Spring Inn" has both the data"Hotel A Standard. mpg" and "Hotel B Standard. mpg" while the CD-ROM titled "95 Nationwide Hot Spring Inn" has the data"Hotel A Standard. mpg" but not having the data "Hotel B Standard. mpg". Still further, the data "Hotel A Simplicity. mpg" is simple image data about the hotel A, which is retained in the data holding section 707 of the information server 601 and is derived therefrom by the data conversion section 607. The data "Hotel B Simplicity. mpg" is treated in a similar way. The data "Hotel A Standard. mpg" is the image data about the hotel A which is higher in image quality and more in contents than the data "Hotel A Simplicity. mpg" to improve its appeal. The data "Hotel B Standard. mpg" has a similar feature.

Figure 9:
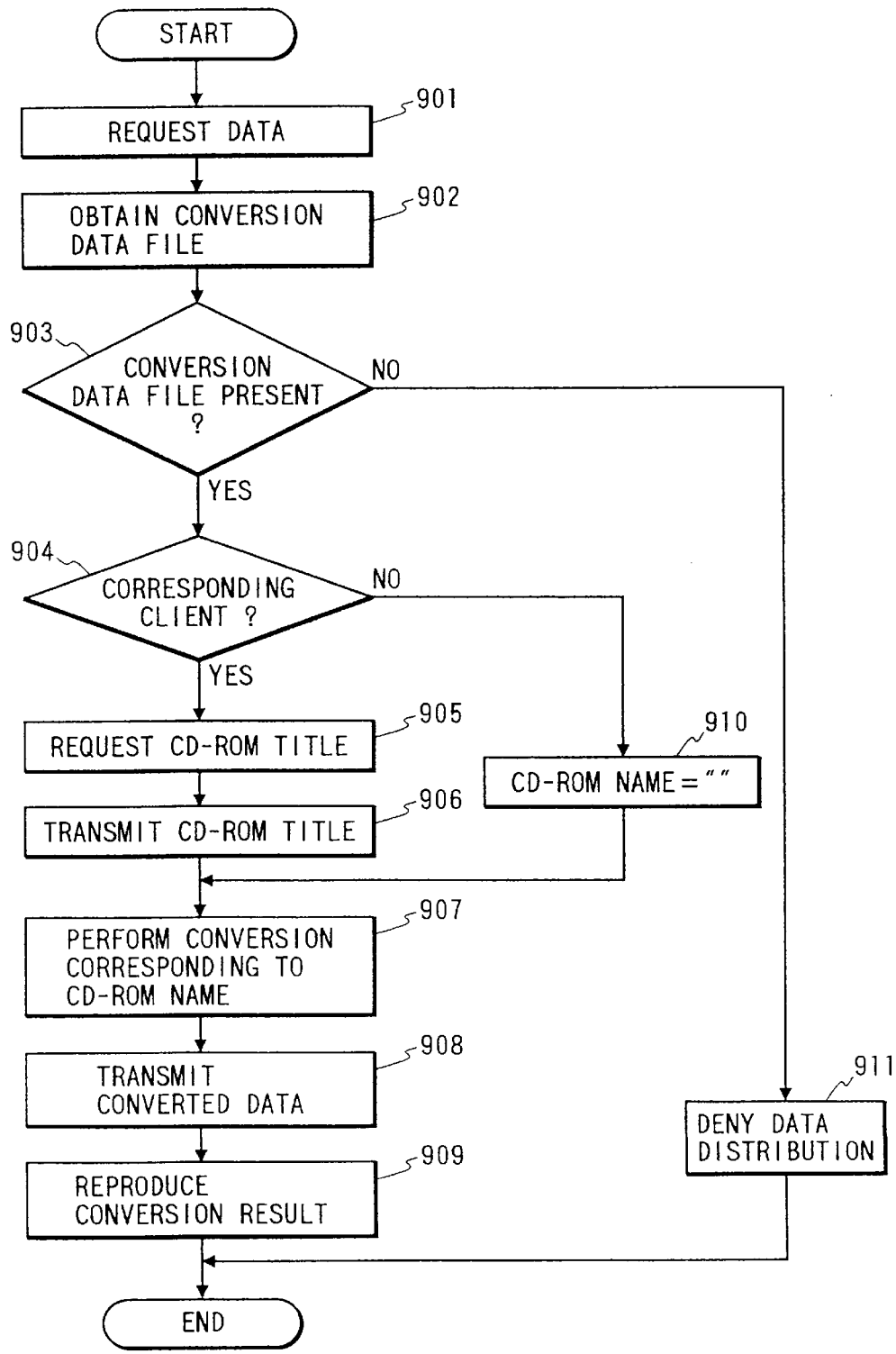
FIG. 9 is a flow chart showing an operation of the information distribution system according to the second embodiment.

Referring to FIG. 9, a description will be taken hereinbelow of the operational flows taken in the case that the clients A 701, B 702 and C 703 receive the data named "Izu Heights, html" from the information server 601. The description will begin with the flow taken when the client A 701 accepts the data named "Izu Heights, html" from the information server 601. First of all, the user uses the input section 614 to give instructions to the client A 701 to obtain the data "Izu Heights, html" from the information server 601. In the same way as the first embodiment, the client A 701 transmits a request through the network 603 to the information server 601 to obtain the data "Izu Heights, html" from the information server 601 (step 901). At this time, the client A 701 additionally sends as the auxiliary information the information indicative of the possession of the arrangement according to this invention. In the description of this embodiment, the client having the arrangement according to this invention will be referred hereinafter to as a corresponding client.

In the information server 601, the communication control section 604 accepts the data request and the auxiliary information sent from the client A 701 and delivers them to the control section 606. The control section 606 conveys the data request to the data conversion section 608 which in turn, obtains the conversion data file corresponding to the given data request through the use of the corresponding table between the data to be offered and the conversion data file, held therein and then informs the control section 606 of the result obtained (step 902). In this case, since the conversion data file "Izu Heights. src" is attained in relation to the requested data "Izu Heights. html" (step 903), the control advances to a step 904 and the following steps in FIG. 9. Subsequently, the control section 606 decides, on the basis of the accepted auxiliary information, whether or not the client A 701 is the corresponding client (step 904). In this instance, the client A 701 is the corresponding client and, hence, the operational flow proceeds to a step 905 and the following steps. Thereafter, the control section 606 gives instructions to the communication control section 604 to make a request to the client A 701 so that the client A 701 transmits to the information server 601 the title of the CD-ROM 611 currently put in the CD-ROM control section 612 as the situation of the CD-ROM control section 612. In response to the instructions, the communication control section 604 sends the request through the network 603 to the client A 701 so that the title of the CD-ROM 611 currently put in the CD-ROM control section 612 of the client A 701 is transmitted to the information server 601 (step 905).

As well as the first embodiment, the client A 701 sends the title of the CD-ROM 611 currently put in the CD-ROM control section 612 through the network 603 to the information server 601. In this case, since the CD-ROM titled "96 Nationwide Hot Spring Inn" is mounted therein, that title is transmitted thereto. On the other hand, in the information server 601 the communication control section 604 receives the information on the title of the CD-ROM 611 put in the CD-ROM control section 612 from the client A 701 and conveys it to the control section 606 which in turn, delivers the same information to the data conversion section 607 (step 906). Subsequently, the data conversion 607 makes the conversion of the conversion data file on the basis of the received CD-ROM title and delivers the conversion result to the control section 606 (step 907). In this case, a conversion is made of the FIG. 8 conversion data file "Izu heights. src" under the condition of the title of the CD-ROM the client has is "96 Nationwide Hot Spring", thus resulting in the data as shown in (c) of FIG. 10. This data is similar in contents to the data "Izu Heights 2. html" in the first embodiment.

As well as the first embodiment the control section 606 uses the communication control section 604 to transmit the obtained data ((c) of FIG. 10) through the network 603 to the client A 701. At this time, since in this data there is not written a control code for using the image data "Hotel A Simplicity. mpg" and "Hotel B Simplicity. mpg", these image data do not come into the transmitted condition (step 908). As well as the first embodiment the client A 701 reproduces the data it receives. Since the data as shown in (c) of FIG. 10 is similar in contents to the data "Izu Heights 2. html" in the first embodiment, as in the case of the client A 201 in the first embodiment, the data "Hotel A Standard. mpg" and "Hotel B Standard. mpg" are reproduced from the CD-ROM 611 (step 908).

As described above, in cases where the client A 701 equipped with the CD-ROM "96 Nationwide Hot Spring Inn" requests the data "Izu Heights. html" from the information server 601, the image data "Hotel A Simplicity. mpg" and "Hotel B Simplicity. mpg" are not transmitted through the network 603 while the image data "Hotel A Standard. mpg" and "Hotel B Standard. mpg" higher in appeal and existing in the CD-ROM the client A 701 possesses are instead used at the data reproduction.

Furthermore, a description will be taken hereinbelow of a flow taken for when the client B 702 receives the data "Izu Heights. html" from the information server 601. As well as the case of the client A 701, the communication between the client B 702 and the information server 601 is made in the operation up to the step 904 in FIG. 9, and the information server 601 delivers a request to the client B 702 so that the client B 702 sends the title of the CD-ROM 611 put in the CD-ROM control section 612 to the information server 601 (step 905). As well as the client A 701, the client B 702 is responsive to that request to send the title of the CD-ROM 611 currently put in the CD-ROM control section 612. In this case, since the CD-ROM named "95 Nationwide Hot Spring Inn" is put therein, that title is transmitted to the information server 601 (step 906). Subsequently, as in the case of the client A 701, the data conversion section 607 makes the conversion of the conversion data file "Izu Heights. src" (FIG. 8) on the basis of the title of the CD-ROM and communicates the conversion result to the control section 606 (step 907). In this instance, since the conversion is made under the condition that "the title of the CD-ROM the client has is "95 Nationwide Hot Spring Inn", the conversion result comes to the data as shown in (b) of FIG. 10. This data is the same in contents as the data "Izu Heights 1. html" in the first embodiment.

As well as the first embodiment, the control section 606 uses the communication control section 604 to transmit the obtained data ((b) of FIG. 10) through the network 603 to the client B 702. At this time, since in this data there is written a control code for using the image data "Hotel B Simplicity. mpg" the information server 601 retains, the data "Hotel B Simplicity. mpg" is derived through the data conversion section 608 from the data holding section 607 and, together with the aforesaid data, delivered to the control section 606 to be transmitted through the communication control section 604 to the client B 702. Since a control code is not written for the use of the data "Hotel A Simplicity. mpg", the data transmission does not take place (step 908). In the client B 702, as well as the client A 701 the data given undergoes the reproduction. In this case, the image data "Hotel B Simplicity. mpg" sent through the network 603 is reproduced at the reproduction of the description section for the hotel B. On the other hand, as in the case of the client A 701, the data "Hotel A Standard. mpg" in the CD-ROM 611 named "95 Nationwide Hot Spring Inn" the client B 702 has is reproduced in the reproduction of the description section for the hotel A (step 909).

As described above, in cases where the client B 702 having the CD-ROM "95 Nationwide Hot Spring Inn" requests the data "Izu Heights. html" from the information server 601, the image data "Hotel A Simplicity. mpg" is not sent from the information server 601 through the network 603 to the client B 702, but the image data "Hotel A Standard. mpg" existing in the aforesaid CD-ROM of the client B 702 and higher in appeal is used instead. However, the image data "Hotel B Simplicity. mpg" is transmitted from the information server 601 through the network 603 to the client B 702.

Moreover, a description will be taken hereinbelow of a flow taken for when the client C 703 receives the data "Izu Heights. html" from the information server 601. As well as the client A 701, the communication between the client C 703 and the information server 601 is made in the operations up to the steps 905 in FIG. 9. The information server 601 makes a request to the client C 703 so that the title of the CD-ROM 611 currently put in the CD-ROM control section 612 of the client C 703 is transmitted thereto (steps 901, 902, 903, 904 and 905). As well as the client A 701, the client C 703 tries to send the title of the CD-ROM currently mounted in the CD-ROM control section 612 to the information server 601. However, since in this case there is no CD-ROM therein, the transmission of a letter-absent train arises (step 906). Subsequently, as in the case of the client A 701, the data conversion section 607 makes a conversion of the conversion data file "Izu Heights. src" (see FIG. 8) on the basis of the CD-ROM title received and communicates the conversion result to the control section 606 (step 907). However, since in this case the letter-absent train is sent as the CD-ROM title, the conversion is made under the condition that "the title of the CD-ROM the client has is . . . ", thus resulting in the data as shown in (a) of FIG. 10. This data is the same in contents as the data "Izu Heights 0. html" in the first embodiment.

As well as the first embodiment, the control section 606 uses the communication control section 604 to transmit the obtained data (a) of FIG. 10) through the network 603 to the client C 703. At this time, since in this data there is written a control code for using the image data "Hotel A Simplicity. mpg" and "Hotel B Simplicity. mpg" the information server 601 retains, these image data are also delivered to the client C 703 (step 908). In the client C 703 the data given is reproduced as in the case of the client A 701. In this instance, the image data "Hotel A Simplicity. mpg" sent through the network 603 is reproduced in the reproduction of the description section for the hotel A, and the data "Hotel B Simplicity. mpg" is likewise reproduced in the reproduction of the description section for the hotel B.

As mentioned above, in cases where the client C 703 with no CD-ROM makes a request for the data "Izu Heights. html" to the information server 601, the image data "Hotel A Simplicity. mpg" and "Hotel B Simplicity. mpg" are fed from the information server 601 through the network 603 to the client C 703.

Still further, a description will be taken hereinbelow of a flow taken for when the client D 704 not having the arrangement as shown in FIG. 6 receives the data "Izu heights. html" from the information server 601. The client D 704 includes the same arrangement as that of the client 204 described in the first embodiment, that is, it has the arrangement as shown in FIG. 5 and conducts the same operation. As well as the first embodiment, the client D 704 having this arrangement issues a request for the data "Izu heights. html" toward the information server 601. Since the client D 704 is not equipped with the arrangement according to this invention, the information representative of the possession of the arrangement according to this invention is not transmitted as the auxiliary information to the information server 601 (step 901). As well as the case of the client A 701, the information server 601 conducts the operations up to the step 909 in FIG. 9. Since in this case the client D 704 does not fall under a corresponding client, the operational flow goes from the decision step 904 to a step 910 side (steps 902, 903, and 904). In the step 910, the control section 606 of the information server 601 makes a letter-absent train for the CD-ROM name of the client.

Subsequently, as in the case of the client A 701, the data conversion section 607 carries out the conversion of the conversion data file "Izu Heights. src" (see FIG. 8) on the basis of the CD-ROM title received and conveys the conversion result to the control section 606. As well as the case of the client C 703, the conversion result comes to the data as shown in (a) of FIG. 10 and is similar in contents to the data "Izu heights 0. html" in the first embodiment (step 907). Thereafter, like the case of the client C 703, this data and the image data "Hotel A. html" and "Hotel B. html" are sent to the client D 704 (step 908), and reproduced therein. Also in this case, the image data "Hotel A Simplicity. mpg" sent through the network 603 is reproduced in the reproduction of the description section for the hotel A, while the data "Hotel B Simplicity. mpg" is similarly reproduced in the reproduction of the description section for the hotel B (step 909).

As mentioned before, in cases where the client D 704 not having the arrangement according to this invention issues a request for the data "Izu heights. html" to the information server 601, the image data "Hotel A Simplicity. mpg" and "Hotel B Simplicity. mpg" are transmitted from the information server 601 through the network 603 to the client D 704.

As described before, according to this embodiment, when the information server with the arrangement according to this invention carries out the information distribution through the network, if the client with the arrangement according to this invention is equipped with a specific data retaining medium, it is possible to provide the data corresponding to the requested data through the use of the data in the data retaining medium without sending a large amount of data such as a motion picture through the network, which can effectively distribute the large amount of data such as the motion picture. Further, even in cases where the client with the arrangement according to this invention is not equipped with a specific data retaining medium, if the standard data exists, then the distribution of this data is possible. Still further, according to this embodiment, if at least one conversion data exists for the data to be offered, then its service are possible, and unlike the first embodiment of this invention there is no need to prepare a plurality of data files to be given, and hence it is also possible to save the storage unit such as a hard disk in the information server. In this invention the data conversion method is not limited to that as described in the above embodiments, and it is also possible to use a substitute table or realize the conversion through a filter program as long as the conversion is made on the basis of at least the information about the state of the data retaining medium control section of the client.

Furthermore, when the data conversion section 608 conducts the data conversion, in addition to the name of the data under distribution and the information on the situation of the data retaining medium control section of the client 602 which receives the information, the other information such as a user's name of the client 602 can be added if necessary. Further, although in the aforesaid embodiment the data production section 605 of the information server 601 is made to always return any data, it is also possible that, if the client 602 does not have the specific data retaining medium or if the client does not have the arrangement according to this invention, the information server 601 denies the data distribution. Still further, it is not required to coincide the processing taken for when the client 602 is not equipped with the specific data retaining medium with the processing taken for when the client does not have the arrangement according to this invention, and different results from these cases are acceptable.

Third Embodiment

Moreover, a description will be made hereinbelow of a third embodiment of the present invention. This embodiment employs an information server 1101 as shown in FIG. 11 in place of the information server 101 in the first embodiment of this invention. The information distribution system according to this third embodiment comprises this information server 1101, a client 1102 having the same arrangement as that of the client 102 in the first embodiment, and a network 1103 for establishing connection between the information server 1101 and the client 1102. The information server 1101 is composed of a communication control section 1104 for controlling the communication with the network 1103, a data production section 1105 for producing and obtaining data to be offered, and a control section for controlling the communication control section 1104 and the data production section 1106. Further, the data production section 1105 is equipped with a data holding section 1107 for holding a set of data creating the data to be offered, a data selection section 1108 for selecting the data in the data holding section 1107, and a data conversion section 1109 for converting the selected data. The client 1102 has the same arrangement as that of the client 102 in the first embodiment, and is composed of a communication control section 1110 for controlling the communication with the network 1103, a data holding section 1111 for holding data, a CD-ROM 1112 being a portable large capacity data retaining medium, a CD-ROM control section 1113 for controlling the CD-ROM 1112, a display section 1114 for displaying various data and messages to the user, an input section 1115 for accepting an input made by the user, and a control section 1116 for controlling the communication control section 1110, the data holding section 1111, the data retaining medium control section 1113, the display section 1114 and the input section 1115.

Figure 12:
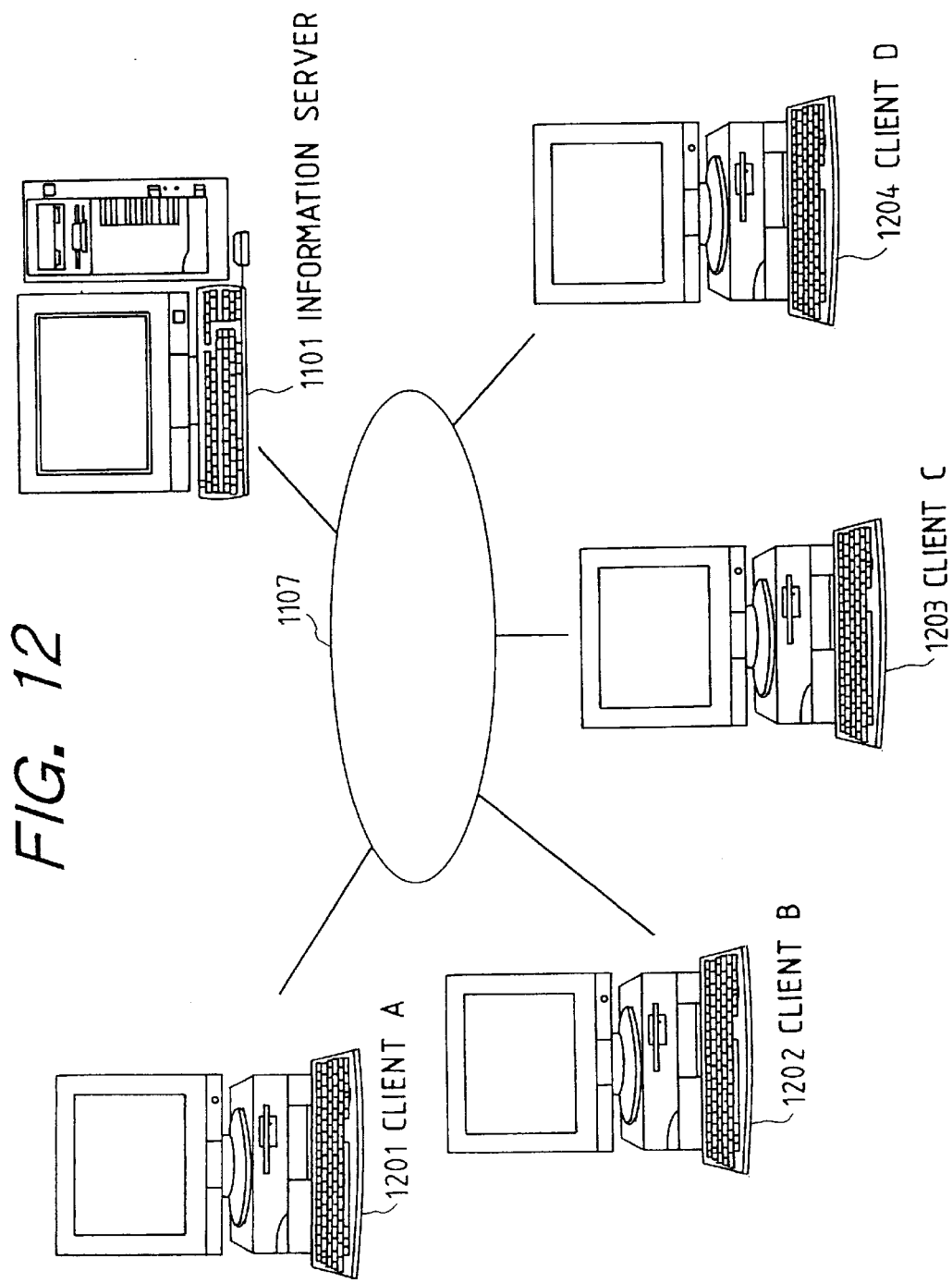
FIG. 12 is an illustration of an arrangement of the information distribution system according to the third embodiment using a network.

A description will be made hereinbelow of an operation of this embodiment with reference to FIGS. 11 to 15, FIGS. 5, 9 and 10, and Tables 6, 7, 2 and 4. FIG. 12 shows the whole arrangement of this embodiment using the network. In the illustration, numeral 1101 represents the information server 1101 for carrying out the information distribution and numerals 1202 to 1203 designate clients each having the arrangement as shown in FIG. 11. Numeral 1204 depicts a client not having the arrangement as shown in FIG. 11, which is used for describing the operation for the client with no FIG. 11 arrangement. Further, numeral 1107 denotes a network for making connection between the information server 1101 and the clients 1201 to 1204. Let it be assumed that the data holding section 1107 of the information server 1101 holds the data "Izu Heights 2. src", "Izu Heights 1. src" and "Izu Heights 0. src" as the conversion data creating the data to be actually offered in relation to the data name "Izu Heights. html" as shown in Table 6.

TABLE 6

| Data Name | Candidate for Conversion Data |
| --- | --- |
| Izu Heights. html | Izu Heights 2. src, Izu Heights 1. src and, Izu Heights 0. src |
| Atami. html | Atami 2. src, Atami 1. src, Atami 0. html |
| ● ● ● | ● ● ● |

Furthermore, these data include the contents as shown in (a), (b) and (c) of FIG. 13.

A detailed description will be taken hereinbelow of the contents of the data as shown in (a), (b) and (c) of FIG. 13. The data file "Izu Heights 0. src" shown in (a) of FIG. 13 includes <SRC="Hotel A Simplicity. mpg"> in the description section on the hotel A, which is a control code for, when the client 1102 reproduces this data, giving instructions to the client 1102 to reproduce the data "Hotel A Simplicity. mpg" of the information server 1101 in the description section on the hotel A. The data "Hotel A Simplicity. mpg" comes under simple data on the hotel A, which is retained in the data holding section 1107 of the information server 1101. Further, when the information server 1101 gives the data including the mention "<SRC="Hotel A Simplicity. mpg"> to the client 1102, the data "Hotel A Simplicity. mpg" is made to be additionally sent through the network 1103 to the client 1102. The data "Hotel B Simplicity. mpg" is treated in like manner.

The data file "Izu Heights 1. src" as shown in (b) of FIG. 13 includes <CD-ROM=$__, FILE="Hotel A Standard. mpg"> in the description section for the hotel A. This is a portion undergoing the conversion when the data conversion section 1109 of the information server 1101 performs the conversion, and the portion of "$__" is replaced with the title of the CD-ROM 1112 of the client 1102 which receives the information. For example, when the data conversion section 1109 makes the conversion of the data file "Izu Heights 1. src", if the title of the CD-ROM 1112 of the client 1102 is "96 Nationwide Hot Spring Inn", the portion of <CD-ROM= $__, FILE="Hotel A Standard. mpg"> in that data results in <CD-ROM="96 Nationwide Hot Spring Inn", FILE="Hotel A Standard, mpg">. The portion on "Hotel B Simplicity. mpg" is treated like "Izu Heights 0. src". Further, in the data file "Izu heights 2. src" as shown in (c) of FIG. 13, <CD-ROM="$__", FILE=Hotel A Standard. mpg"> and <CD-ROM="$__", FILE="Hotel B Standard. mpg"> are treated in like manner. The data "Hotel A Simplicity. mpg" falls under the simple image data on the hotel A and is held in the data holding section 1107 and derived by the data conversion section 1108. The data "Hotel B Simplicity. mpg" is treated in a similar way. Still further, the data Hotel A Standard. mpg" is the image data on the Hotel A and higher in image quality and richer in contents than the data "Hotel A Simplicity. mpg" to provide a higher appeal. The data "Hotel B Standard. mpg" is also similar.

As well as the first embodiment of this invention, also in this embodiment, as shown Table 2 the CD-ROM named "96 Nationwide Hot Spring Inn" stores both the data "Hotel A Standard. mpg" and "Hotel B Standard. mpg", while the CD-ROM named "95 Nationwide Hot Spring Inn" stores the data "Hotel A Standard. mpg" but not storing the data "Hotel B Standard. mpg". Further, the data selection section 1108 of the information server 1101 has a table for the contents of various CD-ROMs which is equivalent to Table 2 therein. Still further, the information server 1101 contains a conversion data selection table as shown in Table 7.

TABLE 7

| Data Name | CD-ROM Contents | | Conversion Data File |
|---|---|---|---|
| Izu Heights. html | "Hotel A Standard. mpg" Present | "Hotel B Standard. mpg" Present | Izu Heights 2. src |
| Izu Heights. html | "Hotel A Standard. mpg" Present | "Hotel B Standard. mpg" Absent | Izu Heights 1. src |
| Izu Heights. html | "Hotel A Standard. mpg" Absent | "Hotel B Standard. mpg" Absent | Izu Heights 0. src |
| Atami. html ••• | ••• ••• | ••• ••• | ••• ••• |

Figure 14:
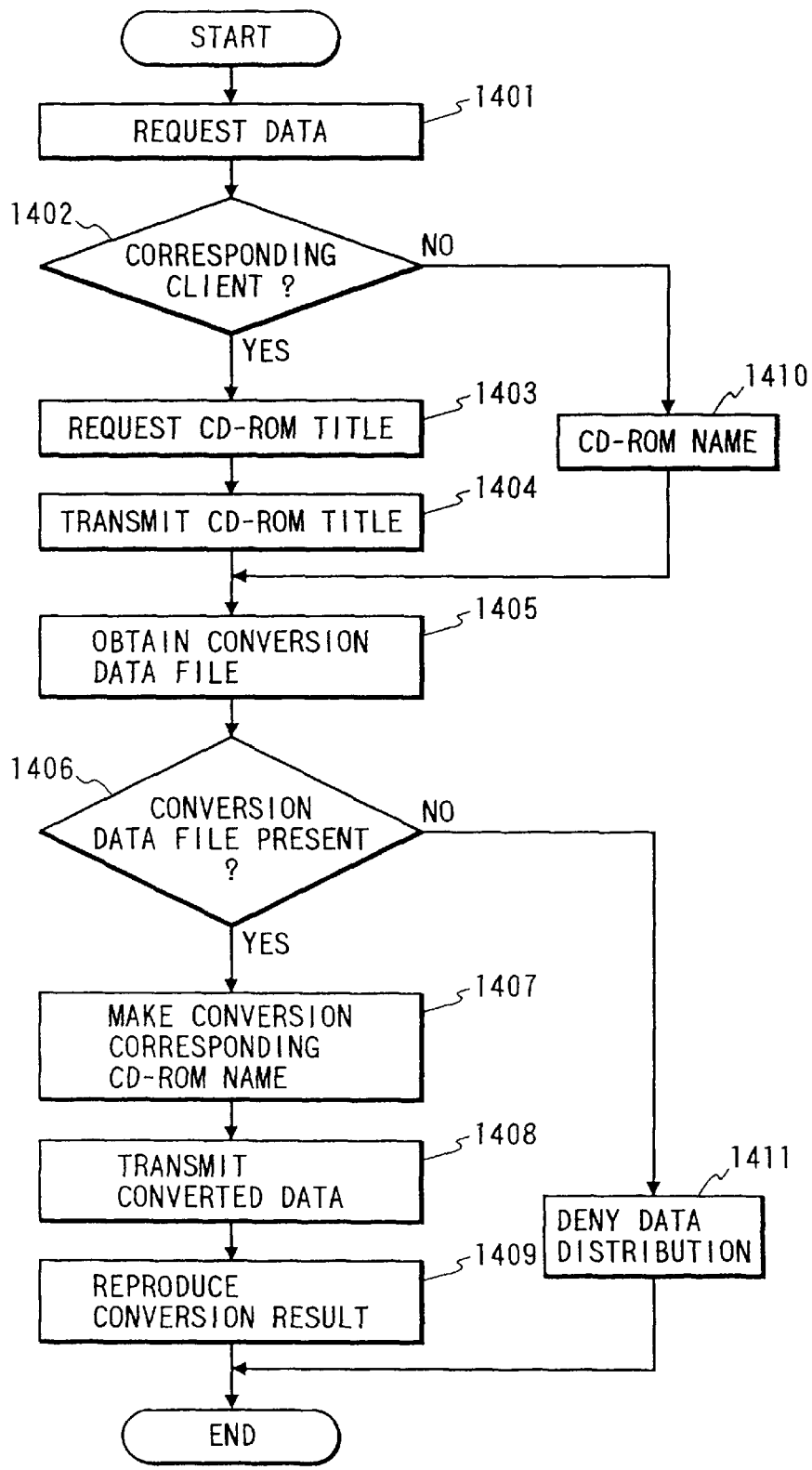
FIG. 14 is a flow chart showing an operation of the information distribution system according to the third embodiment.

This table 7 is for the purpose of determining the conversion data file name for the data to be actually offered on the basis of the name of the data requested and the contents of the CD-ROM 111 of the client 102. For example, in the case of providing the data "Izu heights. html", if the CD-ROM 111 of the client 102 which receives this data retains the data "Hotel A Standard. mpg" and "Hotel B Standard. mpg", the data file "Izu Heights 2. src" is selected as the conversion data. In the Table 7, the items "Hotel A Standard. mpg Absent" and "Hotel B Standard. mpg Present" at the distribution of the data "Izu heights. html" are logically possible, whereas in this case they are not put to use and hence they are omitted. Furthermore, as well as the first embodiment, also in this embodiment, as shown in Table 4 a client A 1201 in FIG. 12 has the CD-ROM named "96 Nationwide Hot Spring Inn" while a client B 1202 is equipped with the CD-ROM titled "95 Nationwide Hot Spring Inn". However, a client C 1203 does not include a CD-ROM. Referring to FIG. 14, a description will be made hereinbelow of the operational flows taken for when these clients A 1201, B 1202 and C 1203 receives the data "Izu heights. html" from the information server 1101. First of all, the user gives instructions through the input section 1115 to the client A 1201 to obtain the data "Izu Heights. html" from the information server 1101. As well as the first embodiment the client A 1201 issues a request for the data "Izu Heights. html" through the network 1103 to the information server 1101 (step 1401). At this time, the client A 1201 additionally transmits as the auxiliary information the information indicative of the fact that it has the arrangement according to this invention. In the description of this embodiment, the client with the arrangement according to this invention will be referred hereinafter to as a corresponding client. As well as the first embodiment, in the information server 1101 the control section 1106 checks, on the basis of the auxiliary information it receives, whether the client A 1201 falls under the corresponding client (step 1402). In this case, since the client A 1201 is the corresponding client, the operational flow of FIG. 14 advances to a step 1403.

As well as the first embodiment, the information server 1101 makes a request to the, client A 1201 so that the client A 1201 transmits the title of the CD-ROM 1112 currently put in the CD-ROM control section 1113 of the client A 1201 to the information server 1101 (step 1403). As well as the first embodiment, the client A 1201 sends to the information server 1101 the title of the CD-ROM 1112 currently put in the CD-ROM control section 1113 thereof.

Since in this instance the CD-ROM named "96 Nationwide Hot Spring Inn" is put therein, this title is transmitted thereto (step 1404).

In the information server 1101, the communication control section 1104 receives the information about the CD-ROM title from the client A 1201 and hands it over to the control section 1106 which in turn, delivers the name of the data requested and the aforesaid information to the data conversion section 1109 of the data production section 1105. Further, the data conversion section 1109 hands them over to the data selection section 1108. In this case, the data name "Izu Heights. html" and the CD-ROM title "96 Nationwide Hot Spring Inn" are delivered thereto. In response to the reception of these data, the data selection section 1108 obtains a conversion data file through the use of its the table (Table 2) on the CD-ROM contents and conversion data selection table (Table 7) and hands it over to the data conversion section 1109 (step 1405). In this instance, since the data requested is "Izu heights. html" and the CD-ROM "96 Nationwide Hot Spring Inn" the client A 1201 has includes the data "Hotel A Standard. mpg" and "Hotel B Standard. mpg", the data file "Izu heights 2. src" (see (c) of FIG. 13) is attained (step 1406), with the operational flow proceeding to a step 1407 and the following steps.

Subsequently, the data conversion section 1109 performs the conversion of the aforesaid conversion data file on the basis of the CD-ROM title and delivers the conversion result to the control section 1106. Since the conversion is made of the conversion data file "Izu Heights 2. src" as shown in (c) of FIG. 13 under the condition that the title of the CD-ROM the client has is "96 Nationwide Hot Spring", the conversion result comes to the data as shown in (c) of FIG. 15 (step 1407). This data is similar in contents to the data "Izu Heights 2. html" in the first embodiment. As well as the first embodiment, the control section 1106 uses the communication control section 1104 to transmit the obtained data ((c) of FIG. 15) through the network 1103 to the client A 1201. At this time, since in this data there is not written a control code for utilizing the image data "Hotel A Simplicity. mpg" and "Hotel B Simplicity. mpg" the information server 1101 retains, the transmission of these image data thereto does not take place (step 1408). As well as the first embodiment, the client A 1201 reproduces the received data. In this case, since this data ((c) of FIG. 15) is the same in contents as the data Izu Heights 2. html" in the first embodiment, as in the case of the client A 201 in the first embodiment, reproduction is made of the data "Hotel A Standard. mpg" and "Hotel B Standard. mpg" in the CD-ROM 1112 (step 1409).

As mentioned above, in cases where the client A 1201 equipped with the CD-ROM "96 Nationwide Hot Spring Inn" makes a request for the data "Izu Heights. html" toward the information server 1101, the transmission of the image data "Hotel A Simplicity. mpg" and "Hotel B Simplicity. mpg" does not take place through the network 1103, but the image data "Hotel A Standard. mpg" and "Hotel B Standard. mpg" higher in appeal come into use at the data reproduction.

Secondly, a description will be taken hereinbelow of the case of the client B 1202. As well as the case of the client A 1201, the communication between the client B 1202 and the information server 1101 occurs in the operations up to the step 1403 in FIG. 14. That is, the information server 1101 issues a request toward the client B 1202 so that the client B 1202 transmits to the information server 1101 the title of the CD-ROM 1112 put in the CD-ROM control section 1113 thereof (step 1403). As well as the client A 1201, in response to that request the client B 1202 sends to the information server 1101 the title of the CD-ROM 1112 currently existing in the CD-ROM control section 1113 thereof. In this case, since the CD-ROM "95 Nationwide Hot Spring Inn" is put therein, the transmission of that title is made thereto (step 1404).

In the information server 1101, as in the case of the client A 1201, the data selection section 1108 accepts the name of the data being under the distribution and the information on the CD-ROM title the client B 1202 sends. In this case, the data name is "Izu Heights. html" and the CD-ROM title is "95 Nationwide Hot Spring Inn". As well as the case of the client A 1201, when receiving these information, the data selection section 1108 obtains the conversion data file through the use of Table 2 on the CD-ROM contents and the conversion data selection table (Table 7) and passes it to the data conversion section 1109 (step 1405). At this time, since the data requested is "Izu heights. html" and the CD-ROM "95 Nationwide Hot Spring Inn" the client B 1202 has retains the data "Hotel A Standard. mpg" but not including the data "Hotel B Standard. mpg", the conversion data file "Izu heights 1. src" ((b) of FIG. 13) is obtainable, with the result that the control goes to a step 1407 and the following steps.

Subsequently, like the case of the client A 1201, the data conversion section 1109 carries out the conversion of the conversion data file on the basis of the CD-ROM title it receives and hands it over to the control section 1106. In this case, since the conversion is made of the conversion data file "Izu heights 1. src" under the condition that the title of the CD-ROM the client has is "95 Nationwide Hot Spring Inn", the conversion result comes to the data as shown in (b) of FIG. 15 (step 1407). This data is the same in contents as the data "Izu heights 1. html" in the first embodiment. As well as the case of the client A 1201, the control section 1106 uses the communication control section 1104 to transmit the obtained data ((b) of FIG. 15) through the network 1103 to the client B 1202. At this time, since in this data there is written a control code for utilizing the image data "Hotel B Simplicity. mpg" the information server 1101 retains, the data selection section 1108 derives the data "Hotel B Simplicity. mpg" from the data holding section 1107 and, in addition to the conversion result data, delivers it through the data conversion section 1109 to the control section 1106 which in turn, transmits them through the communication control section 1104 to the client B 1202. On the other hand, since there is no control code for the use of the data "Hotel A Simplicity. mpg", the transmission of this data does not take place (step 1408).

As well as the client A 1201, the client B 1202 conducts the reproduction of the given data, and in this case the image data "Hotel B Simplicity. mpg" sent through the network 1103 is reproduced in the reproduction of the description section for the hotel B. Further, as in the case of the client A 1201, the data "Hotel A Standard. mpg" in the CD-ROM 1112 titled "95 Nationwide Hot Spring Inn" the client B 1202 includes is reproduced at the reproduction of the description section on the hotel A.

As mentioned above, in cases where the client B 11202 having the CD-ROM "95 Nationwide Hot Spring Inn" requests the data "Izu Heights. html" from the information server 1101, the image data "Hotel A Simplicity. mpg" is not fed from the information server 1101 through the network 1103 to the client B 1202 but the image data "Hotel A Standard. mpg" existing in the aforesaid CD-ROM of the client B 1202 and higher in appeal is used instead. On the contrary, the image data "Hotel B Simplicity. mpg" is sent from the information server 1101 through the network 1103 to the client B 1202.

Furthermore, a description will be made hereinbelow of a flow taken for when the client C 1203 receives the data "Izu heights. html" from the information server 1101. As well as the case of the client A 1201, the communication between the client C 1203 and the information server 1101 is made in the operations up to the step 1404 in FIG. 14. The information server 1101 issues a request to the client C 1203 so that the client C 1203 transmits to the information server 1101 the title of the CD-ROM currently put in the CD-ROM control section 1113 thereof. Although the client C 1203 tries to send the title of the CD-ROM currently put in the CD-ROM control section 1113 to the information server 1101, since there is the absence of the CD-ROM, the transmission of a letter-absent train takes place (steps 1401, 1402, 1403 and 1404).

As well as the case of the client A 1201, in the information server 1101 the data selection section 1108 accepts the name of the data requested and the information on the CD-ROM title coming from the client C 1203. In this instance, the data name "Izu Heights. html" and the letter-absent train are delivered thereto. As well as the case of the client A 1201, when receiving these information, the data selection section 1108 obtains a conversion data file through the use of Table 2 on the contents of its CD-ROM and the conversion data selection table (Table 7) and conveys it to the data conversion section (step 1405). In this case, since the data requested is "Izu heights. html" and the client C 1203 does not have a CD-ROM, a decision is made to that the CD-ROM of the client C 1203 does not retain the data "Hotel A Standard. mpg" and "Hotel B Standard. mpg". Thus, the data file "Izu heights 0. src" is obtainable (step 1406), and the operational flow of FIG. 14 advances to a step 1407 and the following steps. Subsequently, as well as the case of the client A 1201, the data conversion section 1109 makes the conversion of the aforesaid conversion data file on the basis of the CD-ROM title it receives and conveys the conversion result data to the control section 1106. In this case, the conversion is made of the conversion data file "Izu heights 0. src" under the condition that the title of the CD-ROM the client has is "", thus resulting in the data as shown in (a) of FIG. 15. This data is the same in contents as the data Izu heights 0. html" in the first embodiment.

As well as the case of the client A 1201, the control section 1106 uses the communication control section 1104 to transmit the obtained data ((a) of FIG. 15) through the network 1103 to the client C 1203. At this time, Since in this data there is written a control code for utilizing the image data "Hotel A Simplicity. mpg" and "Hotel B Simplicity. mpg" the information server 1101 retains, as well as the case of the client B 1202, in addition to the conversion result data the data "Hotel A Simplicity. mpg" and "Hotel B Simplicity. mpg" are sent to the client C 1203 (step 1408). As in the case of the client A 1201, the client C 1203 reproduces the given data. In this case, the image data "Hotel A Simplicity. mpg" sent through the network 1203 is reproduced at the reproduction of the description section for the hotel A, and the image data "Hotel B Simplicity. mpg" is similarly reproduced at the reproduction of the description section for the hotel B.

As described above, in cases where the client C 1203 not having a CD-ROM makes a request for the data "Izu heights. html" to the information server 1101, the image data "Hotel A Simplicity. mpg" and "Hotel B Simplicity. mpg" are transmitted from the information server 1101 through the network 1103 to the client C 1203.

Moreover, a description will be taken hereinbelow of a flow taken for when a client D 1204 not having the arrangement as shown in FIG. 11 makes a request for the data "Izu Heights. html" to the information server 1101. Let it be assumed that the client D 1204 has the same arrangement as that of the client D 204 described in the first embodiment of this invention, that is, has the FIG. 5 arrangement, and conducts the same operations. As well as the first embodiment, the client D 1204 thus arranged issues a request for the data "Izu heights. html" toward the information server 1101. Since the client D 1204 is not equipped with the arrangement according to this invention, the information representative of the possession of the arrangement according to this invention is not transmitted as the auxiliary information to the information server 1101 (step 1401).

The information server 1101 develops the operation as in the case of the client A 1201. However, since this client D 1204 does not fall under the corresponding client, the operational flow goes through the decision step 1402 to a step 1410 side. In this step 1410, the control section 1106 of the information server 1101 produces a letter-absent train as the name of the CD-ROM the client D 1204 has. As well as the case of the client A 1201, the data selection section 1108 accepts the name of the data requested and the information on the CD-ROM title coming from the client C 1204. In this case, the data name "Izu heights. html" and the letter-absent train are delivered. Thereafter, in the same way as the case of the client C 1203, the data as shown in (a) of FIG. 15 and the image data "Hotel A Simplicity. html" and "Hotel B Simplicity. html" are delivered to the client D 1204 (steps 1405, 1406, 1407 and 1408) and reproduced therein. Also in this case, the image data "Hotel A Simplicity. mpg" sent through the network 1203 is reproduced in the reproduction of the description section of the hotel A, and the image data "Hotel B Simplicity. mpg" is likewise reproduced in the reproduction of the description section of the hotel B (step 1409).

As mentioned before, in cases where the client D 1204 having no arrangement according to this invention issues a request for the data "Izu Heights. html" toward the information server 1101, the image data "Hotel A Simplicity. mpg" and "Hotel B Simplicity. mpg" are fed from the information server 1101 through the network 1103 to the client D 1204.

As described above, according to this embodiment, when the information server performs the information distribution through the network, if the client has the arrangement according to this invention and further is equipped with a specific data retaining medium, the data in that data retaining medium is put to use so that the data corresponding to the requested data is distributable without the need for a large amount of data such as a motion picture being delivered through the network to the client, with the result that the effective distribution of the data including a large amount of data such as a motion picture becomes possible. Further, even if the client has the arrangement according to this invention but not having a specific data retaining medium, the data distribution is possible as long as the information server side prepares the standard data. Still Further, even if the client does not have the arrangement according to this invention, the data distribution is also possible when the information server side prepares the standard data.

In addition, according to this embodiment, the information (Table 2 used herein) on the data retaining medium can be maintained and updated independently of the other data in the data holding section of the information server. Accordingly, also in the case of rendering services for a number of data retaining media having the same contents, the maintenance of the system becomes easy.

In this invention, the selection method in the data selection section and the conversion method in the data conversion section are not limited to these in the above mentioned embodiment. Further, the method of obtaining one portion of the data to be actually offered by means of the conversion confirming to the situation and the method of writing one portion in the conversion data file in advance to appropriately obtain the written data in the data selection section under circumstances are not limited to those in the above described embodiment.

Fourth Embodiment

Furthermore, a description will be made hereinbelow of a fourth embodiment of the present invention. This embodiment has the same arrangement as that of the first embodiment, but its operation differs from that of the first embodiment. FIG. 16 illustrates the arrangement of this embodiment. In FIG. 16, the information distribution system according to this embodiment similarly comprises an information server 1601 for performing the information distribution, a client 1602 for receiving the information distribution therefrom, and a network 1601 for establishing the connection between the information server 1601 and the client 1602. The information server 1601 is composed of a communication control section 1604 for controlling the communication with the network 1603, a data production section 1605 for producing and getting data to be offered, and a control section 1606 for taking care of the control of the communication control section 1604 and the data production section 1605. Further, in this embodiment the data production section 1605 is composed of a selection data holding section 1607 for holding a set of data to be offered and a data selection section 1608 for selecting the data in the data holding section 1607.

On the other hand, the client 1602 includes a communication control section 1609 for controlling the communication with the network 1603, a data holding section 1610 for holding data, a CD-ROM 1611 being a portable large capacity data retaining medium, a CD-ROM control section 1612 for controlling the CD-ROM 1611, a display section 1613 for displaying various data and messages toward the user, an input section 1614 for accepting an input made by the user, and a control section 1615 for taking charge of the control of the communication control section 1609, the data holding section 1610, the data retaining medium control section 1612, the display section 1613 and the input section 1614.

Figure 17:
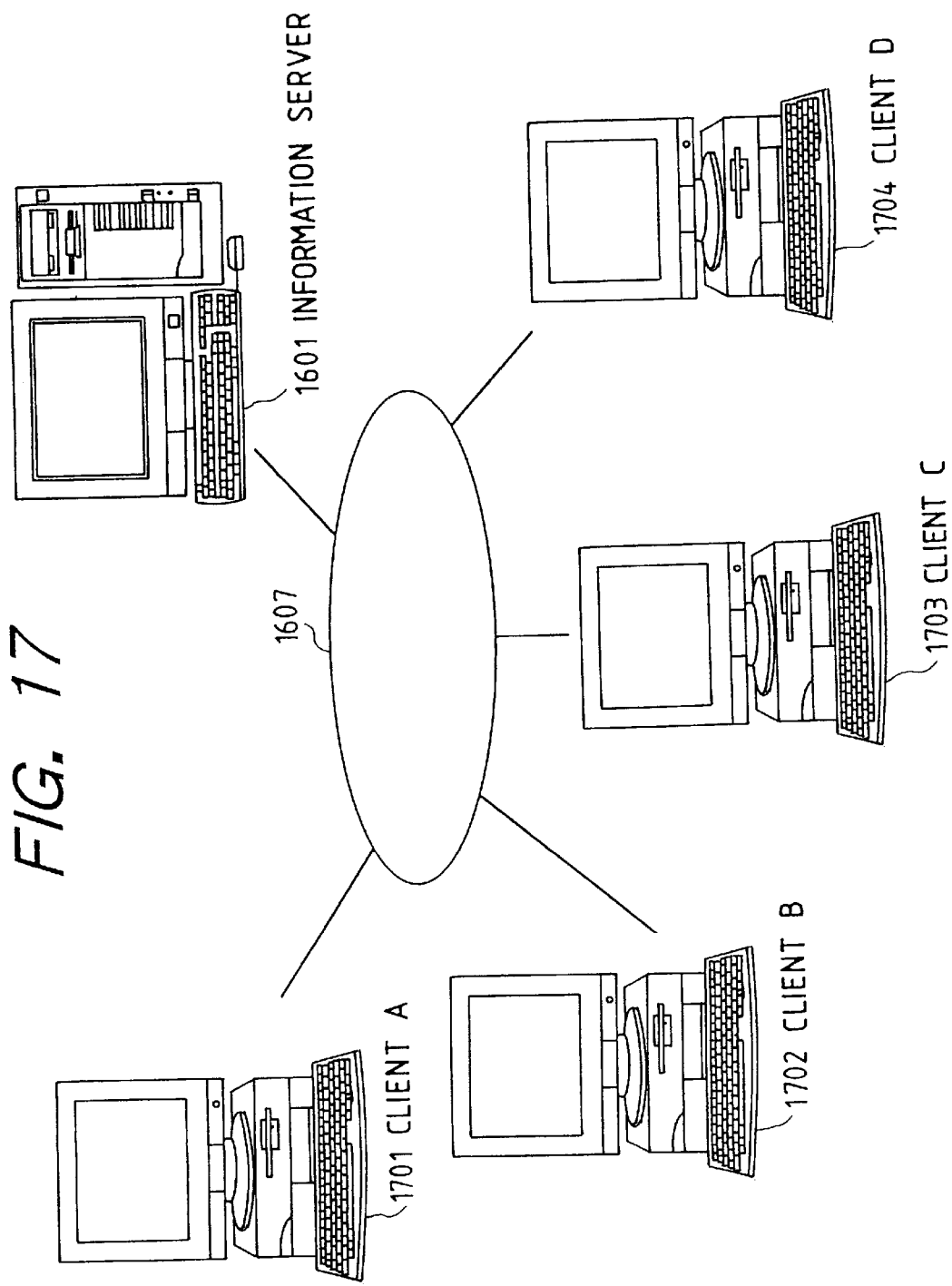
FIG. 17 is an illustration of an arrangement of the information distribution system according to the fourth embodiment using a network.

An operation of this embodiment will be taken hereinbelow with reference to FIGS. 16 to 18, FIGS. 3 and 5, and Tables 1, 3 and 4. FIG. 17 illustrates the whole arrangement of this embodiment using the network. In the illustration, numeral 1601 represents the information server and numerals 1701 to 1703 denote clients each having the arrangement as shown in FIG. 16. Further, numeral 1704 depicts a client which does not have the FIG. 16 arrangement. This is for the explanation of the operation for the client not equipped with the FIG. 16 arrangement. Still further, numeral 1603 signifies the network for making the connections between the information server 1601 and the clients 1701 to 1704. Let it be assumed that as well as the first embodiment the selection data holding section 1607 of the information server 1601 retains the data "Izu heights 2. html", "Izu heights 1. html" and "Izu heights 0. html" including the contents as shown in (a), (b) and (c) of FIG. 3 as the candidates for the data files having the data to be actually offered, corresponding to the data name "Izu heights. html" as shown in Table 1. Further, also included are the CD-ROMs "96 Nationwide Hot Spring Inn" and "95 Nationwide Hot Spring Inn" which are the same as those in the first embodiment. Still Further, as well as the first embodiment the data selection section 1608 of the information server 1601 has the data selection table (Table 3) for the selection of data therein. However, in this embodiment, the data selection section 1608 is provided with a means for obtaining a corresponding CD-ROM list on the basis of the name of the data requested referring to the data selection table. In addition, let it be assumed that, as well as the first embodiment, as shown in Table 4 the client A 1701 includes the CD-ROM titled "96 Nationwide Hot Spring Inn", the client B 1702 is equipped with the CD-ROM titled "95 Nationwide Hot Spring Inn", and the client C 1703 has no CD-ROM.

Figure 18:
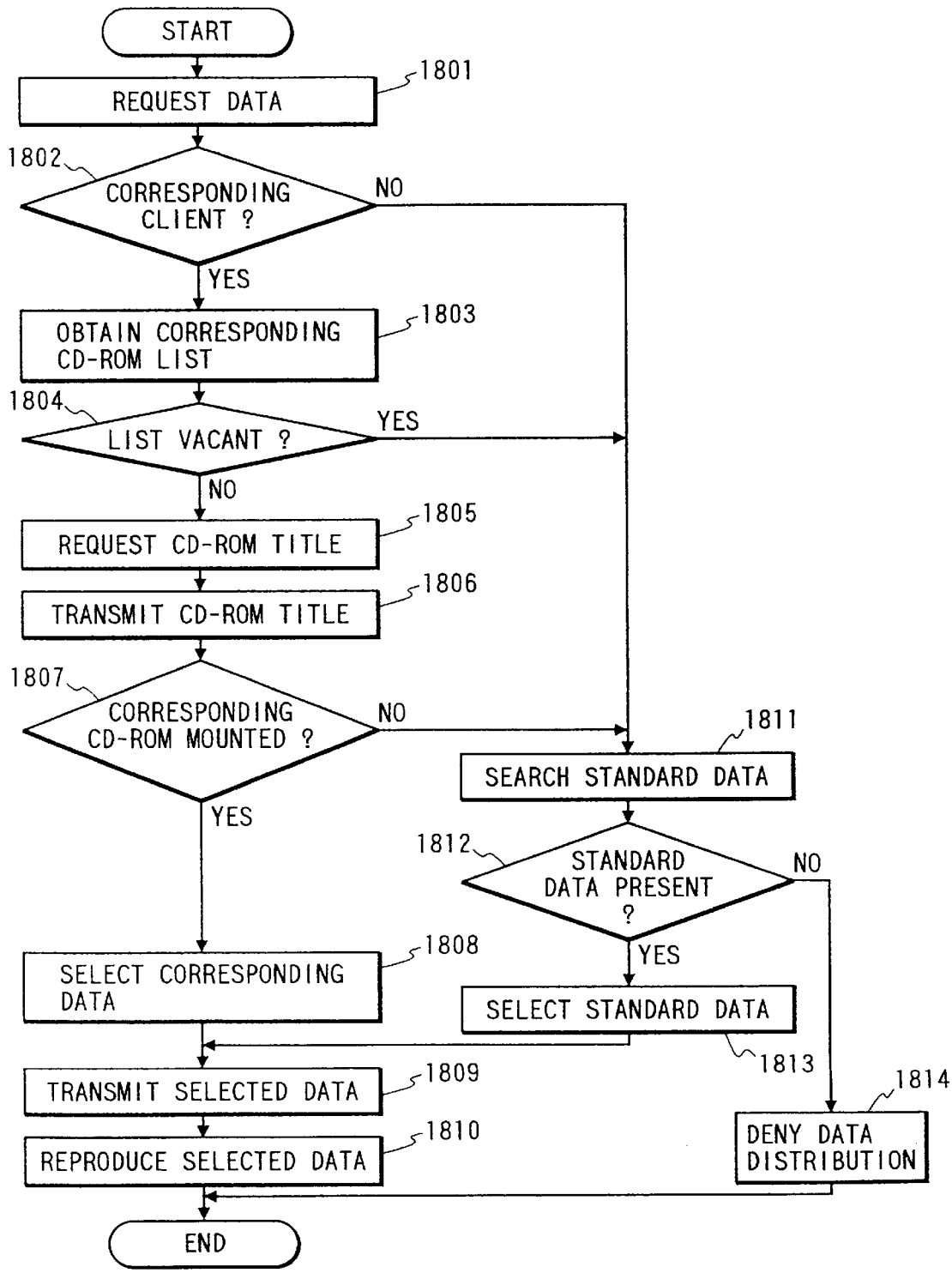
FIG. 18 is a flow chart showing an operation of the information distribution system according to the fourth embodiment.

Referring to FIG. 18, a description will be taken hereinbelow of the operational flows taken for when the clients A 1701, B 1702 and C 1703 issue a request for the data "Izu Heights. html" toward the information server 1601. The description will begin with the case of the client A 1701. First of all, the user uses the input section 1614 to give instructions to the client A 1701 to obtain the data "Izu Heights. html" from the information server 1601. As well as the first embodiment, this client A 1701 transmits a request through the network 1603 to the information server 1601 so that the information server 1601 distributes the data "Izu Heights. html". At this time, the client A 1701 additionally sends the information indicative of the possession of the arrangement according to this invention as the auxiliary information thereto (step 1801). In the description of this embodiment, the client having the arrangement according to this invention will be referred hereinafter to as a corresponding client.

In the information server 1601, as well as the first embodiment the control section 1606 checks, as a function of the auxiliary information it receives, whether or not the client A 1701 fall under the corresponding client (step 1802). In this case, since the client A 1701 is the corresponding client, the control advances to a step 1803 and the following steps. Subsequently, the control section 1606 of the information server 1601 requests the corresponding CD-ROM list equivalent to the requested data from the data selection section 1608. This data selection section 1608 produces the corresponding CD-ROM list with reference to its data selection table (Table 3) and hands it over to the control section 1606 (step 1803). The control section 1606 decides whether the corresponding CD-ROM list is vacant or not (step 1804). In this case, since the data requested is "Izu Heights. html", {"96 Nationwide Hot Spring Inn", "95 Nationwide Hot Spring Inn"} is attainable as the corresponding CD-ROM list, then proceeding to the following operations. Further, the control section 1606 issues a request to the communication control section 1604 to ask the client A 1701 as to whether or not any CD-ROM in the CD-ROM list obtained in the step 1803 is put in the CD-ROM control section 1612. The communication control section 1604 sends that question through the network 1603 to the client A 1701 (step 1805). In the client A 1701 side, the communication control section 1609 accepts the question from the information server 1601 side and hands it over to the control section 1615. The control section 1615 asks the CD-ROM control section 1612 for the title of the CD-ROM currently mounted therein and the CD-ROM control section 1612 answers that question. Then, the control section 1615 is responsive to the question from the information server 1601 on the basis of the CD-ROM title thus obtained. In this case, since the CD-ROM "96 Nationwide Hot Spring Inn" is put therein, the client A 1701 sends to the information server 1601 the information indicative of the fact that the CD-ROM "96 Nationwide Hot Spring Inn" in the list is put therein.

On the other hand, in the information server 1601 side, the communication control section 1604 passes the answer from the client A 1710 to the control section 1606 which in turn, determines whether or not the corresponding CD-ROM is put in the CD-ROM control section of the client A 1701 (step 1807). In this instance, because of being put therein, the control proceeds to a step 1808. Thereafter, the control section 1601 makes a request to the data selection section 1608 to obtain the corresponding data which corresponds to the corresponding CD-ROM the client A 1701 has in relation to the requested data "Izu Heights. html". As well as the first embodiment, the data selection section 1608 obtains the corresponding data "Izu Heights 2. html" through the use of Table 3 and passes it to the control section 1606 (step 1808). Thereafter, as in the case of the client A 201 in the first embodiment, the information server 1601 communicates the data "Izu Heights 2. html" to the client A 1701 which in turn, reproduces the same data (steps 1809, 1810).

As mentioned before, in cases where the client A 1701 having the CD-ROM "96 Nationwide Hot Spring Inn" makes request the data "Izu Heights. html" toward the information server 1601, the image data "Hotel A Simplicity. mpg" and "Hotel B Simplicity. mpg" are not conveyed through the network 1603 but the image data "Hotel A Standard. mpg" and "Hotel B Standard. mpg" existing in the aforesaid CD-ROM of the client A 1701 and higher in appeal are used instead of them.

Secondly, a description will be made hereinbelow of the case of the client B 1702. As in the case of the client A 1701, the communication between the information server 1601 and the client B 1702 is made in the operation up to the step 1805 in FIG. 18. In like manner, the information server 1601 asks the client B 1702 as to whether or not any CD-ROM in the CD-ROM list obtained in the step 1803 is present in the CD-ROM control section 1612 of the client B 1702 (steps 1801, 1802, 1803, 1804 and 1805). The client B 1702 answers that question as in the case of the client A 1701. In this instance, since the CD-ROM "95 Nationwide Hot Spring Inn" is put therein, the client B 1702 transmits the information indicative of the fact that the CD-ROM "95 Nationwide Hot Spring Inn" is put therein (step 1806). Thereafter, as in the case of the client A 1701, the information server 1601 selects the corresponding data and communicates it to the client B 1702. In this case, since the data "Izu Heights 1. html" is chosen as the corresponding data, this data, together with the image data "Hotel B Simplicity. mpg", is conveyed through the network 1603 to the client B 1702 (steps 1807, 1808, and 1809). As well as the client A 1701, the client B 1702 reproduces the data it receives. In this case, the image data "Hotel B Simplicity. mpg" given through the network 1603 is reproduced in the reproduction of the description section for the hotel B, while like the client A 1701 the data "Hotel A Standard. mpg" is reproduced from the CD-ROM "95 Nationwide Hot Spring Inn" of the client B 1702 in the reproduction of the description section for the hotel A (step 1810).

As described above, in cases where the client B 1702 having the CD-ROM named "95 Nationwide Hot Spring Inn" makes a request for the data "Izu heights. html" toward the information server 1601, the image data "Hotel A Simplicity. mpg" is not conveyed from the information server 1601 through the network 1603 to the client B 1702 but the image data "Hotel A Standard. mpg" existing in the aforesaid CD-ROM of the client B 1702 and higher in appeal is used in place of it. On the other hand, the image data "Hotel B Simplicity. mpg" is delivered from the information server 1601 through the network 1603 to the client B 1702.

Furthermore, a description will be made hereinbelow of a flow taken for when the client C 1703 receives the data "Izu Heights. html" from the information server 1601. As in the case of the client A 1701, the communication between the client C 1703 and the information server 1601 is made in the operation up to the step 1805 in FIG. 18. In like manner, the information server 1601 asks the client C 1703 as to whether or not any CD-ROM in the CD-ROM list obtained in the step 1803 is present in the CD-ROM control section 1612 of the client C 1703 (steps 1801, 1802, 1803, 1804 and 1805). As in the case of the client A 1701, the client C 1703 answers the question. In this case, since no CD-ROM is put in the CD-ROM control section 1612, the client C 1703 informs the information server 1601 of the fact that no CD-ROM exists therein (step 1806).

In the information server 1601, the communication control section 1604 passes the answer from the client C 1703 to the control section 1606 which in turn, decides whether or not the corresponding CD-ROM is put in the CD-ROM control section 1612 of the client C 1703 (step 1807). In the present case, because of the absence thereof, the control advances to the following operation (step 1811). Subsequently, the control section 1606 asks the data selection section 1608 for the standard data corresponding to the requested data "Izu Heights. html". The data selection section 1608 attains the standard data "Izu Heights 0. html" through the use of Table 3 (step 1811). After the acquisition of the standard data, the operational flow proceeds from a step 1812 to a step 1813. In this step, the data selection section 1608 selects the standard data "Izu heights 0. html" and hands it over to the control section 1606.

Thereafter, as in the case of the client C 203 in the first embodiment, the information server 1601 transmits the standard data "Izu heights 0. html" and the image data "Hotel A Simplicity. mpg" and "Hotel B Simplicity. mpg" through the network 1603 to the client C 1703 (step 1809). As well as the client A 1701, the client C 1703 reproduces the data it receives. In the present case, the image data "Hotel A Simplicity. mpg" sent through the network 1603 is reproduced at the reproduction of the description section for the hotel A, and in like manner, the data "Hotel B Simplicity. mpg" is reproduced at the reproduction of the description section on the hotel B (step 1810).

As described before, in cases where the client C 1703 with no CD-ROM makes a request for the data "Izu heights. html" toward the information server 1601, the image data "Hotel A Simplicity. mpg" and "Hotel B Simplicity. mpg" are transmitted from the information server 1601 through the network 1603 to the client C 1703.

Moreover, a description will be taken hereinbelow of a flow taken for when the client D 1704 requests the data "Izu heights. html" from the information server 1601. The client D 1704 has the same arrangement as that of the client D 204 in the first embodiment, that is, has the FIG. 5 arrangement, and conducts the like operation. As well as the first embodiment, the client D 1704 thus arranged issues a request for the data "Izu heights. html" toward the information server 1601. In this case, since the client D 1704 does not have the arrangement according to this invention, the information indicative of the possession of the arrangement according to this invention is not conveyed as the auxiliary information to the information server 1601 (step 1801). The information server 1601 develops the operation like the case of the client A 1701. However, since this client D 1704 does not come under the corresponding client, the operational flow goes from the decision step 1802 to a step 1811. Thereafter, as in the case of the client C 1703, the information server 1601 transmits the standard data "Izu heights 0. html" and the image data "Hotel A Simplicity. mpg" and "Hotel B Simplicity. mpg" to the client D 1704 (steps 1811, 1812, 1813 and 1809). Like the client A 1701, the client D 1704 reproduces the data it receives. The image data "Hotel A Simplicity. mpg" coming through the network 1603 is reproduced in the reproduction of the description section for the hotel A, and in like manner the image data Hotel B Simplicity. mpg" is reproduced in the reproduction of the description section on the hotel B.

As described above, in cases where the client D 1704 not having the arrangement according to this invention issues a request for the data "Izu Heights. html" toward the information server 1601, the image data "Hotel A Simplicity. mpg" and "Hotel B Simplicity. mpg" are transmitted from the information server 1601 through the network 1603 to the client D 1704.

According to this embodiment, when the information server has the arrangement according to this invention performs the information distribution through the network, if the client equipped with the arrangement according to this invention includes a specific data retaining medium, through the use of the data in the data retaining medium the data corresponding to the requested data is distributable without depending upon the method in which a large amount of data such as a motion picture is sent through the network to the client, thus effectively distributing a large amount of data such as a motion picture. In addition, even if the client with the arrangement according to this invention is not provided with a specific data retaining medium, the data distribution is possible as long as the information server side prepares the standard data. Further, even if the client does not have the arrangement according to this invention, the data distribution is possible as long as the information server side prepares the standard data.

In this embodiment, when the client 1602 is not provided with the corresponding CD-ROM, the client 1602 immediately informs the information server 1601 of no provision of the corresponding CD-ROM. However, it is also appropriate that the client 1602 makes a conversation with the user through the display section 1613 and the input section 1614 to urge the user to mount the corresponding CD-ROM. In this case, when the client 1602 is not provided with the corresponding CD-ROM at that time, it is possible to give the opportunity to set the corresponding CD-ROM, with the result that there is no need for the client to always keep the corresponding CD-ROM and hence the system becomes more flexible.

Fifth Embodiment

Figure 19:
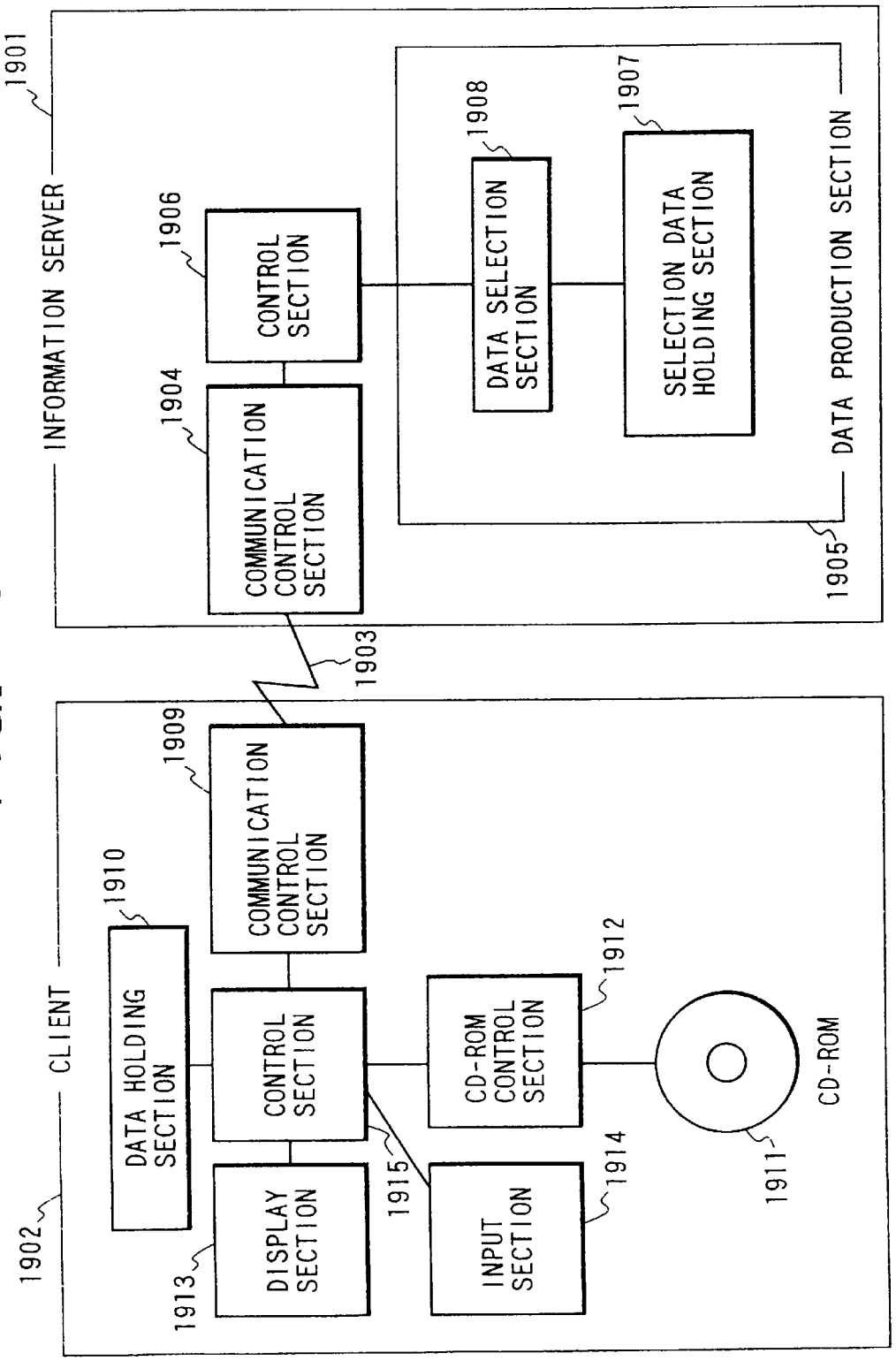
FIG. 19 is an illustration of an arrangement of an information distribution system according to a fifth embodiment of the present invention.

Furthermore, a description will be made hereinbelow of a fifth embodiment of the present invention. This embodiment has the same arrangement as that of the first embodiment, but its operation differs from that of the first embodiment. FIG. 19 shows the arrangement of this embodiment. In FIG. 19, numeral 1901 represents an information server for taking charge of the information distribution, numeral 1902 designates a client which receives the information distribution therefrom, and numeral 1903 stands for a network for setting up the connection between the information server 1901 and the client 1902. The information server 1901 is composed of a communication control section 1904 for controlling the communication with the network 1903, a data production section 1905 for producing and obtaining data to be offered, and a control section 1906 for taking care of the control of the communication control section 1904 and the data production section 1905. The data production section 1905 includes a selection data holding section 1907 for holding or retaining a set of data for the distribution and a data selection section 1908 for selecting the data in the data holding section 1907. The client 1902 is composed of a communication control section 1909 for controlling the communication with the network 1903, a data holding section 1910 for holding or retaining data, a CD-ROM 1911 being a portable large capacity data retaining medium, a CD-ROM control section 1912 for controlling the CD-ROM 1911, a display section for displaying various data and messages to the user, an input section 1914 for accepting the input made by the user, and a control section 1915 for taking charge of the control of the communication control section 1909, the data holding section 1910, the data retaining medium control section 1912, the display section 1913 and the input section 1914.

Figure 20:
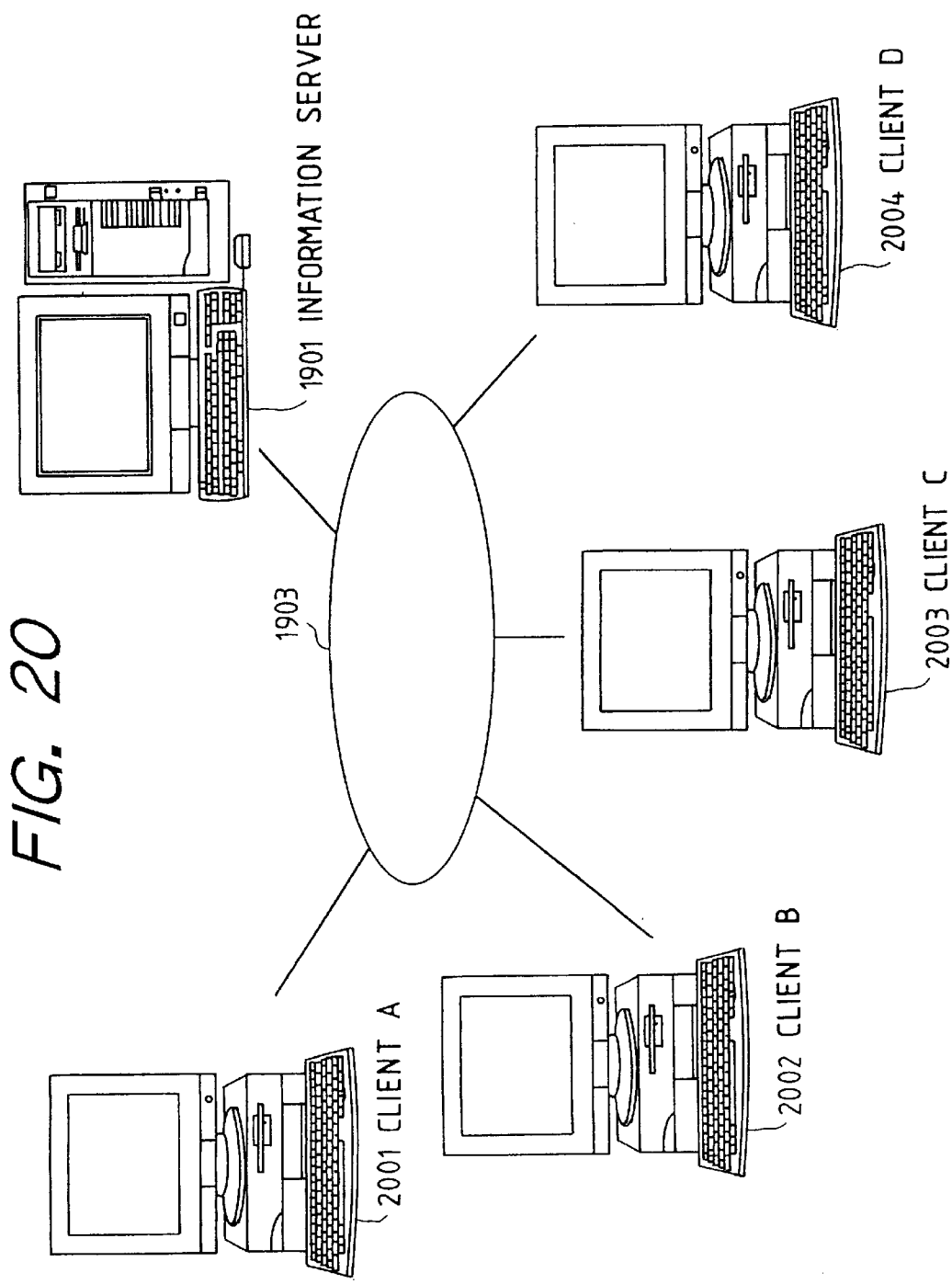
FIG. 20 is an illustration of an arrangement of the information distribution system according to the fifth embodiment using a network.

An operation of this embodiment will be taken hereinbelow with reference to FIGS. 19 to 31, FIGS. 3 and 5, and Tables 1, 3 and 4. FIG. 20 shows the whole arrangement of this embodiment using the network. In the illustration, numeral 1901 denotes the information server for information distribution, and numerals 2001, 2002 and 2003 depict clients each having the arrangement as shown in FIG. 19. Further, numeral 2004 signifies a client which does not have the FIG. 19 arrangement. Using this client 2004, a description will be made of the operation for the client which does not have the arrangement in FIG. 19. Numeral 1903 stands for the network for establishing the connection between the information server 1901 and the clients 2001 to 2004. In this embodiment, as well as the first embodiment, the selection data holding section 1907 of the information server 1901 holds the data "Izu heights 2. html", "Izu heights 1. html" and "Izu heights 0. html" including the contents as shown in (a), (b) and (c) of FIG. 3 as the candidates for the data files accommodating the data to be actually offered in relation to the data "Izu heights. html" as shown in Table 1. In addition, the CD-ROMs "96 Nationwide Hot Spring Inn" and "95 Nationwide Hot Spring Inn" are provided as in the case of the first embodiment. Further, as well as the first embodiment, the data selection section 1908 of the information server 1901 contains a data selection table (Table 3) for the selection of data. Still further, as well as the first embodiment, as shown in Table 4, the client A 2001 is provided with the CD-ROM titled "96 Nationwide Hot Spring Inn", the client B 2002 is equipped with the CD-ROM "95 Nationwide Hot Spring Inn", and the client C 2003 has no CD-ROM.

Figure 21:
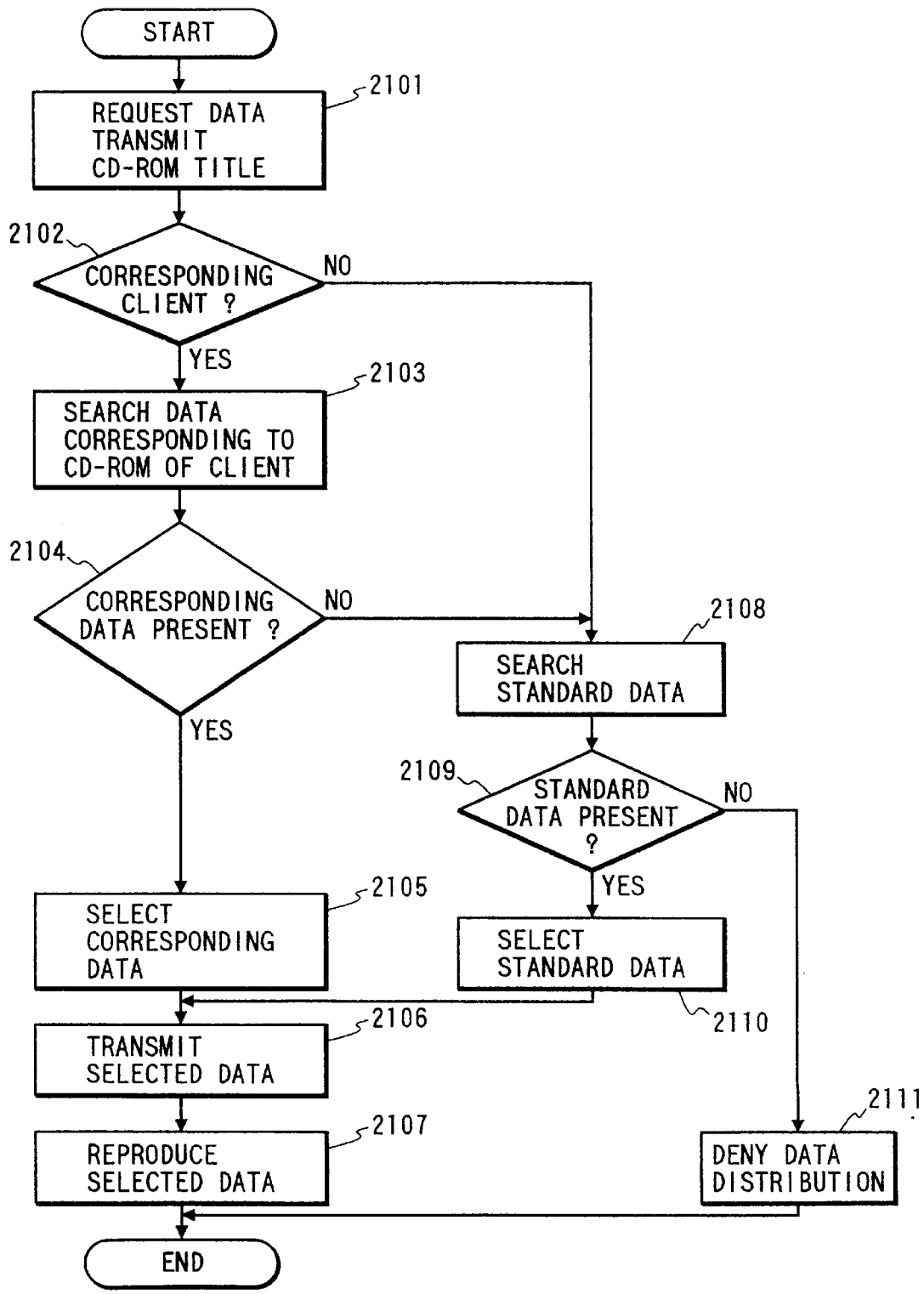
FIG. 21 is a flow chart showing an operation of the information distribution system according to the fifth embodiment.

Referring to FIG. 21, a description will be made hereinbelow of the operational flows taken for when the clients A 2001, B 2002 and C 2003 make a request for the data "Izu Heights. html" toward the information server 1901. The description will begin with the case of the client A 2001. First of all, through the use of the input section 1914 of the client A 2001, the user gives instructions to the client A 1901 to request the data "Izu Heights. html" from the information server 1901. The control section 1915 of the client A 2001 requests the title of the currently set CD-ROM 1911 from the CD-ROM control section 1912 which in turn, communicates the title of the CD-ROM 1911 to the control section 1915. Then, the control section 1915 gives instructions to the communication control section 1109 for conveying a request for the data "Izu heights. html" and the title of the currently put CD-ROM 1911 to the information server 1901. At this time, the client A 2001 additionally sends as the auxiliary information the information indicative of the possession of the arrangement according to this invention (step 2101). In the description of this embodiment, the client with the arrangement according to this invention will be referred hereinafter to as a corresponding client.

In the information server 1901, the communication control section 1904 hands over the information from the client A 2001 to the control section 1906. This control section 1906 first decides whether or not the client A 2001 is the corresponding client (step 2102). Since in this case it is the corresponding client, the operational flow advances to the following operation (a step 2103 and steps subsequent thereto). Subsequently, the control section 1906 hands over the name of the data requested and the name of the CD-ROM the client A 2001 has to the data selection section 1908 of the data production section 1905. In this instance, the name of the data requested is "Izu heights. html" and the CD-ROM title is "96 Nationwide Hot Spring Inn". The data selection section 1908 receives that information and searches for the corresponding data. Thereafter, as in the case of the client A 201 of the first embodiment, the data "Izu heights 2. html" is chosen as the corresponding data and communicated from the information server 1901 to the client A 2001. At this time, since in this data there is not written a control code for using the image data "Hotel A Simplicity. mpg" and "Hotel B Simplicity. mpg", the transmission of these data does not take place (steps 2103, 2104, 2105 and 2106).

As well as the first embodiment, the client A 2001 reproduces the data it receives, and use is made of the data "Hotel A Standard. mpg" and "Hotel B Standard. mpg" in the CD-ROM 1911 (step 2107).

As described above, in cases where the client A 2001 having the CD-ROM "96 Nationwide Hot Spring Inn" makes a request for the data "Izu Heights. html" toward the information server 1901, the image data "Hotel A Simplicity. mpg" and "Hotel B Simplicity. mpg" the information server 1901 retains are not transmitted through the network 1903, but the image data "Hotel A Standard. mpg" and "Hotel B Standard. mpg" existing in the CD-ROM of the client A 1901 and higher in appeal is used in stead of them.

Secondly, a description will be taken hereinbelow of the case of the client B 2002. As well as the case of the client A 2001, the client B 2002 communicates to the information server 1901 a request for the data "Izu Heights. html", the title of the CD-ROM 1911 thereof and the information representative of the fact that the client B 2002 is the corresponding client (step 2101). In this case, the title of the CD-ROM 1911 is "95 Nationwide Hot Spring Inn". On the other hand, the information server 1901 selects the data as well as the client A 2001. In this case, the data "Izu heights 1. html" is selected as the corresponding data (steps 2102, 2103, 2104, and 2105). The selected data is delivered to the client B 2202 as in the case of the client A 2001. In this case, in addition to this data, the image data "Hotel B Simplicity. mpg" is sent through the network 1903 to the client B 2002 (step 2106). The client B 2002 reproduces the data it receives, as well as the case of the client A 2001. In this instance, the image data "Hotel B Simplicity. mpg" coming through the network 1903 is reproduced in the description section for the hotel B. On the other hand, as in the case of the client A 2001, in the reproduction of the description section for the hotel A, the data "Hotel A Standard. mpg" is reproduced from the CD-ROM "95 nationwide Hot Spring Inn" 1911 the client B 2002 has.

As mentioned above, in cases where the client B 2002 having the CD-ROM "95 nationwide Hot Spring Inn" makes a request for the data "Izu heights. html" toward the information server 1901, the image data "Hotel A Simplicity., mpg" is not transmitted from the information server 1901 through the network 1903 to the client B 2002, but the image data "Hotel A Standard. mpg" existing in the CD-ROM of the client B 2002 and higher in appeal is used instead. On the other hand, the image data "Hotel B Standard. mpg" is conveyed from the information server 1901 through the network 1903 to the client B 2002.

Furthermore, a description will be taken hereinbelow of the case of the client C 2003. As in the case of the client A 2001, the client C 2003 transmits to the information server 1901 a request for the data "Izu heights. html", the title of the CD-ROM the client C 2003 has. and the information representative of the fact that the client C 2003 is the corresponding client. However, in this case, since the client C 2003 has no CD-ROM, a letter-absent train " " is conveyed as the title of the CD-ROM (step 2101). In response to the information from the client C 2003, the information server 1901 selects the data as in the case of the client A 2001. In this instance, since the title of the CD-ROM is indicated with the letter-absent train, the corresponding data is not found, and the standard data "Izu Heights 0. html" undergoes the selection (steps 2102, 2103, 2104, 2108, 2109, 2110). The selected data is given to the client C 2003 as in the case of the client A 2001. In this case, the image data "Hotel A Simplicity. mpg" and "Hotel B Simplicity. mpg" are delivered through the network 1903 to the client C 2003 (step 2106). As well as the client A 2001, the client C 2003 reproduces the data it receives. In this case, the image data "Hotel A Simplicity. mpg" coming through the network 1903 is reproduced in the reproduction of the description section for the hotel A, and in like manner the image data "Hotel B Simplicity. mpg" is reproduced at the reproduction of the description section for the hotel B (step 2107).

As mentioned above, in cases where the client C 2003 having no CD-ROM makes a request for the data "Izu heights. html" toward the information server 1901, the image data "Hotel A Simplicity. mpg" and "Hotel B Simplicity. mpg" are given from the information server 1901 through the network 1903 to the client C 2003.

Moreover, a description will be made hereinbelow of a flow taken for when the client D 2004 requests the data "Izu Heights. html" from the information server 1901. The client D 2004 has the same arrangement as that of the client D 204 described in the first embodiment, that is, has the FIG. 5 arrangement, and conducts the same operation. As well as the first embodiment, the client D 2004 thus arranged issues a request for the data "Izu heights. html" to the information server 1901. The client D 2004 does not have the arrangement according to this invention, with the result that no information indicative of the possession of the arrangement according to this invention is communicated as the auxiliary information to the information server 1901. In addition, no information on the title of the CD-ROM the client has is also conveyed thereto (step 2101).

Although as in the case of the client A 2001 the information server 1901 develops the operation, because in this case the client D 2004 does not fall under the corresponding client, the operational flow goes from the decision step 2102 to the step 2108 side. Thereafter, like the case of the client C 2003 the information server 1901 sends to the client D 2004 the standard data "Izu heights 0. html" and the image data "Hotel A Simplicity. mpg" and "Hotel B Simplicity. mpg" (steps 2108, 2109, 2110, and 2106). The client D 2004 reproduces the data it receives as in the case of the client A 2001. The image data "Hotel A Simplicity. mpg" coming through the network 1903 is played in the reproduction of the description section for the hotel A, and in like manner the image data "Hotel B Simplicity. mpg" is played in the reproduction of the description section for the hotel B.

As mentioned above, in cases where the client D 2004 not having the arrangement according to this invention makes a request for the data "Izu heights. html" toward the information server 1901, the image data "Hotel A Simplicity. mpg" and "Hotel B Simplicity. mpg" are delivered from the information server 1901 through the network 1903 to the client D 2004.

According to this embodiment, when the information server with the arrangement according to this invention performs the information distribution through the network, if the client has the arrangement according to this invention and has a specific data retaining medium, through the use of the data in the data retaining medium, the data corresponding to the requested data is distributable without depending upon the method of sending a large amount of data such as a motion picture, with the result that it is possible to effectively distribute the data including a large amount of data such as a motion picture. Further, even if the client with the arrangement according to this invention is not equipped with a specific data retaining medium, the data is distributable as long as the information server side prepares the standard data. Still further, even if the client does not have the arrangement according to this invention, the data is also distributable as long as the information server side prepares the standard data.

Sixth Embodiment

Figure 22:
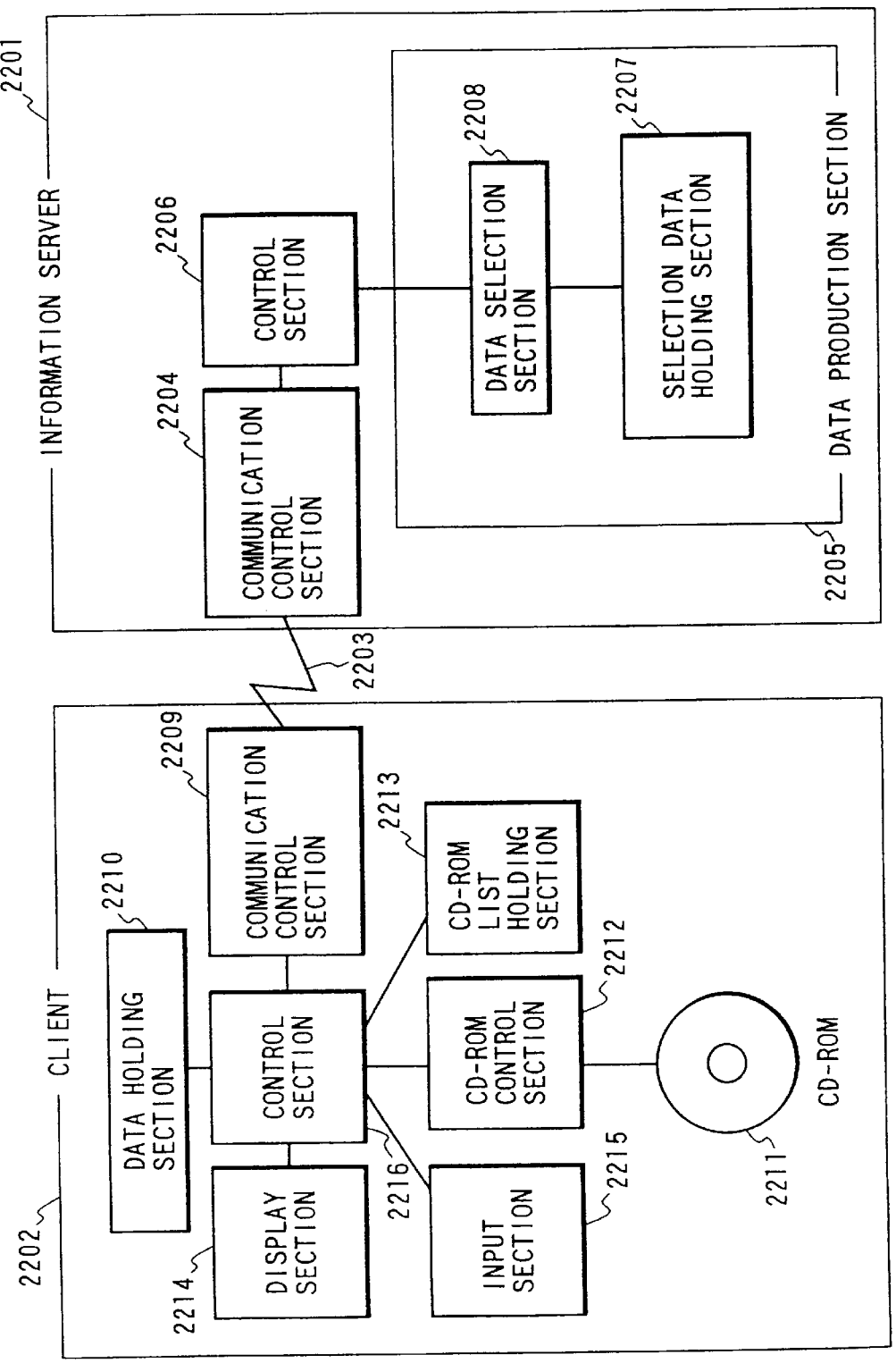
FIG. 22 is an illustration of an arrangement of an information distribution system according to a sixth embodiment of the present invention.

Furthermore, a description will be taken hereinbelow of a sixth embodiment of the present invention. FIG. 22 shows an arrangement of this embodiment. In the illustration, numeral 2201 represents an information server for performing the information distribution, numeral 2202 designates a client which receives the information therefrom, and numeral 2203 for making the connection between the information server 2201 and the client 2202. The information server 2201 comprises a communication control section 2204 for controlling the communication with the network 2203, a data production section 2205 for producing and obtaining data to be offered, and a control section 2206 for taking care of the control of the communication control section 2204 and the data production section 2205. Further, the data production section 2205 is composed of a selection data holding section 2207 for holding a set of data to be offered and a data selection section 2208 for selecting the data in the selection data holding section 2207. On the other hand, the client 2202 is made up of a communication control section 2209 for controlling the communication with the network 2203, a data holding section 2210 for holding data, a CD-ROM 2211 being a portable large capacity data retaining medium, a CD-ROM control section 2212 for controlling the CD-ROM 2211, a CD-ROM list holding section 2213 for holding a list of the titles of the CD-ROMs usable for the client 2202, a display section 2214 for displaying various data and messages toward the user, an input section 2215 for accepting the input made by the user, and a control section 2216 for taking charge of the control of the communication control section 2209, the data holding section 2210, the data retaining medium control section 2212, the display section 2214, and the input section 2215.

Figure 23:
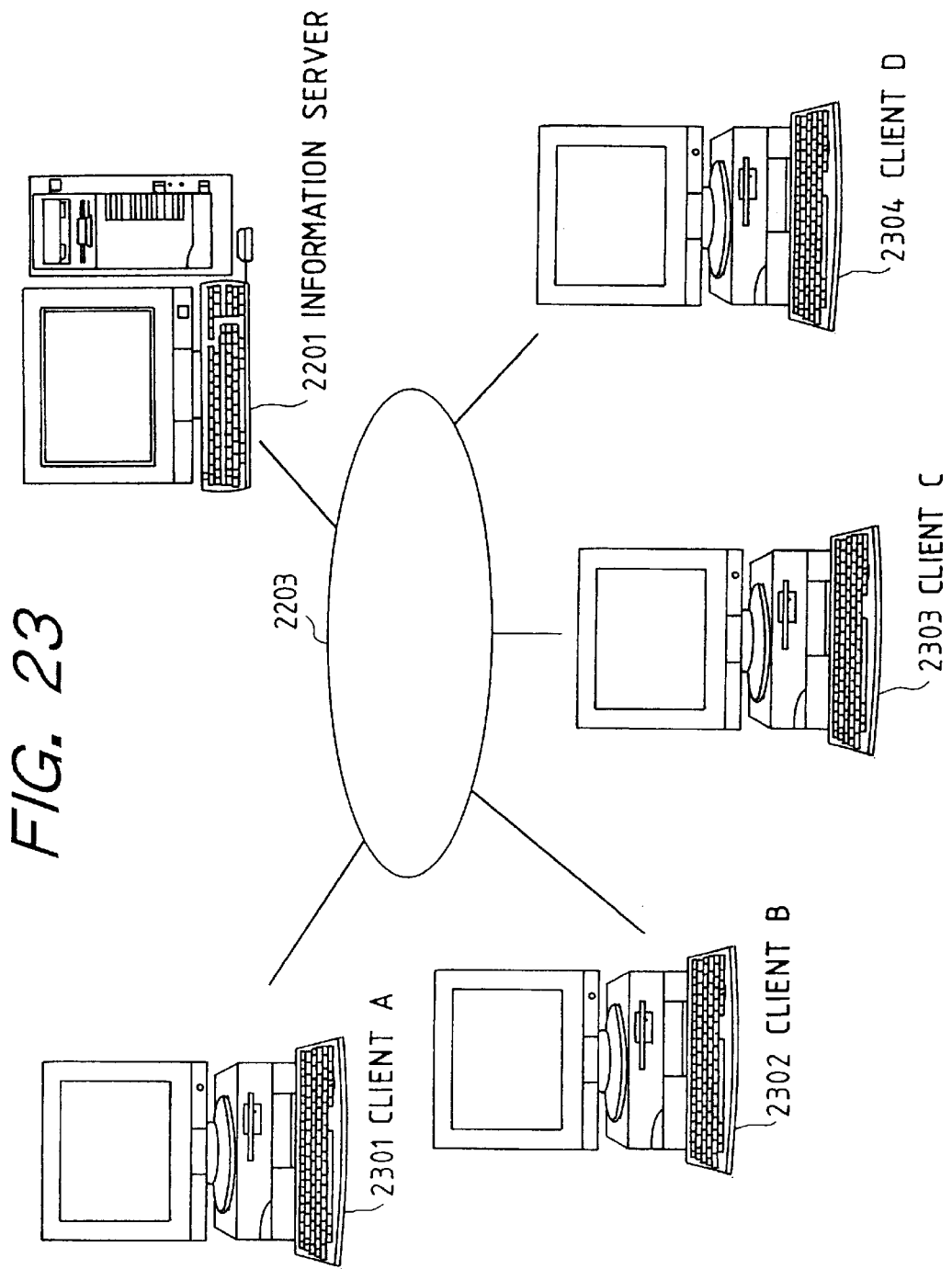
FIG. 23 is an illustration of an arrangement of the information distribution system according to the sixth embodiment using a network.

An operation of this embodiment will be described hereinbelow with reference to FIGS. 22 to 24, FIGS. 3 and 5, and Tables 8, 9, 1. FIG. 23 shows the whole arrangement of this embodiment using the network. In this illustration, numeral 2201 depicts the information server for distributing the information, numerals 2301, 2302 and 2303 denote clients having the arrangement as shown in FIG. 22. In addition, numeral 2304 signifies a client with no arrangement as shown in FIG. 22, which is used for the description of the operation for the client not having the arrangement as shown in FIG. 22. Further, numeral 2203 designates a network for making the connections between the information server 2201 and the clients 2301, 2302, 2303 and 2304. Let it be assumed that as well as the first embodiment the selection data holding section 2209 of the information server 2201 retains the data "Izu heights 2. html", "Izu heights 1. html" and "Izu heights 0. html" including the contents as shown in (a), (b) and (c) of FIG. 3 as the candidates for the data files accommodating the data to be actually offered in relation to the data "Izu heights. html" as shown in Table 1. Further, the data selection section 2208 of the information server 2201 contains a data selection table as shown in Table 8.

TABLE 8

| Data Name | CD-ROM Name | Data File | Priority |
|---|---|---|---|
| Izu Heights. html | "96 Nationwide Hot Spring Inn" | Izu Heights 2. html | 2 |
| Izu Heights. html | "96 Nationwide Hot Spring Inn" | Izu Heights 1. html | 1 |
| Izu Heights. html | Others/Nothing | Izu Heights 0. html | 0 |
| Atami html | "96 Nationwide Hot Spring Inn" | Atami 2. html | 2 |
| ••• | ••• | ••• | ••• |

This Table 8 is similar to Table 3 and is for determining the name of the data file including the data to be actually offered on the basis of the name of the data requested and the title of the CD-ROM 2211 the client 2202 has. In addition to the contents of Table 3, this Table 8 includes the priority item. This item is for the purpose of preferentially determining one data file as the candidate in cases where a plurality of data files are present as the candidates. In this item, the larger number signifies a higher priority.

Also in this embodiment, in the case that the client 2202 can utilize a specific CD-ROM at the data request, the data selected as the data to be actually offered will be referred hereinafter to as corresponding data, while the data selected in the situations other than that case will be referred hereinafter to as standard data. In addition, the CD-ROM retaining the corresponding data will be referred hereinafter to as a corresponding CD-ROM. Further, as shown in Table 9 the client A 2301 having the arrangement as shown in FIG. 22 is equipped with the CD-ROM titled "96 Nationwide Hot Spring Inn", the client B 2302 is provided with the CD-ROM titled "Elements of Golf", and the client C 2303 has no CD-ROM.

TABLE 9

| Client | CD-ROM | CD-ROM List |
|---|---|---|
| Client A | "96 Nationwide Hot Spring Inn" | {"96 Nationwide Hot Spring Inn", "95 Nationwide Hot Spring Inn"} |
| Client B | "Elements of Golf" | {"95 Nationwide Hot Spring Inn", "Elements of Golf"} |
| Client C | Nothing | {"Elements of Golf"} |
| Client D | — | — |

As shown in this Table 9, as the list of the CD-ROMs usable for the respective clients, the client A retains {"96 Nationwide Hot Spring Inn", "95 Nationwide Hot Spring Inn"}, the client B has {"95 Nationwide Hot Spring", "Elements of Golf"}, and the client C has {"Elements of Golf"}. Further, the CD-ROMs titled "96 Nationwide Hot Spring Inn" and "95 Nationwide Hot Spring Inn" have the same contents as those in the first embodiment. In addition, the CD-ROM "Elements of Golf" does not retain the data "Hotel A Standard. mpg" or "Hotel B Standard. mpg" and does not relate to the information about the Izu Heights.

Figure 24:
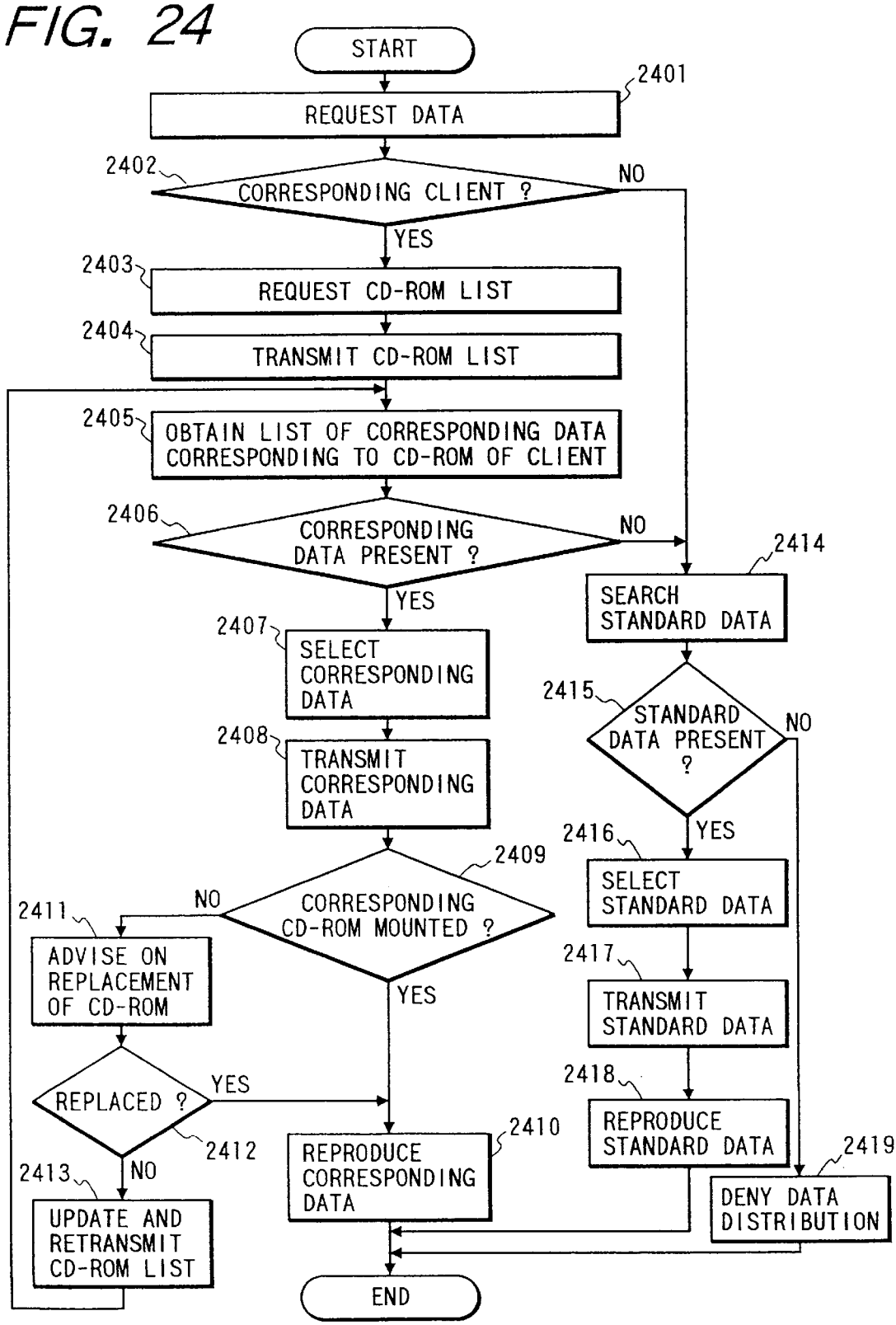
FIG. 24 is a flow chart showing an operation of the information distribution system according to the sixth embodiment.

Referring to FIG. 24, a description will be made hereinbelow of the operational flows taken for when the clients A 2301, B 2302 and C 2303 receives the data "Izu Heights. html" from the information server 2201. The description will begin with the case of the client A 2301. First of all, the user gives instructions through the input section 2215 to the client A 2301 to obtain the data "Izu Heights. html" from the information server 2201. As well as the first embodiment, the client A 2301 issues a request for the data "Izu Heights. html" through the network 2203 toward the information server 2201. At this time, client A 2301 additionally sends as the auxiliary information the information indicative of the possession of the arrangement according to this invention (step 2401). In the description of this embodiment, the client with the arrangement according to this invention will be referred hereinafter to as a corresponding client.

In the information server 2201, as well as the first embodiment, the control section 2206 decides, on the basis of the auxiliary information it receives, whether or not the client A 2301 falls under the corresponding client (step 2402). In this case, since the client A 2301 is the corresponding client, the operational flow goes to a step 2403 and the following steps. The control section 2206 of the information server 2201 gives instructions to the communication control section 2204 to make a request toward the client A 2301 so that the client A 2301 transmits the list of the CD-ROMs usable therefor (step 2403). In the client A 2302, the communication control section 2209 communicates that request to the control section 2216. This control section 2216 request the list of the usable CD-ROM from the CD-ROM list holding section 2213. The control section 2216 gives instructions to the communication control section 2209 to send the CD-ROM list obtained from the CD-ROM list holding section 2213 through the network 2203 to the information server 2201. In this instance, the list {"96 Nationwide Hot Spring Inn", "95 Nationwide Hot Spring Inn"} goes thereto (step 2404).

In the information server 2201, the communication control section 2204 accepts the information therefrom and conveys it to the control section 2206. This control section 2206 hands over the name of the data requested and that information to the data selection section 2208. In this case, the name of the requested data is "Izu Heights. html" and the list is {"96 Nationwide Hot Spring Inn", "95 Nationwide Hot Spring Inn"}. The data selection section 2208 draws out a list of the corresponding data with respect to the CD-ROMs included in the first-mentioned list, arranged in accordance with their priorities, on the basis of the name of the requested data and the first-mentioned given CD-ROM list and through the use of the data selection table (Table 8). In this case, the corresponding data "Izu Heights 2. html" and "Izu Heights 1. html" which meet the condition are obtainable from Table 8, and their priorities are 2 and 1, with the result that the corresponding data list to be returned comes to {"96 Nationwide Hot Spring Inn", "95 Nationwide Hot Spring Inn"} (step 2405).

The data selection section 2208 checks the obtained corresponding data list. In this case, since the list includes the corresponding data (step 2406), the operational flow goes to a step 2407. Subsequently, the data section section 2208 selects one corresponding data with the highest priority as the data to be actually offered to the client A 2301 from the obtained corresponding data and then conveys it to the control section 2206. At this time, it additionally conveys the title of the corresponding CD-ROM. In this instance, the corresponding data to be sent is "Izu Heights 2. html" and the title to be delivered is "96 Nationwide Hot Spring Inn" (step 2407). The control section 2206 uses the communication control section 2204 to transmit these corresponding data and corresponding title through the network 2203 to the client A 2301. In this case, although "Izu Heights 2. html" is delivered as the corresponding data and "96 Nationwide Hot Spring Inn" is sent as the title, since in this data there is not written a control code for using the image data "Hotel A Simplicity. mpg" and "Hotel B Simplicity. mpg", these data do not undergo the transmission (step 2408).

In the client A 2301, the communication control section 2209 receives them and hands them over to the control section 2216. The control section 2216 checks whether or not the CD-ROM whose title is equal to the title of the corresponding CD-ROM is put in the CD-ROM control section 2212. In this case, the check is made of the mounting of the CD-ROM "96 Nationwide Hot Spring Inn", and since the decision is made to the mounting thereof (step 2409), the processing advances to a step 2410. The client A 2301 reproduces the corresponding data as well as the first embodiment. At this time, the data "Hotel A Standard. mpg" and "Hotel B Standard. mpg" in the CD-ROM "96 Nationwide Hot Spring Inn" 2211 are put to use.

As described above, the client A 2301, which is equipped with the CD-ROM "96 Nationwide Hot Spring Inn" and which can use the CD-ROMs "96 Nationwide Hot Spring Inn" and "95 Nationwide Hot Spring Inn", makes a request for the data "Izu Heights. html" toward the information server 2201, the image data "Hotel A Simplicity. mpg" and "Hotel B Simplicity. mpg" the information server 2201 retains are not delivered through the network 2203, while instead the image data "Hotel A Standard. mpg" and "Hotel B Standard. mpg" existing in the CD-ROM the client A 2301 has and higher in appeal are used at the data reproduction.

Secondly, a description will be taken hereinbelow of the case of the client B 2302. As in the case of the client A 2301, the communication between the client B 2302 and the information server 2201 is made in the operation up to the step 2403. The information server 2201 issues a request for the list of the CD-ROMs available for the client B 2302 toward the client B 2302 (step 2403). Unlike the client A 2301, the client B 2302 gives the list of the CD-ROMs usable for the client B 2302 to the information server 2201 (step 2404). In this case, the list is {"95 Nationwide Hot Spring Inn", "Elements of Golf"}. In the information server 2201, as in the case of the client A 2301, the data selection section 2208 obtains the list of the corresponding data. In this case, the list is {"Izu Heights 1. html"} (step 2405). The data selection section 2208 checks the obtained list of the corresponding data. In this case, since the list is not vacant (step 2406), a step 2407 follows in the operational flow. Subsequently, the data selection section 2208 selects one corresponding data with the highest priority from the obtained corresponding data as the data to be actually offered to the client B 2302 and then communicates it to the control section 2206. In the present case, the data "Izu Heights 1. html" undergoes the selection (step 2407). The control section 2206 uses the communication control section 2204 to transmit that selected data through the network 2203 to the client B 2302. In this case, the data transmitted is "Izu Heights 1. html", and the image data "Hotel B Simplicity. mpg" the information server 2201 retains is additionally sent through the network 2203 to the client B 2302 (step 2408).

As well as the client A 2301, the client B 2302 checks whether or not the corresponding CD-ROM is put in the CD-ROM control section 2212. In this case, the check is made of the CD-ROM "95 Nationwide Hot Spring Inn", and since the CD-ROM titled "Elements of Golf" is put therein (step 2409), the operational flow goes to a step 2411. The control section 2216 of the client B 2302 uses the display section 2214 to advise the user to replace the current CD-ROM with the corresponding CD-ROM. In this case, the advice is made to replace it with the CD-ROM "95 Nationwide Hot Spring Inn" (step 2411). The user answers through the input section 2215 as to whether he replaces the CD-ROM. In this instance, let it be assumed that the user's answer shows the replacement and the user actually replaces it. The control section 2216 decides, on the basis of the input made by the user and the variation of the state of the CD-ROM control section 2212, whether or not the current CD-ROM is replaced with the corresponding CD-ROM (step 2412). Because of the replacement, the operational flow goes to the step 2410. Subsequently, as well as the client A 2301, the client B 2302 reproduce the corresponding data. The image data "Hotel B Simplicity. mpg" coming through the network 1903 is played in the reproduction of the description section for the hotel B. On the other hand, as in the case of the client A 2301, the data "Hotel A standard. mpg" existing in the CD-ROM "95 Nationwide Hot Spring Inn" 1911 the client B 2302 holds is playbacked in the reproduction of the description section for the hotel A (step 2410).

As mentioned above, the client B 2302 which can use the CD-ROMs "95 Nationwide Hot Spring Inn" and "Elements of Golf" issues a request for the data "Izu Heights. html" toward the information server 2201, even if the CD-ROM "95 Nationwide Hot Spring Inn" is not mounted as the CD-ROM 2211 of the client B 2302 at the data request, as long as this CD-ROM is mounted therein at the data reproduction, the image data "hotel A Simplicity. mpg" is not sent through the network 2203, but the image data "Hotel A Standard. mpg" existing in the aforesaid CD-ROM the client B 2302 has and higher in appeal is used instead, which can exhibits the same effects as in the case of mounting that CD-ROM at the data request.

Furthermore, a description will be taken hereinbelow of the case of the client C 2303. As in the case of the client A 2301, the communication between the client C 2303 and the information server 2201 is made in the operation up to the step 2403 in FIG. 24. The information server 2201 issues a request for the transmission of the list of the CD-ROMs usable for the client C 2303 toward the client C 2303 (step 2403). The client C 2303 supplies the list of the usable CD-ROMs to the information server 2201 as well as the client A 2301. In this case, the list supplied is {"Elements of Golf"} (step 2404). As in the case of the client A 2301, in the information server 2201, the data selection section 2208 tries to draw out the list of the corresponding data. However, since in this case there is no corresponding data, the list becomes vacant (step 2405). The data selection section 2208 checks the list of the corresponding data obtained. Since the list is vacant (step 2406), the operational flow goes to the step 2414. Subsequently, the data selection section 2208 searches for the standard data corresponding to the requested data "Izu Heights. html", so that the standard data "Izu Heights 0. html" is attainable from Table 8 (step 2414). Thus, because of the presence of the standard data (step 2415), the operational flow goes to the step 2416. The data selection section 2208 communicates the obtained standard data "Izu heights 0. html" as the selection result to the control section 2206 (step 2416). As in the case of the client A 2301, the selected data is conveyed to the client C 2303. At this time, in addition to this data, the image data "Hotel A Simplicity. mpg" and "Hotel B Simplicity. mpg" are transmitted through the network 2203 to the client C 2303 (step 2417). The client C 2303 reproduces the obtained data as well as the client A 2301. In this instance, the image data "Hotel A Simplicity. mpg" sent through the network 2203 is played in the reproduction of the description section for the hotel A, and in like manner the image data "Hotel B Simplicity. mpg" is played in the reproduction of the description section for the hotel B (step 2418).

As mentioned above, in cases where the client C 2303 which can not utilize the corresponding CD-ROM makes a request for the data "Izu Heights. html" toward the information server 2201, the image data "Hotel A Simplicity. mpg" and "Hotel B Simplicity. mpg" are transmitted from the information server 2201 through the network 2203 to the client C 2303.

Moreover, a description will be made hereinbelow of the operational flow taken for when the client D 2304 requests the data "Izu Heights. html" from the information server 2201. The client D 2304 has the same arrangement as that of the client D 204 in the first embodiment, that is, the FIG. 5 arrangement, and conducts the same operation. As well as the first embodiment, the client D 2304 thus arranged makes a request for the data "Izu Heights. html" toward the information server 2201. Since the client C 2304 does not have the arrangement according to this invention, the information indicative of the possession of the arrangement according to this invention is not transmitted as the auxiliary information to the information server 2201 (step 2401). The information server 2201 develops the operations as in the case of the client A 2301. In this case, since the client D 2304 does not fall under the corresponding client, the operational flow goes from the decision step 2402 to a step 2414. Thereafter, as in the case of the client C 2303, the information server 2201 transmits the standard data "Izu heights 0. html" and the image data "Hotel A Simplicity. mpg" and "Hotel B Simplicity. mpg" to the client D 2304 (steps 2414, 2415, 2416 and 2417). As well as the client C 2303, the client D 2304 reproduces the standard data so that the image data "Hotel A Simplicity. mpg" sent through the network 2203 is used in the description section for the hotel A, while the image data "Hotel B Simplicity. mpg" is used in the description section for the hotel B.

As described above, in cases where the client D 2304 with no arrangement according to this invention requests the data "Izu heights. html" from the information server 2201, the image data "Hotel A Simplicity. mpg" and "Hotel B Simplicity. mpg" are transmitted from the information server 2201 through the network 2203 to the client D 2304.

According to this embodiment, when the information server with the arrangement according to this invention distributes information through the network, if the client has the arrangement according to this invention and is equipped with a specific data retaining medium, through the use of the data in the data retaining medium the data corresponding to the request data is distributable without depending upon the method of transmitting a large amount of data such as a motion picture through the network to the client, which means the effective distribution of the data including a large amount of data such as a motion picture. Further, even if the client having the arrangement according to this invention is not provided with the specific data retaining medium, the preparation of the standard data in the information server side enables the data distribution. Still further, even if the client does not have the arrangement according to this invention, the preparation of the standard data in the information server side also enables the data distribution.

In the case of the client B 2302, when the user rejects the replacement in the step 2412, the control section of the client B 2302 sends the list excluding "95 Nationwide Hot Spring Inn" through the communication control section 2209 to the information server 2201 (step 2413). At this time, the information server 2201 reselects and retransmits the data after the step 2405. In the present case, the new CD-ROM list is {"Elements of Golf"} and hence there is no corresponding data found, with the result that as in the case of the client C 2303 the standard data is searched to select the data "Izu Heights 0. html" (steps 2405, 2406, 2414). Subsequently, as in the case of the client C 2303, the selected standard data "Izu heights 0. html" is transmitted to the client B 2302. Since in the present case the image data "Hotel B Simplicity. mpg" has already been sent to the client B 2302, only the data "Hotel A Simplicity. mpg" not yet sent is transmitted without repeated transmission (steps 2415, 2416). The client B 2302 receives the standard data and the image data "Hotel A Simplicity. mpg" and reproduces them in addition to "Hotel B Simplicity. mpg" it already received as well as the client C 2303 (step 2418).

Incidentally, for the calculation of the aforesaid priority, it is also appropriate that the priority is determined taking into consideration the present mounting situation of the CD-ROM of the client. Further, it is also possible that all the possible corresponding data and standard data are given to the client 2202 so that the user selects the CD-ROM which is actually put to use. In this case, the data amount to be transferred through the network 2203 increases, while the retransmission of the data is avoidable when the user rejects the replacement of the CD-ROM. Still further, in the client 2202, the processing to be taken in the case that the corresponding CD-ROM is usable but not mounted is not limited to the above-mentioned operation. It is also possible to replace the CD-ROM. Moreover, the processing taken for when the user denies the replacement of the data retaining medium is not limited to the above-mentioned operation. For example, for the retransmission of the data, it is also possible to send only the difference from the already sent data.

Seventh Embodiment

Figure 25:
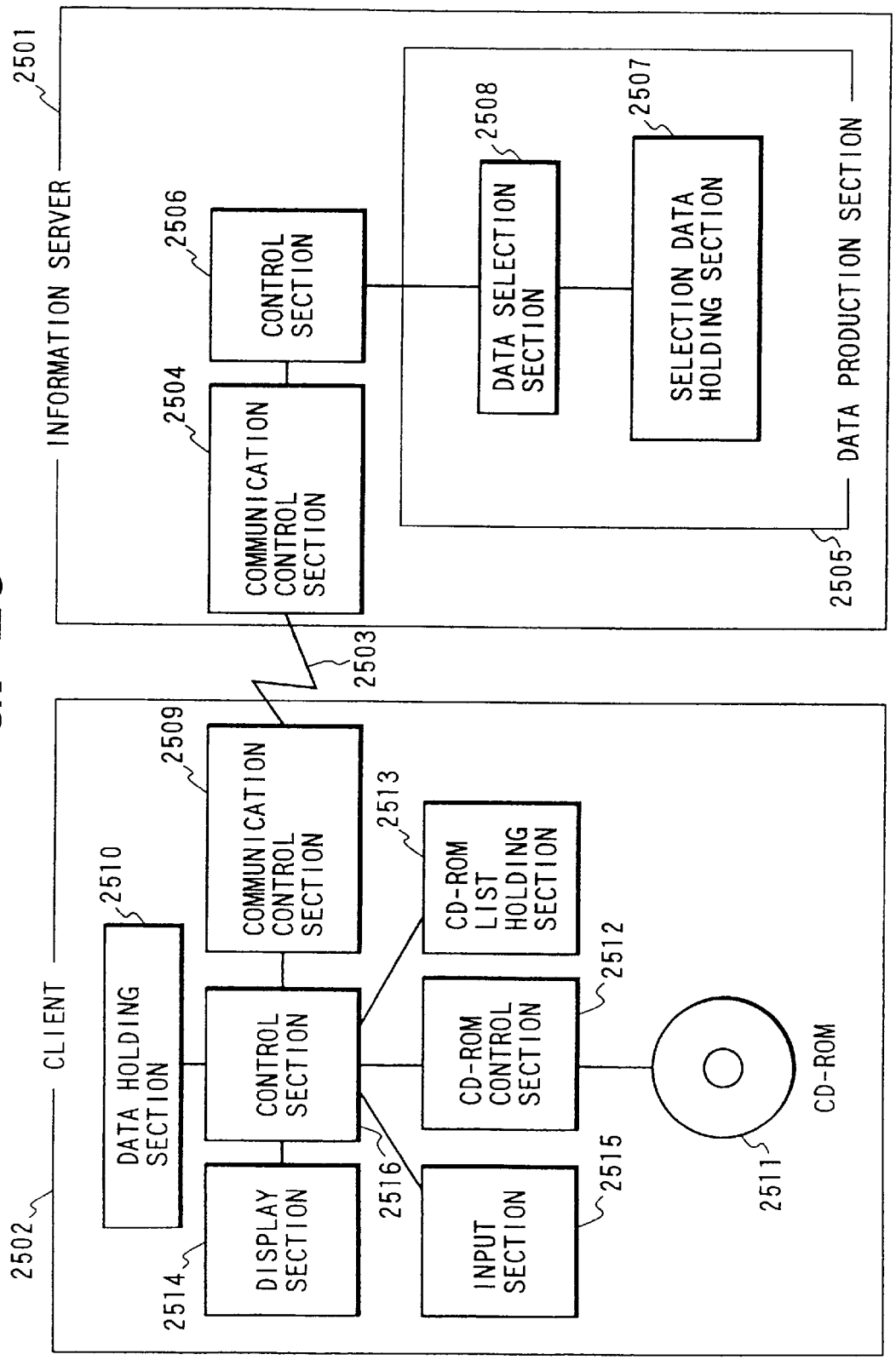
FIG. 25 is an illustration of an arrangement of an information distribution system according to a seventh embodiment of the present invention.

Moreover, a description will be made hereinbelow of a seventh embodiment of the present invention. This embodiment has the same arrangement as that of the sixth embodiment except for its operation. FIG. 25 shows the arrangement of this embodiment. In FIG. 25, numeral 2501 represents an information server for performing the information distribution, numeral 2502 designates a client which receives the information therefrom, and numeral 2503 signifies a network for establishing the connection between the information server 2501 and the client 2502. The information server 2501 is made up of a communication control section 2504 for controlling the communication with the network 2503, a data production section 2505 for producing and obtaining data to be offered, and a control section for controlling the communication control section 1504 and the data production section 2505. In this embodiment, the data production section 2505 is composed of a selection data holding section 2507 for holding a set of data and a data selection section 2508 for selecting the data in the data holding section 2507. Further, the client 2502 includes a communication control section 2509 for controlling the communication with the network 2503, a data holding section 2510 for holding data, a CD-ROM 2511 being a portable large capacity data retaining medium, a CD-ROM control section 2512 for controlling the CD-ROM 2511, a CD-ROM list holding section 2513 for holding a list of the titles of the CD-ROMs available for the client 2502, a display section 2514 for displaying various data and messages to the user, an input section 2515 for accepting the input made by the user, and a control section 2516 for taking charge of the control of the communication control section 2509, the data holding section 2510, the data retaining medium control section 2512, the display section 2514 and the input section 2515.

Figure 26:
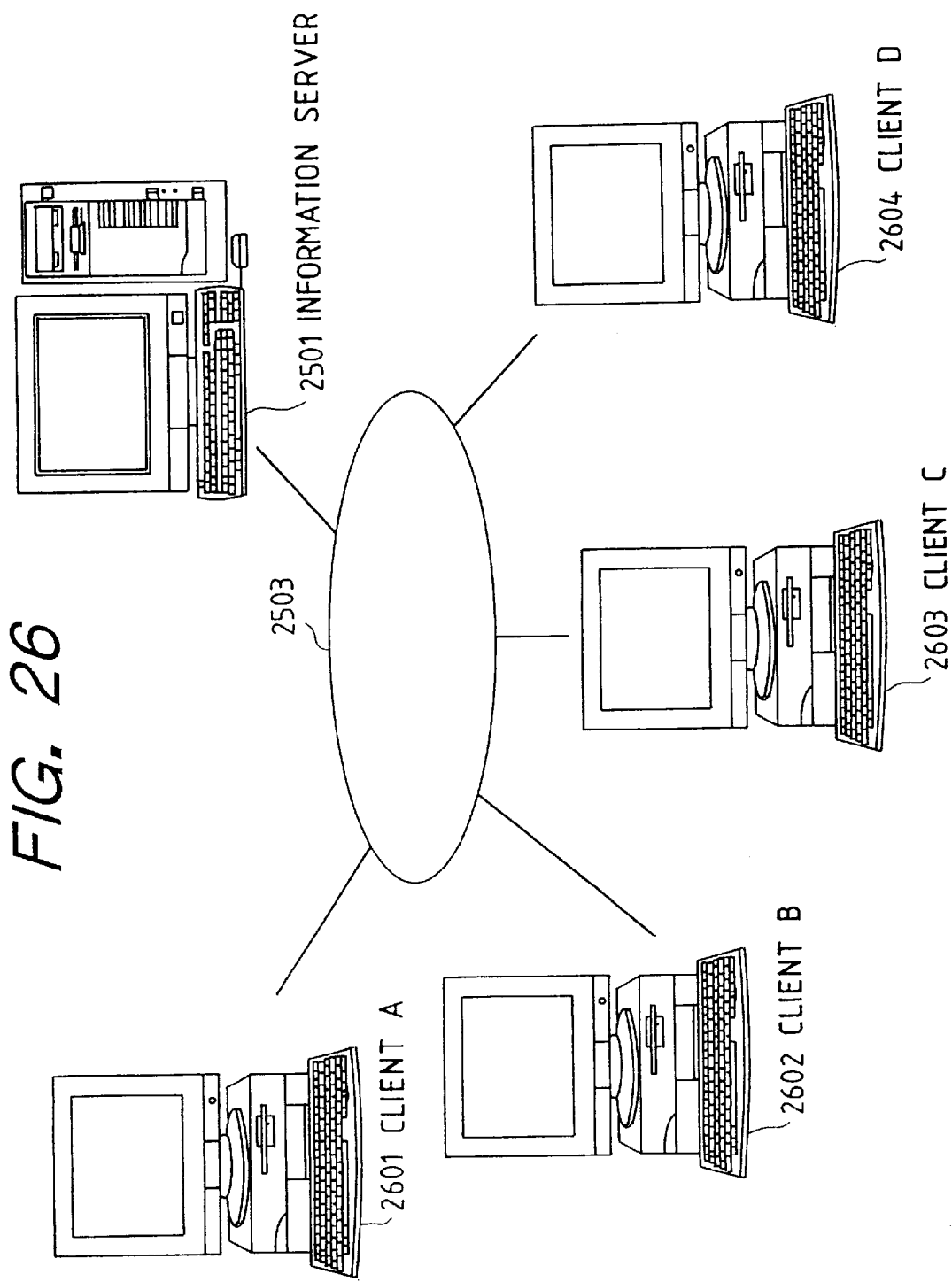
FIG. 26 is an illustration of an arrangement of the information distribution system according to the seventh embodiment using a network.

An operation of this embodiment will be described hereinbelow with reference to FIGS. 25 to 27, FIGS. 3 and 5, and Tables 1, 8 and 9. FIG. 26 shows the entire arrangement of this embodiment using the network. In the illustration, numeral 2501 denotes the information server for the information distribution, numerals 2601, 2602 and 2603 stand for clients each having the arrangement as shown in FIG. 25. In addition, numeral 2604 signifies another client which does not have the arrangement as shown in FIG. 25. This is available for describing the operation for a client not having the arrangement according to this invention. Further, numeral 2503 depicts the network for establishing the information server 2501 and the clients 2601, 2602, 2603 and 2604. As well as the first embodiment, the selection data holding section of the information server 2501 retains the data files "Izu heights 2. htm1", "Izu heights 1. html" and "Izu heights 0. html" as the candidates for the data files accommodating the data to be actually offered in relation to the data "Izu Heights. html" as shown in Table 1. These files include the contents as shown in (a), (b) and (c) of FIG. 3. Further, as well as the first embodiment, the data selection section 2508 of the information server 2501 contains a data selection table (Table 8). In the description of this embodiment, the data selected as the data to be actually offered in the case that the client 2502 uses a specific CD-ROM at the data request will be referred hereinafter to as corresponding data which corresponds to that CD-ROM in terms of the requested data, and the data to be selected in the situation other than this case will be referred hereinafter to as standard data. Further, the CD-ROM having the corresponding data will be referred hereinafter to as a corresponding CD-ROM. Still further, let it be assumed that as well as the sixth embodiment the CD-ROMs the respective clients have and the list of the CD-ROMs usable for the respective clients is as shown in Table 9. In addition, let it be assumed that the contents of the CD-ROMs named "96 Nationwide Hot Spring Inn" and "95 Nationwide Hot Spring Inn" are also the same as those in the sixth embodiment, and the CD-ROM named "Elements of Golf" does not include the data "Hotel A. mpg" and "Hotel B. mpg" and does not relate to the Izu Heights.

Figure 27:
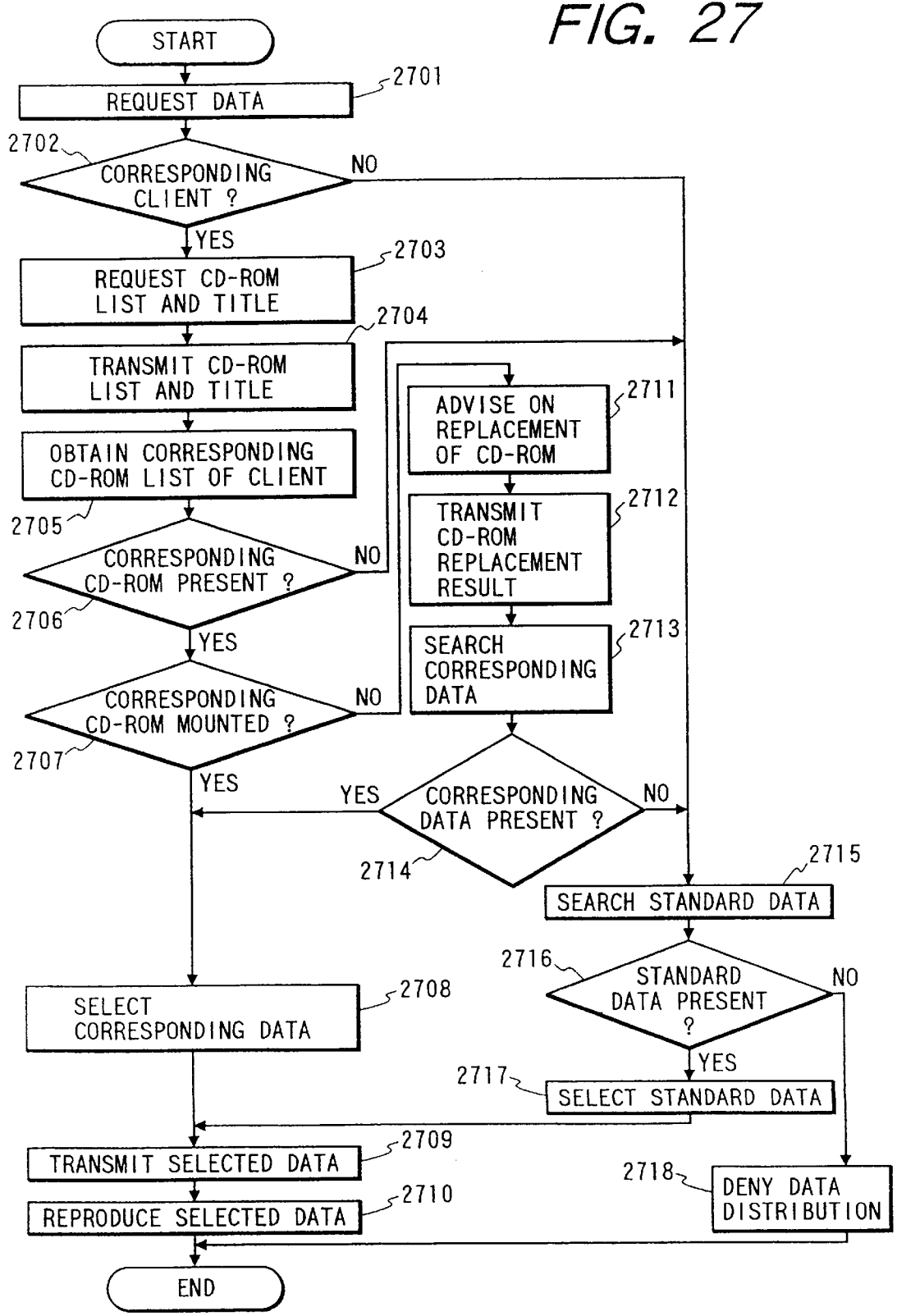
FIG. 27 is a flow chart showing an operation of the information distribution system according to the seven embodiment.

Referring to FIG. 27 a description will be made hereinbelow of the operational flows taken for when the clients A 2601, B 2602 and C 2603 receive the data "Izu Heights. html" from the information server 2501. The description will begin with the case of the client A 2601. First of all, the user gives instructions through the input section 2515 to the client A 2601 to obtain the data "Izu heights. html" from the information server 2501. As well as the first embodiment, the client A 2601 transmits a request for the data "Izu Heights. html" through the network 2503 to the information server 2501. At this time, the information indicative of the fact that the client A 2601 has the arrangement according to this invention is additionally transmitted thereto (step 2701). Similarly, the client with the arrangement according to this invention will be referred hereinafter to as a corresponding client. As well as the sixth embodiment, in the information server 2501 the control section 2506 checks, on the basis of the auxiliary information it receives, whether the client A 2601 comes under the corresponding client (step 2702). In this case, since the client A 2601 is the corresponding client, the operational flow goes to a step 2703 and the following steps. Subsequently, the control section of the information server 2501 gives instructions to the communication control section 2504 to make a request to the client A 2601 so that the client A 2601 transmits to the information server 2501 the list of the CD-ROMs usable for the client A 2601 and the title of the CD-ROM put in the CD-ROM control section 2512 (step 2703).

In the client A 2601, the communication control section 2509 communicates that request to the control section 2516. The control section 2516 makes a request for the list of the usable CD-ROMs toward the CD-ROM list holding section 2513. The CD-ROM list holding section 2513 delivers it thereto. In this case, the list delivered is {"96 Nationwide Hot Spring Inn", "95 Nationwide Hot Spring Inn"}. Further, the control section 2515 requests the title of the mounted CD-ROM from the CD-ROM control section 2512 and obtains the title "96 Nationwide Hot Spring Inn" from the CD-ROM control section 2512. The control section 2515 gives instructions to the communication control section 2209 to send the aforesaid list and title through the network 2503 to the information server 2501 (step 2704). In the information server 2501, the communication control section 2504 receives these information and communicates them to the control section 2606. The control section 2506 hands over the the name of the requested data and these information to the data selection section 2508. In this case, the name of the data is "Izu heights. html", the list is {"96 Nationwide Hot Spring Inn", "95 Nationwide Hot Spring Inn"}, and the title is "96 Nationwide Hot Spring Inn".

The data selection section 2508 receives these information and draws out a list of the corresponding CD-ROMs of the CD-ROMs listed, arranged successively in accordance with their priorities, on the basis of the name of the requested data and the given CD-ROM list using the data selection table (Table 8) the data selection section 2508 contains. In this instance, from Table 8 "96 nationwide Hot Spring Inn" and "95 nationwide Hot Spring Inn" are obtained as the corresponding CD-ROMs satisfying the condition and their priorities are 2 and 1, and hence the the corresponding CD-ROM list to be returned becomes {"96 Nationwide Hot Spring Inn", "95 Nationwide Hot Spring Inn"} (step 2705). The data selection section 2508 checks the obtained list of the conesponding data. Since in this case the list is not vacant (2706), the operational flow advances to a step 2707. Subsequently, the data section section 2508 checks whether the CD-ROM with the highest priority of the CD-ROMs included in the obtained corresponding CD-ROM list is mounted in the CD-ROM control section 2512 of the client A 2601 (step 2707). In this case, because of its being mounted therein, the operational flow advances to a step 2708. Then, the data selection section 2508 selects the corresponding data, which corresponds to the CD-ROM 2511 put in the client A 2601, as the data to be actually supplied to the client A 2601, and conveys it to the control section 2506 (step 2708). In this case, that data is "Izu heights 2. html". The control section 2506 receives the corresponding data and delivers it through the communication control section 2504 to the client A 2601 by way of the network 2503. In this case, since in the data "Izu Heights 2. html" delivered there is not written a control code for utilizing the image data "Hotel A Simplicity. mpg" and "Hotel B Simplicity. mpg", these data are not subjected to the transmission (step 2709). The client A 2601 reproduces the corresponding data as well as the first embodiment. At this time, use is made of the data "Hotel A Standard. mpg" and "Hotel B Standard. mpg" in the CD-ROM "96 Nationwide Hot Spring Inn" 2511 (step 2710).

As described above, in cases where the client A 2601, which is equipped with the CD-ROM "96 Nationwide Hot Spring Inn" and which can use the CD-ROMs "96 Nationwide Hot Spring Inn" and "95 Nationwide Hot Spring Inn" makes a request for the data "Izu heights. html" toward the information server 2501, the inage data "Hotel A Simplicity. mpg" and "Hotel B Simplicity. mpg" are not sent through the network 2503, but instead use is made of the image data "Hotel A Standard. mpg" and "Hotel B Standard. mpg" existing in the aforesaid CD-ROM of the client A 2601 and higher in appeal at the time of the data reproduction.

Secondly, a description will be taken hereinbelow of the case of the client B 2602. As in the case of the client A 2601, the communication between the client B 2602 and the information server 2501 is made in the operation up to the step 2703. The information server 2501 makes a request to the client B 2602 so that the client B 2602 transmits to the information server 2501 the list of the CD- ROMs usable for the client B 2602 and the title of the CD-ROM 2511 mounted in the CD-ROM control section 2512 thereof (step 2703). As w ell as the client A 2601, the client B 2 2602 transmits to the information server 2501 the list of the CD-ROMs usable therefor and the title of the CD-ROM put in the CD-ROM control section 2512 thereof (step 2704). In this case, the list {"95 Nationwide Hot Spring Inn", "Elements of Golf"} and the title "Elements of Golf" undergo the transmission.

In the information server 2501, as in the case of the client A 2601, the data selection section 2508 obtains the list of the corresponding CD-ROMs, which is {"95 Nationwide Hot Spring Inn"} (step 2705). The data selection section 2508 checks the corresponding data list it obtains. In this case, since the list is not vacant (step 2706), the control advances to the step 2707.

Subsequently, the data selection section 2508 decides whether the CD-ROM with the highest prio rity of the CD-ROMs included in the obtained corresponding CD-ROM list is put in the CD-ROM control section 2512 of the client B 2602. In this case, since the CD-ROM put therein is the different CD-ROM "Elements of Golf", the control goes to a step 2711. The data selection section 2508 delivers to the control section 2512 the list of the corresponding CD-ROMs and the information indicative of the fact that the CD-ROM with the highest priority is not put in the CD-ROM control section 2512 of the client B 2602. The control section 2516 uses the communication control section 2504 to make a request to the client B 2602 so that the client B 2602 makes suggestions of the replacement with the CD-ROM with the highest priority (in this case, "95 Nationwide Hot Spring Inn") to the user (step 2711).

In the client B 2602, the communication control section 2509 receives that request and hands it over to the control section 2516. The control section 2516 uses the display section 2514 to make suggestions of the replacement of the CD-ROM, that is, the replacement with the CD-ROM "95 Nationwide Hot Spring Inn", toward the user. The answer from the user comes through the input section 2515 to the control section 2516 which in turn, confirms the situation of the CD-ROM control section 2512 and communicates the replacement result through the communication control section 2509 to the information server 2501. In this case, let it be assumed that the user's answer is the replacement and the CD-ROM is actually replaced (step 2712). In the information server 2501, the communication control section 2504 receives the information on the replacement result in the client B 2602 side and conveys it to the control section 2506. This control section 2506 makes a request to the data selection section 2508 to obtain the corresponding data which corresponds to the replaced CD-ROM. In this instance, it searches the corresponding data in the case that the CD-ROM "95 Nationwide Hot Spring Inn" is placed with respect to the data "Izu heights. html", thus resulting in the corresponding data "Izu heights 1. html" (step 2713). Because of the presence of the corresponding data (step 2714), the operational flow goes to the step 2708. Thereafter, as in the case of the client A 2601, the information server 2501 transmits the corresponding data "Izu heights 1. html" to the client B 2602. In this case, the image data "Hotel B Simplicity. mpg" is transmitted through the network 2503 to the client B 2602 (step 2709). The client B 2602 reproduces the data it receives as well as the client A 2601. In this case, the image data "Hotel B Simplicity. mpg" is reproduced in the reproduction of the description section for the hotel B. On the other hand, as in the case of the client A 2601, the image data "Hotel A Standard. mpg" in the CD-ROM "95 Nationwide Hot Spring Inn" the client B 2602 has is reproduced in the reproduction of the description section for the hotel A (step 2710).

As mentioned above, in cases where the client B 2602 which can use the CD-ROMs "95 Nationwide Hot Spring Inn" and "Elements of Golf" issues a request for the data "Izu Heights. html" toward the information server 2501, even if the client B 2602 does not have the CD-ROM "95 Nationwide Hot Spring Inn" as its CD-ROM 2511 at the data request, when this CD-ROM is mounted at the data reproduction, the image data "Hotel A Simplicity. mpg" is not transmitted through the network 2503, but use is instead made of the image data "Hotel A Standard. mpg" existing in the aforesaid CD-ROM of the client B 2602 and higher in appeal at the data reproduction, which can exhibit the same effects as in the case that the same CD-ROM is mounted at the data request.

Furthermore, a description will be taken hereinbelow of the case of the client C 2603. As in the case of the client A 2601, the communication between the client C 2603 and the information server 2501 in the operation up to the step 2703 in FIG. 27. The information server 2501 makes a request to the client C 2603 so that the client C 2603 transmits thereto the list of the CD-ROMs usable therefor and the title of the CD-ROM mounted in the CD-ROM control section 2512 thereof (step 2703). As well as the client A 2601, the client C 2603 gives to the information server 2501 the list of the CD-ROMs usable therefor and the title of the CD-ROM put in the CD-ROM control section 2512 thereof. In this case, since no CD-ROM is put in the CD-ROM control section 2512, the list {"Elements of Golf"} is sent and a letter-absent train is sent as the title (step 2704).

In the information server 2501, as in the case of the client A 2601, the data selection section 2508 obtains the list of the corresponding CD-ROMs, which is vacant in this case (step 2705).

The data selection section 2508 checks the obtained corresponding data list. In this case, since the list is vacant (step 2706), the operational flow goes to the step 2715. Subsequently, the data selection section 2508 searches the standard data corresponding to the requested data "Izu heights. html", with the standard data "Izu Heights 0. html" being obtained from Table 8 (step 2715). Since the standard data is found (step 2716), the operational flow goes to the step 2717. The data selection section 2508 delivers the obtained standard data "Izu Heights 0. html" as the selection result to the control section 2506 (step 2716). As in the case of the client A 2601, the selected data is transmitted to the client C 2603. In this case, in addition to this data, the image data "Hotel A Simplicity. mpg" and "Hotel B Simplicity. mpg" are also sent thereto (step 2709). As well as the first embodiment, the client C 2603 reproduces the data it receives. The image data "Hotel A Simplicity. mpg" coming through the network 2503 is played in the description section on the hotel A, and in like manner the image data "Hotel B Simplicity. mpg" is played in the description section for the hotel B (step 2710).

As described above, in cases where the client C 2603 which can not use the corresponding CD-ROM makes a request for the data "Izu heights. html" to the information server 2501, the image data "Hotel A Simplicity. mpg" and "Hotel B Simplicity. mpg" are transmitted from the information server 2501 through the network 2503 to the client C 2603.

Moreover, a description will be made hereinbelow of the flow taken for when the client D 2604 which does not have the arrangement according to this invention requests the data "Izu heights. html" from the information server 1501. The client D 2604 has the same arrangement as that of the client D 204 in the first embodiment, that is, the FIG. 5 arrangement, and conducts the same operation. As well as the first embodiment, the client D 2604 thus arranged makes a request for the data "Izu heights. html" toward the information server 2501. However, since the client D 2604 does not have the arrangement according to this invention, the information indicative of the possession of the arrangement according to this invention is not fed as the auxiliary information to the information server 2501 (step 2701). The information server 2501 develops the operation as in the case of the client A 2601. However, since the client D 2604 does not fall under the corresponding client (step 2702), the operational flow goes from the decision step 2702 to the step 2715. Thereafter, as in the case of the client C 2603, the information server 2501 transmits the standard data "Izu heights 0. html" and the image data "Hotel A Simplicity. mpg" and "Hotel B Simplicity. mpg" to the client D 2604 (steps 2715, 2716 and 2717). As in the case of the client C 2603, the client D 2604 reproduces the standard data it receives. The image data "Hotel A Simplicity. mpg" sent through the network 2503 is playbacked in the description section for the hotel A and in like manner the image data "Hotel B Simplicity. mpg" is played in the description section for the hotel B.

As described above, in cases where the client D 2604 which does not have the arrangement according to this invention makes a request for the data "Izu heights. html" toward the information server 2501, the image data "Hotel A Simplicity. mpg" and "Hotel B Simplicity. mpg" are transmitted from the information server 2501 through the network 2503 to the client C 2604.

According to this embodiment, when the information server having the arrangement according to this invention performs the information distribution through the network, if the client is equipped with the arrangement according to this invention and can use a specific data retaining medium, through the use of the data in the data retaining medium, the data corresponding to the requested data is distributable without depending upon the method of transmitting a large amount of data such as a motion picture through the network, with the result that the data including a large amount of data such as a motion picture is effectively distributable. Further, even if the client has the arrangement according to this invention but not including the specific data retaining medium, the data distribution is possible as long as the information server side prepares the standard data. Still further, even if the client does not have the arrangement according to this invention, the data distribution is also possible as long as the information server side prepares the standard data.

In the step 2712 in the case of the client B 2602, in cases where the user denies the replacement of the CD-ROM, the control section 2516 of the client B 2602 sends the title of the CD-ROM mounted in the CD-ROM control section 2512 at that time through the communication control section 2509 to the information server 2501. Let it be assumed that the CD-ROM "Elements of Golf" is still put therein. In the information server 2501, the communication control section 2504 receives the information on the replacement result in the client B 2602, and hands it over to the control section 2506. The control section 2506 makes a request to the data selection section 2508 to obtain the corresponding data for the replaced CD-ROM. In this case, although the corresponding data in the case of the provision of the CD-ROM "Elements of Golf" is searched for in relation to the data "Izu heights. html", the corresponding data is unobtainable (step 2713). Because of obtaining no corresponding data (step 2714), the operational flow proceeds to the step 2715. Thereafter, as in the case of the client C 2603, the standard data "Izu Heights 0. mpg" is selected and, together with the image data "Hotel A Simplicity. mpg" and "Hotel B Simplicity. mpg" is sent to the client B 2602 and reproduced therein (steps 2715, 2716, 2717, 2709, and 2710).

If the CD-ROM 2511 put in the client 2502 is present in the corresponding CD-ROM list, it is also possible that, even if the CD-ROM does not have the highest priority, the corresponding data is selected. In this case, the data sent is not always optimal. However, there is an advantage in that the client 2502 side does not need to replace the CD-ROM. Further, in cases where a plurality of corresponding CD-ROMs are present in the CD-ROM list the client retains, if the CD-ROM with the highest priority is not put in the CD-ROM control section 2512 thereof, it is also appropriate that the fact that the plurality of CD-ROMs are available is displayed with the priorities toward the user so that the user selects one CD-ROM to be mounted from the plurality of CD-ROMs. Still further, if the CD-ROM included in the corresponding CD-ROM list is already mounted therein, it is also possible that the corresponding data which corresponds to that CD-ROM is set without the user's permission.

Eighth Embodiment

Figure 28:
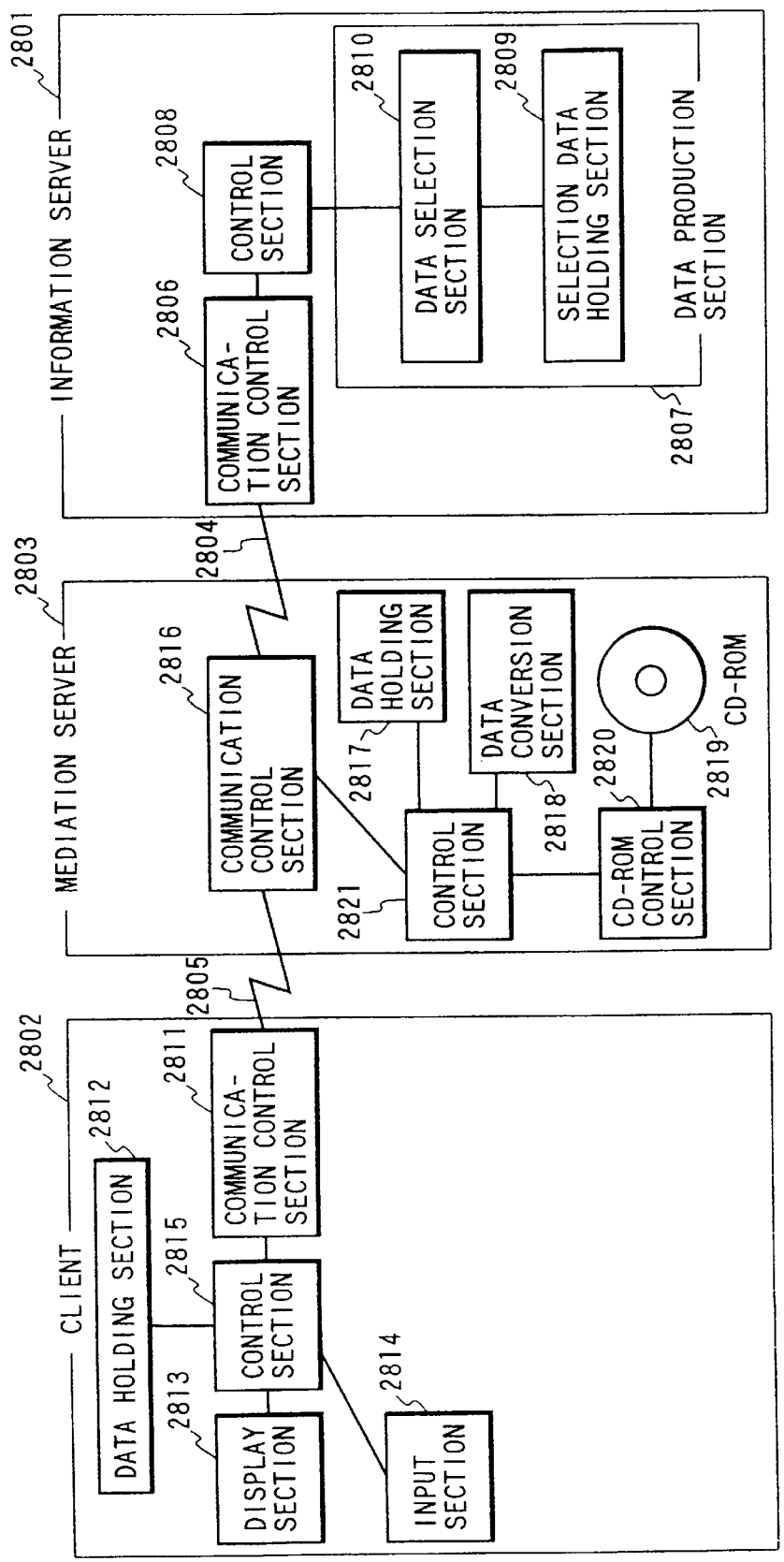
FIG. 28 is an illustration of an arrangement of an information distribution system according to an eighth embodiment of the present invention.

A description will be made hereinbelow of an eighth embodiment of the present invention. FIG. 28 shows an arrangement of this embodiment. In FIG. 28, numeral 2801 represents an information server for carrying out the information distribution, numeral 2802 designates a client which receives the information therefrom, numeral 2803 signifies a mediation server, numeral 2804 denotes a network for establishing the connection between the information server 2801 and the mediation server 2803, and numeral 2805 depicts a network for making the connection between the mediation server 2803 and the client 2802. The information server 2801 is composed of a communication control section 2806 for controlling the communication with the network 2804, a data production section 2807 for producing and obtaining data to be offered, and a control section 2808 for controlling the communication control section 2806 and the data production section 2807. Further, the data production section 2807 is made up of a selection data holding section 2809 for holding a set of data and a data selection section 2810 for selecting the data in the selection data holding section 2809.

The client 2802 comprises a communication control section 2811 for controlling the communication with the network 2805, a data holding section 2812 for holding or retaining data, a display section 2813 for displaying various data and messages to the user, an input section 2814 for accepting the input made by the user, and a control section 2815 for taking charge of the control of the communication control section 2811, the data holding section 2812, the display section 2813, and the input section 2814. Further, the mediation server 2803 is composed of a communication control section 2816 for making the communication through the networks 2804 and 2805, a data holding section 2817 for temporarily holding data offered through the networks 2804 and 2805, a data conversion section 2818 for making the conversion of the data offered from the information server 2801 when necessary, a CD-ROM 2819 being a portable large capacity data retaining medium, a data retaining medium control section 2820 for controlling the CD-ROM 2819, and a control section for taking charge of the control of the communication control section 2816, the data holding section 2817, the data conversion section 2818, and the data retaining medium control section 2820. The network 2805 is constructed as a large capacity network which is capable of transferring a large amount of data such as image data at a high speed.

An operation of this embodiment will be described hereinbelow with reference to FIGS. 28 to 30, FIG. 3, and Tables 1 and 3. Let it be assumed that as well as the first embodiment the selection data holding section 2809 of the information server 2801 retains the data "Izu heights 2. html", "Izu heights 1. html" and "Izu heights 0. html" including the contents as shown in (a), (b) and (c) of FIG. 3 as the candidates for the data files accommodating the data to be actually offered with respect to the data "Izu Heights. html" as shown in Table 1. Further, the CD-ROMs "96 Nationwide Hot Spring Inn" and "95 Nationwide Hot Spring Inn" are the same as those in the first embodiment. Still further, the data selection section 2810 contains a data selection table (Table 3) as well as the first embodiment. Also in this embodiment, the data selected as the data to be actually offered in the case that the data requesting object can use a specific CD-ROM at the time of the data being requested will be referred hereinafter to as corresponding data which corresponds to that CD-ROM, and the data selected in the situations other than that case will be referred hereinafter to as standard data. In addition, the CD-ROM retaining the corresponding data will be referred hereinafter to as a corresponding CD-ROM. Still further, let it be assumed that the mediation server 2803 includes the CD-ROM titled "95 Nationwide Hot Spring Inn" as the CD-ROM 2819 mounted in the CD-ROM control section 2820.

Figure 29:
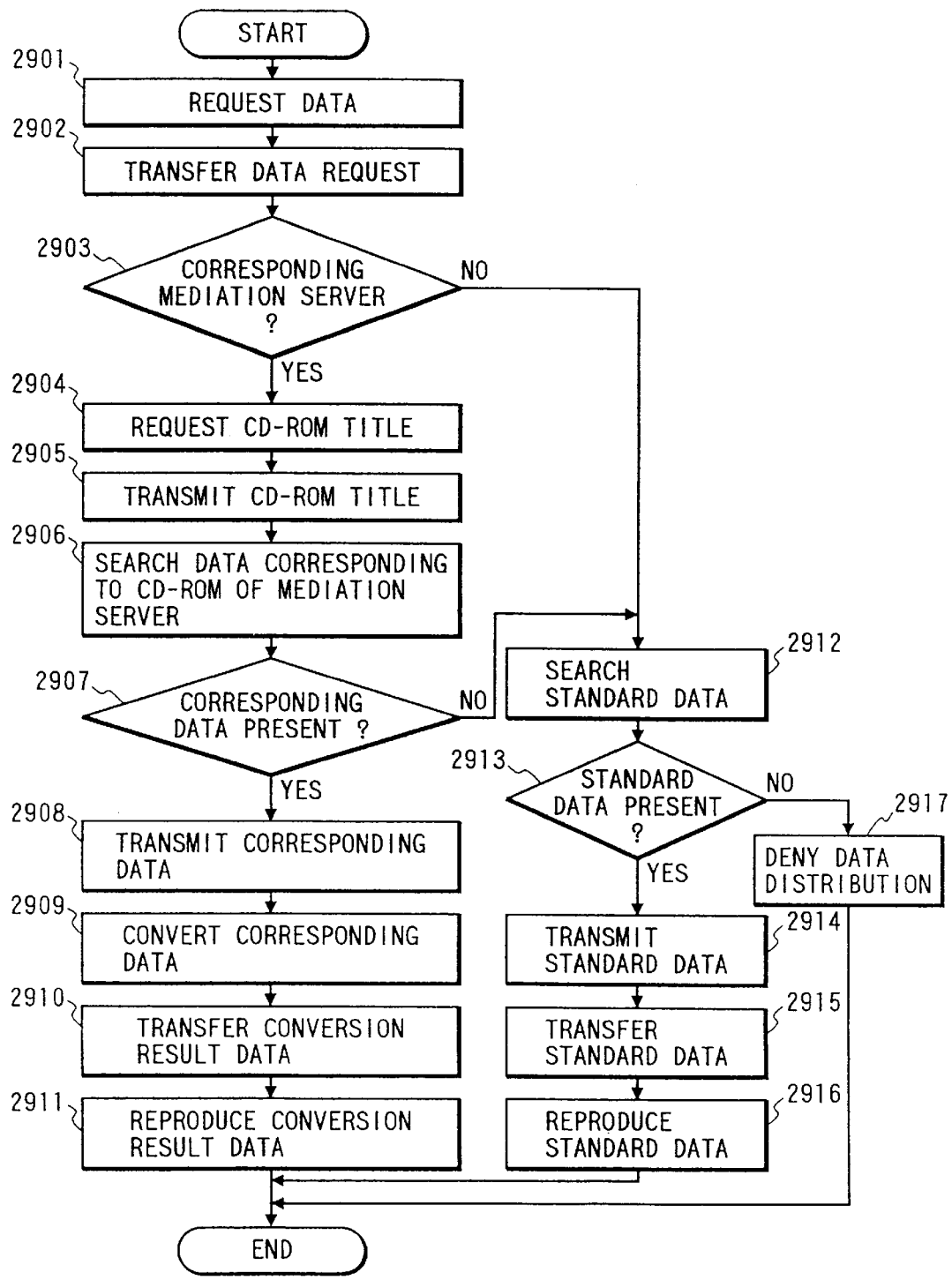
FIG. 29 is a flow chart showing an operation of the information distribution system according to the eighth embodiment.

Referring to FIG. 29, a description will be made hereinbelow of the flow taken for when the client 2802 makes a request for the data "Izu Heights. html" through the mediation server 2803 toward the information server 2801. First of all, the user uses the input section 2814 of the client 2802 to give instructions to the client 2802 to make a request for the data "Izu Heights. html" through the mediation server 2803 to the information server 2801. The control section 2815 of the client 2802 gives instructions to the communication control section 2811 to make a request for the data "Izu heights, html" through the mediation server 2803 to the information server 2801. The communication control section 2811 sends a request through the network 2805 to the mediation server 2803 so that the mediation server 2803 obtains the data "Izu Heights. html" from the information server 2801 and then transmits it to the client 2802 (step 2901). In the mediation server 2803, the communication control section 2816 receives the request from the communication control section 2811 and conveys it to the control section 2821. The control section 2821 gives instructions to the communication control section 2816 to make a request toward the information server 2801 so that the information server 2801 supplies the data "lzu heights. html" to the mediation server 2803. The communication control section 2816 transmits the same request through the network 2804 to the information server 2801. At this time, the information indicative of the fact that the mediation server 2803 has the arrangement according to this invention is given as the auxiliary information to the information server 2801 (step 2902). In the description of this embodiment, the mediation server having the arrangement according to this invention will be referred hereinafter to as a corresponding mediation server.

In the information server 2801, the communication control section 2806 accepts the aforesaid data request and auxiliary information and communicates them to the control section 2808. The control section 2808 decides, on the basis of the auxiliary information it receives, whether or not the mediation server 2803 falls under the corresponding mediation server (step 2903). In this case, the mediation server 2803 is the corresponding mediation server, the operational flow advances to a step 2904 and the following steps. Subsequently, the control section 2808 gives instructions to the communication control section 2806 to make a request to the mediation server 2803 so that the mediation server 2803 transmits to the information server 2801 the title of the CD-ROM 2819 put in the CD-ROM control section 2820 (step 2904). In the mediation server 2803, the communication control section 2816 conveys the same request to the control section 2821 which in turn, requests the title of the mounted CD-ROM 2819 from the CD-ROM control section 2820. The CD-ROM control section 2821 hands over the title of the CD-ROM 2819 to the control section 2821. The control section 2821 uses the communication control section 2816 to send the obtained title of the CD-ROM 2819 through the network 2804 to the information server 2801. In this instance, since the CD-ROM put is "95 Nationwide Hot Spring Inn", this title is sent thereto (step 2905).

In the information server 2801, the communication control section 2806 accepts the information from the mediation server 2803 side and conveys it to the control section 2808 which in turn, hands over the name of the requested data and the same information to the data selection section 2810. In this case, the data name is "Izu height. html" and the CD-ROM title is "95 Nationwide Hot Spring Inn". The data selection section 2810 receives these data name and title to search the corresponding data referring to its data selection table (Table 3). In the present case, the data "Izu Heights 1. html" is found as the corresponding data (step 2906). The data selection section 2810 checks whether the corresponding data is present or not. Since there is the data "Izu Heights 1. html" (step 2907), the operational flow goes to a step 2908 and the following steps. The data selection section 2810 selects the found corresponding data "Izu Heights 1. html" as the data to be actually offered and derives it from the selection data holding section 2809 to hand it over to the control section 2808. The control section 2808 gives instructions to the communication control section 2806 to transmit the obtained corresponding data to the mediation server 2803. Thus, the communication control section 2806 sends the same data through the network 2804 to the mediation server 2803. At this time, since in the data "Izu heights 1. html" there is written a control code for using the image data "Hotel B Simplicity. mpg," the information server 2801 retains, this image data is derived from the selection data holding section 2809 by the data selection section 2810 and, together with the data "Izu heights 1. html", is delivered to the control section 2808 and then transmitted through the communication control section 2806 to the mediation server 2803. Because of the absence of the control code for the image data "Hotel Simplicity. mpg", that image data is n ot transmitted thereto (step 2908).

In the mediation server 2803, the communication control section 2816 receives the data "Izu heights 1. html" and "Hotel N Simplicity. mpg" from the information server 2801 through the network 2804, and then hands them over to the control section 2821 which in turn, once stores them in the data holding section 2817. Subsequently, the control section 2821 gives instructions to the data conversion section 2818 to make the conversion of the corresponding data "Izu Heights 1. html". The data conversion section 2818 examines this data and makes the conversion in terms of the portion indicating the use of the CD-ROM 2819 of the mediation server 2803 to replace it with a control code by which the client 2802 can appropriately use the CD-ROM of the mediation server 2803 when receiving and reproducing the converted data. For example, the conversion result is obtainable as shown in FIG. 30. In the illustration, the converted portion is <HOST="local-serv", . . . >, and when the client 2802 reproduces this portion, the data "Hotel A Standard. mpg" in the CD-ROM "95 Nationwide Hot Spring Inn" of the mediation server 2803 is sent through the network 2805 to the client 2802 and then displayed on the display section 2813 (2909). The portion "local-serv" signifies the name of the mediation server 2803 on the network 2805.

The data conversion section 2818 communicates the conversion result data to the control section 2821 which in turn, gives instructions to the communication control section 2816 to transmit this data and the image data "Hotel B Simplicity. mpg" coming from the information server 2801 to the client 2802. Thus, the communication control section 2816 sends these data through the network 2805 to the client 2802. In the client 2802, the communication control section 2811 receives the conversion result of the data "Izu Heights 1. html" and the data "Hotel B Simplicity. mpg" from the mediation server 2803 through the network 2805 and hands them over to the control section 2811. The control section 2811 puts these data in the data holding section 2812 and then reproduces these data to display them on the display section 2813. Since for the reproduction of the data the control code: <HOST="local-serv", CD-ROM="95 Nationwide Hot Spring Inn", FILE=Hotel A Standard. mpg"> which indicates the reproduction of the data "Hotel A Standard. mpg" in the CD-ROM "95 Nationwide Hot Spring Inn" of the mediation server 2803 toward the client 2802 is placed in the description section for the hotel A, at the reproduction of the description section for the hotel A the control section 2815 gives instructions to the communication control section 2811 to make a request through the network 2805 to the mediation server 2803 so that the mediation server 2803 transmits the data "Hotel A Standard. mpg" in its CD-ROM 2816 named "95 nationwide Hot Spring Inn" thereto. The control section 2821 of the mediation server 2803 accepts the same request through the communication control section 2816 and controls the CD-ROM control section 2820 to derive the data "Hotel A Standard. mpg" from the CD-ROM "95 Nationwide Hot Spring Inn" 2819. Further, it gives instructions to the communication control section 2816 to transmit it through the network 2805 to the client 2802. In the client 2802, the control section 2815 receives the given data "Hotel A Standard. mpg" through the communication control section 2811 and hands it over to the display section 2813 which in turn, displays it toward the user. The data "Hotel B Simplicity. mpg" sent from the information server 2801 through the mediation server 2803 is used in the description section for the hotel B (step 2911).

As described above, in cases where the client 2802 makes a request for the data "Izu heights. html" to the information server 2801 by way of the mediation server 2803 having the CD-ROM named "95 Nationwide Hot Spring Inn", the image data "Hotel A Simplicity. mpg" is not sent from the information server 2801 through the networks 2804 and 2805, but the image data "Hotel A Standard. mpg" existing in the CD-ROM of the mediation server 2803 and higher in appeal is instead transmitted through the large capacity network 2805 and put to use. On the other hand, the image data "Hotel B Simplicity. mpg" is sent from the information server 2801 through the networks 2804 and 2805 to the client 2802.

A detailed description of the case that the mediation server 2803 is provided with the CD-ROM "96 Nationwide Hot Spring Inn" will be omitted because of its being obvious. The information server 2801 provides the corresponding data "Izu Heights 2. html" to the mediation server 2803, and the client 2802 uses the data Hotel B Standard. mpg" in the CD-ROM "96 Nationwide Hot Spring Inn" of the mediation server 2803 in place of the data "Hotel B Simplicity. mpg"

Furthermore, in the case that the mediation server 2803 is not equipped with a corresponding CD-ROM, in the information server 2801 the standard data is searched, and the standard data "Izu Heights 0. html" and the image data "Hotel A Simplicity. mpg" and "Hotel B Simplicity. mpg" are sent therefrom to the mediation server 2803 (steps 2912, 2913 and 2914). The mediation server 2803 does not convert these data and directly transfer them to the client 2802 (step 2915), and the client 2802 reproduces these data as in the case of the client C in the first embodiment (step 2916).

According to this embodiment, in the case that the information server having the arrangement according to this invention carries out the information distribution through the network, when the mediation server having the arrangement according to this invention provides the information through a section having a specific data retaining medium, through the use of the data in the data retaining medium, a section for sending a large amount of data such as a motion picture through the network is located between the mediation server and the client, with the result that the data including the large amount of data such as a motion picture is effectively distributable. In addition, even if the mediation server is not provided with a specific data retaining medium, the data distribution is possible as long as the information server side prepares the standard data.

Although in this embodiment the networks 2805 and 2804 differs from each other, in this invention these networks can be the same. Further, although in this embodiment the client 2802 previously knows the information server on the network 2804 from which it requests the data, it is also possible that, for example, when the client 2802 knows the name of the data to be requested but not knowing the information server to which the request is made, the mediation server 2803 receives the name of the data requested from the client 2802 and specifies the information server 2801 on the basis of the data the mediation server has in terms of the network 2804. Still further, although in this embodiment the information server 2801 distributes the data through the mediation server 2803 to the client 2802, since the arrangement and operation of the information server 2801 can be made like the first and second embodiments in such a manner that the mediation server is regarded as a client in the first and second embodiments, the information server 2801 can directly distribute the information to the clients having the arrangement and operation in the first and second embodiments. Moreover, although in this embodiment at the conversion of the data by the mediation server 2803 the control code is placed to use the CD-ROM 2819 of the mediation server 2803, it is also possible that instead the data used in the CD-ROM 2819 is inserted into the conversion result and delivered to the client 2802. Further, it is also appropriate that the used data of the CD-ROM is sent as different data to the client 2802 and referred to when the client 2802 reproduces the conversion result data. Still further, although in this embodiment for the data provision the information server 2801 once sends the data to the mediation server 2803 and then the mediation server 2803 gives the data to the client 2802 after performing the necessary data conversion, this invention is not limited thereto. For example, it is also possible that the mediation server 2803 sends the name or address of the data requesting client on the network to the information server 2801 and at the data distribution the information server 2801 directly transmits the data undergoing the conversion similar to the aforesaid conversion by the mediation server 2803 to the client 2802.

Ninth Embodiment

Figure 31:
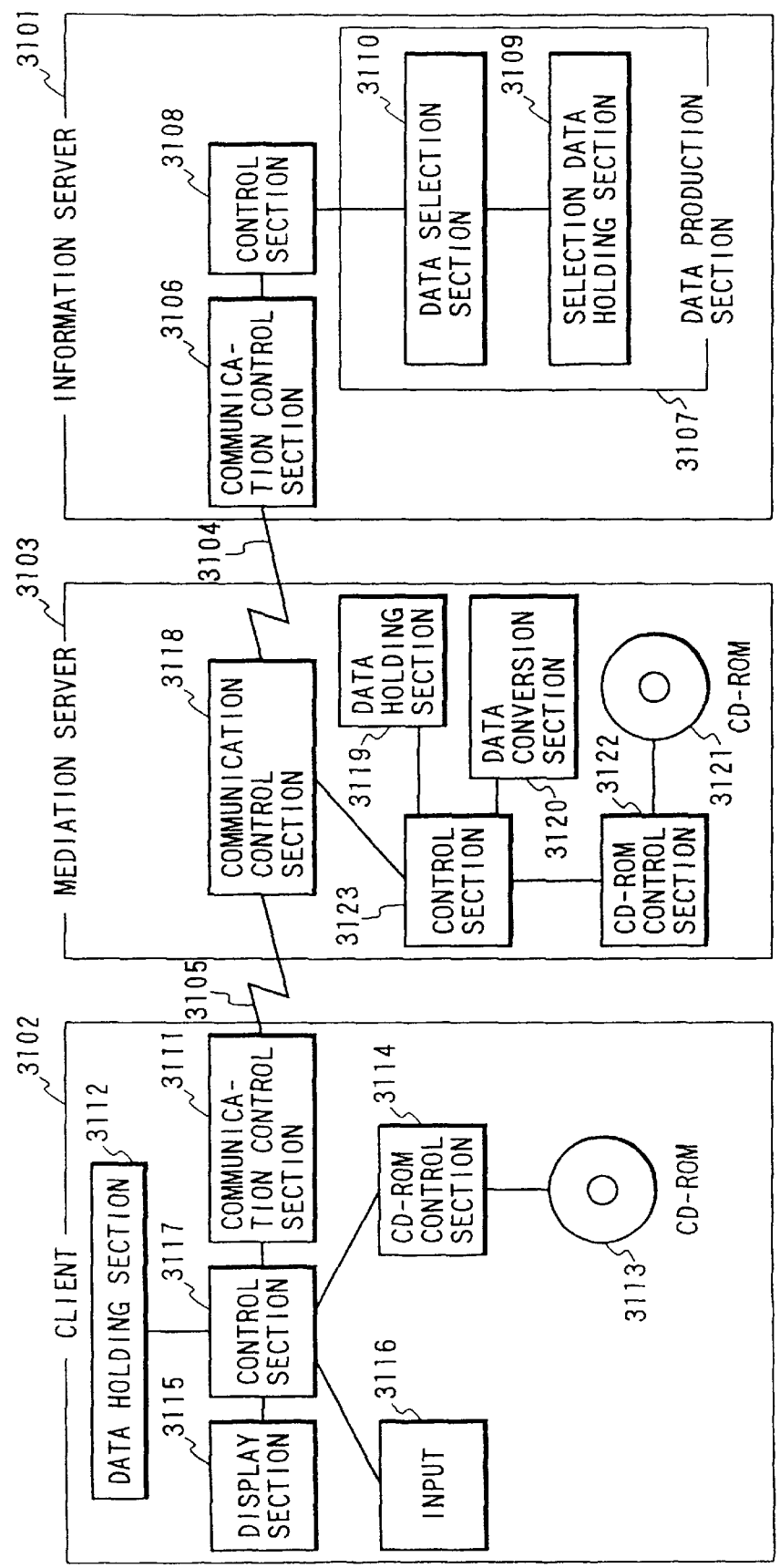
FIG. 31 is an illustration of an arrangement of an information distribution system according to a ninth embodiment of the present invention.

Moreover, a description will be made hereinbelow of a ninth embodiment of the present invention. FIG. 31 shows an arrangement of this embodiment. In FIG. 31, numeral 3101 represents an information server for distributing information, numeral 3102 designates a client which receives the information therefrom, numeral 3103 denotes a mediation server for mediating between the information server 3101 and the client 3102, numeral 3104 signifies a network for establishing the connection between the information server 3101 and the mediation server 3101, and numeral 3105 depicts a network for setting up the connection between the mediation server 3103 and the client 3102.

The information server 3101 is composed of a communication control section 3106 for controlling the communication with the network 3104, a data production section 3107 for producing and obtaining data to be offered, and a control section 3108 for controlling the communication control section 3106 and the data production section 3107. Further, the data production section 3107 includes a selection data holding section 3109 for holding a set of data to be offered and a data selection section 3110 for selecting the data in the selection data holding section.

The client 3102 is made up of a communication control section 3111 for controlling the communication with the network 3105, a data holding section 3112 for holding data, a CD-ROM 3113 being a portable large capacity data retaining medium, a CD-ROM control section 3114 for controlling the CD-ROM 3113, a display section 3115 for displaying various data and messages to the user, an input section 3116 for accepting the input made by the user, and a control section 3117 for taking charge of the control of the communication control section 3111, the data holding section 3112, the CD-ROM control section 3114, the display section 3115 and the input section 3116. The mediation server 3103 is composed of a communication control section 3118 for making communications through the networks 3104 and 3015, a data holding section 3119 for temporarily holding the data offered through the networks, a data conversion section 3120 for making the conversion of the data offered from the information server 3101 when necessary, a CD-ROM 3121 being a portable large capacity data retaining medium, a data retaining medium control section 3122 for controlling the CD-ROM 3121, and a control section 3123 for taking charge of the control of the communication control section 3118, the data holding section 3119, the data conversion section 3120 and the data retaining medium control section 3122. In this embodiment, particularly the network 3105 is a large capacity network which is capable of transmitting a large amount data such as picture data at a high speed.

An operation of this embodiment will be described hereinbelow with reference to FIGS. 31 to 35, FIG. 3 and Tables 1, 2 and 8. let it be assumed that as well as the first embodiment the selection data holding section 3109 of the information server 3101 holds the data "Izu heights 2. html", "Izu heights 1. html" and "Izu heights 0. html" including the contents as shown in (a), (b) and (c) of FIG. 3 as the candidates for the data files accommodating the data to be actually offered with respect to the data name "Izu Heights. html" as shown in Table 1. Further, the CD-ROMs "96 Nationwide Hot Spring Inn" and "95 Nationwide Hot Spring Inn" are the same as those in the first embodiment. Still further, let it be assumed that as well as the sixth embodiment the data selection section 3110 has a data selection table with priorities as shown in Table 8. Similarly, in the description of this embodiment, the data selected as the data actually offered in the case that the data requestor can use a specific CD-ROM at the data request will be referred hereinafter to as corresponding data which corresponds to that CD-ROM, and the data selected in the situation other than that case will be referred hereinafter to as standard data. In addition, the CD-ROM having the corresponding data will be referred hereinafter to as a corresponding CD-ROM. Let it be assumed that the mediation server 3103 is equipped with the CD-ROM titled "96 Nationwide Hot Spring Inn" and the client 3102 is provided with the CD-ROM titled "95 Nationwide Hot Spring Inn".

Figure 32:
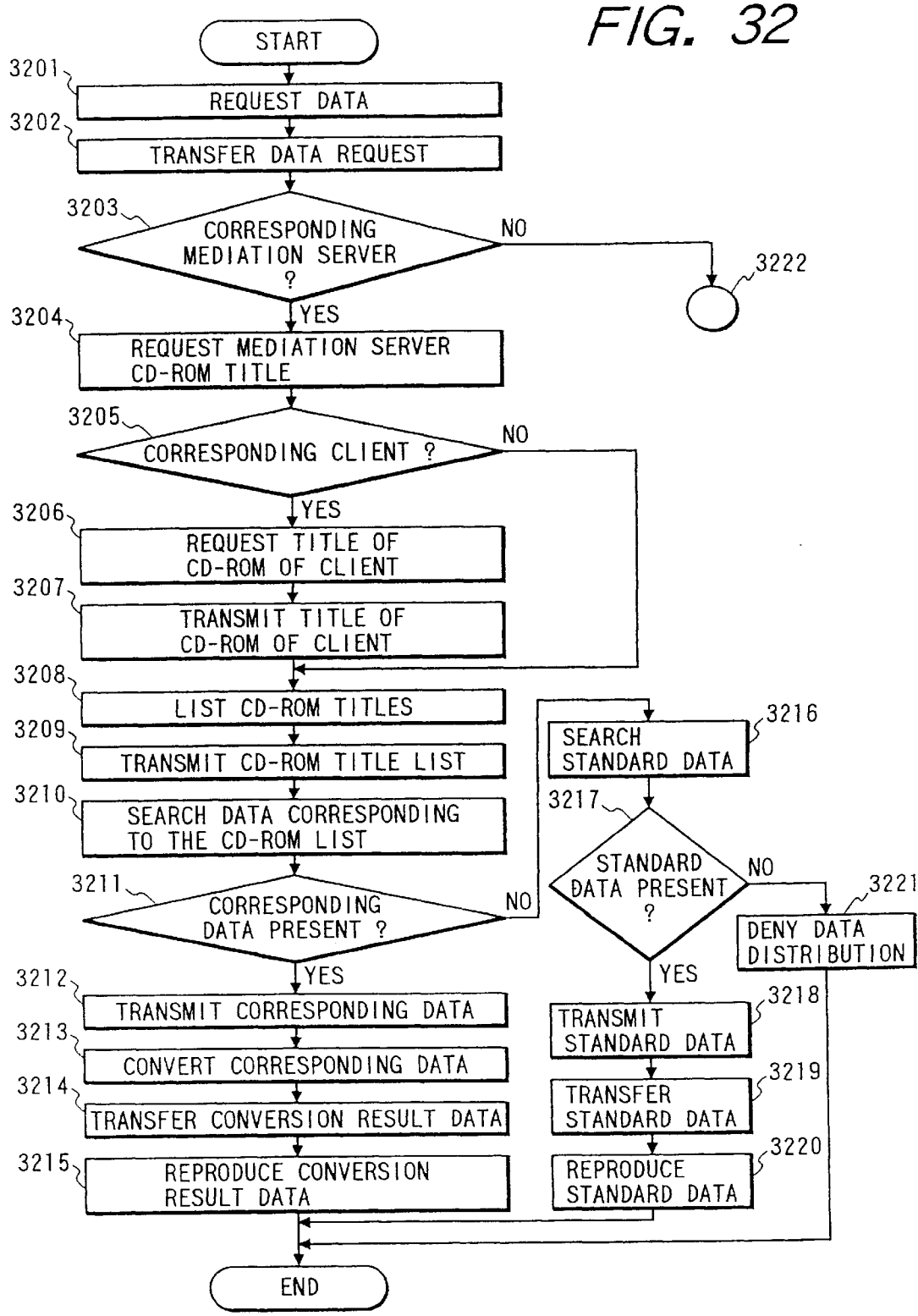
FIG. 32 is a flow chart showing an operation of the information distribution system according to the ninth embodiment.

Referring to FIG. 32, a description will be made hereinbelow of the flow taken for when the client 3102 issues a request for the data "Izu heights. html" through the mediation server 3103 toward the information server 3101. First of all, the user uses the input section 3116 of the client 3102 to give instructions to the client 3102 to make a request for the data "Izu Heights. html" through the mediation server 3103 toward the information server 3101. The control section 3117 of the client 3102 gives instructions to the communication control section 3111 to issue a request for the data "Izu Heights. html" through the mediation server 3103 to the information server 3101. The communication control section 3111 transmits a request through the network 3105 to the mediation server 3103 so that the mediation server 3103 obtains the data "Izu heights. html" from the information server 3101 and transmits it to the client 3102. At this time, the information indicative of the fact that the client 3102 has the arrangement according to this invention is additionally sent as the auxiliary information to the mediation server 3103 (step 3201). In the description of this embodiment, the client having the arrangement according to this invention will be referred hereinafter to as a corresponding client.

In the mediation server 3103, the communication control section 3118 receives that request therefrom and communicate it to the control section 3123 which in turn, makes a request through the communication control section 3118 to the information server 3101 so that the information server 3101 gives the data "Izu heights. html" to the mediation server 3103. At this time, the information representative of the fact that the mediation server 3103 has the arrangement according to this invention is additionally sent as the auxiliary information to the information server 3101 (step 3202).

In the description of this embodiment, the mediation server having the arrangement according to this invention will be referred hereinafter to as a corresponding mediation server.

In the information server 3101, the communication control section 3106 accepts the aforesaid data request and the auxiliary information and hands them over to the control section 3108. The control section 3108 decides, on the basis of the auxiliary information it receives, whether or not the mediation server 3103 comes under the corresponding mediation server (step 3203). In the present case, since the mediation server 3103 is the corresponding mediation server, the operational flow advances to a step 3104 and the following steps. Subsequently, the control section 3106 gives instructions to the communication control section 3106 to issue a request to the mediation server 3103 to transmit the title of the CD-ROM 3121 put in the CD-ROM control section 3122 (step 3204). In the mediation server 3103, the communication control section 3118 conveys the request to the control section 3123 which in turn, checks, on the basis of the auxiliary information of the request coming from the client 3102, whether or not the client 3102 falls under the corresponding client. In this instance, since it is the corresponding client (step 3205), the operational flow goes to a step 3206. Subsequently, the control section 3123 gives instruction to the communication control section to make a request to the client 3102 so that the client 3102 transmits the title of the CD-ROM 3113 mounted in the CD-ROM control section 3114 thereof (step 3206).

In the client 3102, the communication control section 3111 communicates that request to the control section 3117 which in turn, request the title of the CD-ROM 3113 in the CD-ROM control section 3114 from the CD-ROM control section 3114 and obtains it therefrom. The control section 3117 gives instructions to the communication control section 3111 to send the obtained title through the network 3105 to the mediation server 3103. In this case, since the CD-ROM "95 Nationwide Hot Spring Inn" is put therein, this title is given thereto (step 3207).

In the mediation server 3103, the communication control section 3118 conveys the CD-ROM title from the client 3102 to the control section 3123. Then, the control section 3123 makes a request to the CD-ROM control section 3122 to return the title of the CD-ROM 3121 put therein. In this case, the CD-ROM title is "96 Nationwide Hot Spring Inn". The control section 3123 lists the CD-ROM title of the client 3102 conveyed therefrom and the aforesaid CD-ROM title of the mediation server 3103 itself. In this case, the list {"96 Nationwide Hot Spring Inn", "95 Nationwide Hot Spring Inn"} is obtainable (step 3208). Subsequently, the control section 3123 sends the CD-ROM list, obtained in the step 3208, through the communication control section 3118 to the information server 3101 (step 3209).

In the information server 3101, the communication control section 3106 receives the information therefrom and communicates it to the control section 3108 which in turn, hands over the name of the requested data and this information to the data selection section 3110. In this case, the name of the requested data is "Izu Heights. html" and the CD-ROM list is {"96 Nationwide Hot Spring Inn", "95 Nationwide Hot Spring Inn"}. The data selection section 3110 receives them and searches for the corresponding data referring to its own data selection table (Table 8). In this instance, the data "Izu Heights 2. html" and "Izu Heights 1. html" are found as the corresponding data. Since the data "Izu Heights 2. html" is higher in priority than the data "Izu Heights 1. html", the data "Izu Heights 2. html" is selected as the corresponding data (step 3210). The data selection section 3110 decides whether the corresponding data is found or not. Since the data "Izu Heights 2. html" is found (3211), the operational flow advances to a step 3212 and the following steps. The data selection section 3106 selects the corresponding found data "Izu Heights 2. html" as the data to be actually offered and derives it from the selection data holding section 3109 to hand it over to the control section 3108. The control section 3108 gives instructions to the communication control section 3106 to send the obtained corresponding data to the mediation server 3103. Thus, the communication control section 3106 transmits the same data through the network 3104 to the mediation server 3103. At this time, since in the data "Izu Heights 2. html" there is not written a control code for using the image data "Hotel A Simplicity. mpg" and "Hotel B Simplicity. mpg", these data is not transmitted thereto (step 3212).

In the mediation server 3103, the communication control section 3118 receives the data "Izu Heights 2. html" from the information server 3101 through the network 3104 and passes it to the control section 3123. The control section 3123 once stores it in the data holding section 3119. Subsequently, the control section 3123 gives instructions to the data conversion section 3120 to convert the corresponding data "Izu Heights 2. html". The data conversion section 3120 examines this data and makes the conversion in terms of the portion indicating the use of the CD-ROM 3121 of the mediation server 3103 to replace it with a control code whereby the client 3102 can appropriately use the CD-ROM of the mediation server 3103 when receiving and reproducing the converted data. In this case, since the control codes for the use of the data in the CD-ROM are all made so that the CD-ROM "96 Nationwide Hot Spring Inn" the mediation server 3103 has is put to use, all undergo the conversion, and the conversion result becomes as shown in FIG. 33. In this illustration, <HOST="local-serv", . . . > is the converted portion. When the client 3102 reproduces this portion, the data "Hotel A Standard. mpg" and "Hotel B Standard. mpg" in the CD-ROM "96 Nationwide Hot Spring Inn" of the mediation server 3103 are sent through the network 3105 to the client 3102 and displayed on the display section 3115. In the illustration, "local-serv" signifies the name of the mediation server 3103 on the network 3105. The data conversion section 3119 conveys the conversion result data to the control section 3123 which in turn, gives instructions to the communication control section 3116 to send the same data to the client 3102. The communication control section 3116 transmits it through the network 3105 to the client 3102 (step 3214).

In the client 3102, the communication control section 3111 receives the data "Izu heights 2. html" from the mediation server 3103 through the network 3105 and communicates it to the control section 3117. The control section 3117 stores the same data in the data holding section and then reproduces it to display it on the display section 3115. Since for data reproduction the control code: <HOST= "local-serv", CD-ROM="96 Nationwide Hot Spring Inn", FILE=Hotel A Standard. mpg"> indicating the reproduction of the data "Hotel A Standard. mpg" in the CD-ROM "96 Nationwide Hot Spring Inn" 3122 of the mediation server 3103 is present in the description section for the hotel A, when reproducing the description section for the hotel A, the control section 3117 gives instructions to the communication control section 3111 to make a request for the data "Hotel A Standard. mpg" in the CD-ROM "96 Nationwide Hot Spring Inn" 3122 of the mediation server 3103 through the network 3105 toward the mediation server 3103. In the mediation server 3103, the control section 3123 receives this request through the communication control section 3118 and controls the CD-ROM control section 3122 so that the data "Hotel A Standard. mpg" is derived from the CD-ROM "96 Nationwide Hot Spring Inn" 3122 and further controls the communication control section 3118 to distribute it through the network 3105 to the client 3102. In the client 3102, the control section 3117 receives the data "Hotel A Standard. mpg" through the communication control section 3111 and conveys it to the display section 3115 to display it toward the user.

In like manner, the data "Hotel B Standard. mpg" in the CD-ROM "96 Nationwide Hot Spring Inn" of the mediation server 3103 is used in the description section for the hotel B (step 3215).

As mentioned above, in cases where the client 3102 having the CD-ROM "95 Nationwide Hot Spring Inn" makes a request for the data "Izu Heights. html" through the mediation server 3103 having the CD-ROM "95 Nationwide Hot Spring Inn" toward the information server 3101, the image data "Hotel A Simplicity. mpg" and "Hotel B Simplicity. mpg" are not sent from the information server 3101 through the networks 3104 and 3105 to the client 3102, but the image data "Hotel A Standard. mpg" and "Hotel B Standard. mpg" existing in the aforesaid CD-ROM of the mediation server 3103 and higher in appeal are instead sent through the large capacity network 3105 and put to use.

On the contrary, in cases where the client 3102 is provided with the CD-ROM "96 Nationwide Hot Spring Inn" with a higher priority and the mediation server 3103 is equipped with the CD-ROM "95 Nationwide Hot Spring Inn" with a lower priority, in the corresponding data conversion of the step 3213, the conversion is not actually made but the data "Izu Heights 2. html" is directly sent to the client 3102. The client 3102 receives this data and uses the data "Hotel A Standard. mpg" and "Hotel B Standard. mpg" in its own CD-ROM "96 Nationwide Hot Spring Inn" 3113 as well as the client A in the first embodiment. Further, in cases where the mediation server 3103 and the client 3102 have no CD-ROM, the information server 3101 searches for the standard data and sends the standard data "Izu Heights 0. html" and the data "Hotel A Simplicity. mpg" and "Hotel B Simplicity. mpg" to the mediation server 3103 (steps 3216, 3217 and 3218). The mediation server 3103 does not convert these data this time but transferring them to the client 3102 (step 3219), while the client 3102 reproduces them as well as the client C in the first embodiment (step 3220). Still further, in cases where the mediation server 3103 does not come under the corresponding server, the operation advances as in the case of the first embodiment and others (step 3222).

According to this embodiment, when the information server having the arrangement according to this invention carries out the information distribution through the networks, if distributing the information to the client through the mediation server having the arrangement according to this invention and having a specific data retaining medium, through the use of the data in the data retaining medium the portion for sending a large amount of data such as a motion picture through the network can be limited to between the mediation server and the client, with the result that the effective distribution of a large amount of data such as a motion picture is possible. Further, in cases where the client is provided with a specific data retaining medium, through the use of the data in the data retaining medium the data corresponding to the requested data is distributable without the need for sending a large amount of data such as a motion picture through the networks, with the result that the data including a large amount of data such as a motion picture is effectively distributable. In addition, in cases where the mediation server and the client are not equipped with a specific data retaining medium, the data distribution is possible as long as the information server side prepares the standard data.

Although in this embodiment, when the mediation server 3103 synthesizes the CD-ROM list in the step 3208, the system does not add the information indicative of the fact that the CD-ROM in the list is mounted in the mediation server 3103 or is put in the client 3102, it is also possible that this information is added and conveyed to the information server 3101 and, when the information server 3101 conducts the data selection, for example the data corresponding to the CD-ROM of the client 3102 is preferentially selected taking into consideration the fact that the CD-ROM is set in the mediation server 3103 or set in the client 3102. Further, it is also appropriate that the data production section 3107 of the information server 3101 receives the CD-ROM list from the mediation server 3103 and returns the corresponding data thereto in accordance with the list and, when the mediation server 3103 performs the data conversion, in the case that the use of both the CD-ROM 3121 of the mediation server 3103 and CD-ROM 3113 of the client 3102 is preferable, the conversion is made for the use of both the CD-ROMs. For example, in cases where the client 3102 is provided with the CD-ROM "95 Nationwide Hot Spring Inn" and the mediation server 3103 is equipped with the CD-ROM "96 Nationwide Hot Spring Inn", when the client 3102 makes a request for the data "Izu heights. html" through the mediation server 3103 toward the information server 3101, the information server 3101 sends the data as shown in FIG. 34 to the mediation server 3103. In the illustration, the description section for the hotel A includes <CD-ROM="96 Nationwide Hot Spring Inn" | "95 Nationwide Hot Spring Inn", FILE=

"Hotel A Standard. mpg">. This means that, when the mediation server 3103 makes the conversion of this portion, the conversion into <CD-ROM="95 Nationwide Hot Spring Inn", FILE="Hotel A Standard. mpg"> is made in a state that the CD-ROM "95 Nationwide Hot Spring Inn" of the client 3102 takes precedence over the CD-ROM "96 Nationwide Hot Spring Inn" of the mediation server 3103. On the other hand, in terms of the hotel B, only the CD-ROM "96 Nationwide Hot Spring Inn" of the mediation server 3103 is available, and hence the conversion is made like the aforesaid embodiment. The data to be sent to the client 3102 becomes as shown in FIG. 35. Thus, when producing the data, the client 3102 can use a combination of the data in its own CD-ROM "95 Nationwide Hot Spring Inn" and the data in the CD-ROM "96 Nationwide Hot Spring Inn" of the mediation server 3103.

As described above, according to this invention, in cases where the data in the data retaining medium of the client is included in the data to be offered from the information server, that data is not sent through the network but is obtained from the data retaining medium of the client, with the result that the distribution of the data including a large amount of data such as a motion picture is effectively possible. Further, even in cases where the client having the arrangement according to this invention is not provided with a specific data retaining medium, the data distribution is possible if the information server side prepares the standard data. Still further, even if the client does not have the arrangement according to this invention, the data distribution is also possible as long as the information server side prepares the standard data. In addition. according to this invention, in cases where the data in the data retaining medium the client can use is included in the data the information server provides, even if the data retaining medium including that data is not mounted in the data retaining medium control section of the client at the time that the information server performs the data distribution, that data is not transmitted through the network but is obtained from the data retaining medium usable for the client, with the result that it is possible to more effectively distribute the data including a large amount of data such as a motion picture. Moreover, according to this invention, even if the client requesting the information distribution does not directly have a specific data retaining medium, in the case that the a portion of the data the information server provides is present in the data retaining medium the mediation server has, that data is attainable from the data retaining medium of the mediation server without being sent through network. Accordingly, the transmission of a large amount of data such as a motion picture can be limited to between the mediation server and the client, with the result that it is possible to more effectively provide the data including a large amount of data such as a motion picture.

It should be understood that the foregoing relates to only preferred embodiments of the present invention, and that it is intended to cover all changes and modifications of the embodiments of the invention herein used for the purposes of the disclosure, which do not constitute departures from the spirit and scope of the invention.

What is claimed is:

1. An information distribution system using a network comprising:
   an information server including:
      a server communication control section for making a communication through said network;
      a data production section for producing and obtaining data to be offered from said information server; and
      a server control section for controlling said server communication control section and said data production section; and
   a client for receiving information from said information server through said network, said client including:
      a client communication control section for making a communication through said network:
      a client data holding section for holdino data offered from said information server through said network;
      a portable large capacity data retaining medium;
      a data retaining medium control section for controlling said data retaining medium; and
      a client control section for controlling said client communication control section, said client data holding section and said data retaining medium control section,
   wherein:
   when providing the information through said network to said client, said information server also provides further data, said further data including control information for using, in accordance with a state of said data retaining medium control section of said client, data existing in said data retaining medium of said client;
   when using the information from said information server, said client uses said data existing in said data retaining medium in accordance with said control information included in said further data and,
   when said client makes a request for data through said network to said information server, said information server makes a request for information specifying the contents of the data included in said data retaining medium under control of said data retaining medium control section of said client which acts as information on the state of said data retaining medium control section thereof toward said client, and said client is responsive to said request from said information server to offer the information on the state of said data retaining medium control section to said information server.

2. An information distribution system as defined in claim 1, wherein said data production section of said information server includes a server data holding section for holding a set of data to be offered from said information server and a data selection section for selecting said data in said server data holding section, and when said information server offers the information to said client, said data selection section selects data from the set of data held in said server data holding section on the basis of a name of data to be offered and on the basis of information on the state of said data retaining medium control section of said client to obtain data to be actually offered to said client.

3. An information distribution system as defined in claim 1, wherein said data production section of said information server includes a server data holding section for holding a set of production data used for producing data to be offered from said information server and a data conversion section for converting said data held in said server data holding section, and when said information server offers the information to said client, said data conversion section specifies data undergoing the conversion from the data held in said server data holding section on the basis of a name of data to be offered and converts the specified data on the basis of information on the state of said data retaining medium control section of said client to obtain data to be actually offered to said client.

4. An information distribution system as defined in claim 1, wherein said data production section of said information server includes a server data holding section for holding a set of production data used for producing data to be offered from said information server, a data selection section for selecting data in said server data holding section and a data conversion section for converting the selected data, and when said information server offers the information to said client, said data selection section selects data undergoing the conversion from the set of production data held in said server data holding section on the basis of a name of data to be offered and on the basis of information on the state of said data retaining medium control section of said client, and said data conversion section converts the selected data on the basis of the information on the state of said data retaining medium control section of said client to attain data to be actually offered to said client.

5. An information distribution system as defined in claim 1, wherein, when said client makes a request for data through said network to said information server, said information server makes a request to said client for information on the state of said data retaining medium control section and said client is responsive to the request from said information server to offer the information on the state of said data retaining medium control section.

6. An information distribution system as defined in claim 1, wherein, when said client makes a request for data through said network to said information server, said information server shows a list of specific data names to said client to make a request to said client to obtain information on whether or not data in said list is included in said data retaining medium controlled by said data retaining medium control section of said client, and said client is responsive to said request from said information server to provide information on the state of said data retaining medium control section.

7. An information distribution system as defined in claim 1, wherein said client additionally has a client-usable data retaining medium list holding information on data retaining media usable for said client including detachable data retaining media which are not mounted in said data retaining medium control section, and said client control section of said client controls said client-usable data retaining medium list in addition to said client communication control section, said client data holding section and said data retaining medium control section of said client, and when offering the information through said network to said client, said information server gives additional data including control information for said client to use the data existing in said data retaining medium in accordance with the contents of said data retaining medium list thereof, and when using the data offered from said information server, said client uses the data existing in said data retaining medium.

8. An information distribution system as defined in claim 7, wherein, when offering data through said network to said client, said information server asks said client, on the basis of a name of data to be offered, the contents of said data retaining medium list and information on the state of said data retaining medium control section, whether or not to change the data retaining medium mounted in said data retaining medium control section, and obtains data to be actually offered to said client in accordance with the answer from said client.

9. An information distribution system as defined in claim 1, wherein said information server further comprises checking means for checking a status of said data retaining medium control section of a client receiving information from said information server through said network and for providing information to said client in accordance with said checked status.

10. An information distribution system as defined in claim 9, wherein said information server further comprises control information changing means for changing said control information included in said further data provided to said client, said control information changing means changing said control information in accordance with the status of said data retaining medium control section of said client.

11. An information distribution system as defined in claim 9, wherein said checking means operates for checking data retained in said data retaining medium of said client, and wherein said information server provides the information to said client in accordance with the checked data retained in said data retaining medium of said client.

12. An information distribution system as defined in claim 11, wherein said information server further comprises control information changing means for changing said control information included in said further data provided to said client, said control information changing means changing said control information in accordance with said data retained in said data retaining medium of said client.

13. An information distribution system as defined in claim 1, wherein said information server further comprises checking means for checking a status of said data retaining medium control section of a client requesting information from said information server through said network and for providing requested information to said client in accordance with said checked status.

14. An information distribution system as defined in claim 13, wherein said information server further comprises control information changing means for changing said control information included in said further data provided to said client, said control information changing means changing said control information in accordance with the status of said data retaining medium control section of said client requesting the information.

15. An information distribution system as defined in claim 13, wherein said checking means operates for checking data retained in said data retaining medium of said client, and wherein said information server provides the requested information to said client in accordance with the checked data retained in said data retaining medium of said client requesting the information.

16. An information distribution system as defined in claim 15, wherein said information server further comprises control information changing means for changing said control information included in said further data provided to said client, said control information changing means changing said control information in accordance with the checked data retained in said data retaining medium of said client requesting the information.

17. An information distribution system using a network comprising:
    an information server including:
        a server communication control section for making a communication through said network;
        a data production section for producing and obtaining data to be offered from said information server; and
        a server control section for controlling said server communication control section and said data production section; and
    a client for receiving information from said information server through said network, said client including:
        a client communication control section for making a communication through said network;
        a client data holding section for holding data offered from said information server through said network;

a portable large capacity data retaining medium;

a data retaining medium control section for controlling said data retaining medium; and a client control section for controlling said client communication control section, said client data holding section and said data retaining medium control section, wherein:

when providing the information through said network to said client, said information server also provides further data, said further data including control information for using, in accordance with a state of said data retaining medium control section of said client, data existing in said data retaining medium of said client;

when using the information from said information server, said client uses said data existing in said data retaining medium in accordance with said control information included in said further data and, when said client makes a request for data through said network to said information server, said client provides information specifying the requested data and information on the state of said data retaining medium control section to said information server.

18. An information distribution system comprising:

an information server for providing information, said information server including:

a server communication control section for controlling a communication;

a data production section for producing and obtaining data to be offered; and a server control section for controlling said server communication control section and said data production section;

a client for receiving the information from said information server, said client including:

a client communication control section for controlling a communication;

a client data holding section for holding data offered; and a client control section for controlling said client communication control section and said client data holding section; and a mediation server coupled through a first network to said information server and further coupled through a second network to said client, said mediation server including:

a mediation server communication control section for making a communication through said first and second networks;

a mediation server data holding section for temporarily holding data offered through said first and second networks;

a data conversion section for converting data offered from said information server when necessary;

a portable large capacity mediation server data retaining medium;

a mediation server data retaining medium control section for controlling said mediation server data retaining medium; and a mediation server control section for controlling said communication control section, said data holding section, said data conversion section and data retaining medium control section of said client, wherein:

when offering data through said mediation server to said client by way of said first and second networks, said information server provides further data includinng control information for said client to use data existing in said data retaining medium of said mediation server in accordance with a state of said data retaining medium control section of said mediation server, and said mediation server converts the data offered from said information server and sends it to said client, and when using the data sent from said mediation server, said client uses data existing in said mediation server data retaining medium.

19. An information distribution system as defined in claim 18, wherein:

said client further comprises a portable large capacity data retaining medium and a client data retaining medium control section for controlling said client data retaining medium, said client control section controls said client data retaining medium control section in addition to said client communication control section and said client data holding section, when offering data through said mediation server to said client by way of said first and second networks, said information server provides additional data including control information for said mediation server and said client to use data existing in said data retaining media of said mediation server and said client in accordance with states of both said mediation server data retaining medium control section and said client data retaining medium control section, and said mediation server converts the data offered from said information server and gives it to said client, and when using the data given from said mediation server, said client uses the data existing in said mediation server data retaining medium and the data existing in said client data retaining medium.

* * * * *